US009036060B2

(12) United States Patent
Kaizu et al.

(10) Patent No.: US 9,036,060 B2
(45) Date of Patent: May 19, 2015

(54) IMAGING DEVICE, IMAGE PROCESSING METHOD AND PROGRAM FOR CORRECTION OF BLOOMING

(75) Inventors: Shun Kaizu, Tokyo (JP); Kensei Jo, Tokyo (JP); Tomoo Mitsunaga, Kanagawa (JP); Hirotaka Shinozaki, Tokyo (JP)

(73) Assignee: Sony Corporation, Tokyo (JP)

( * ) Notice: Subject to any disclaimer, the term of this patent is extended or adjusted under 35 U.S.C. 154(b) by 143 days.

(21) Appl. No.: 13/559,720

(22) Filed: Jul. 27, 2012

(65) Prior Publication Data

US 2013/0033616 A1 Feb. 7, 2013

(30) Foreign Application Priority Data

Aug. 4, 2011 (JP) .................................. 2011-171040

(51) Int. Cl.
*H04N 5/367* (2011.01)
*H04N 5/359* (2011.01)
*H04N 5/355* (2011.01)
*H04N 9/04* (2006.01)

(52) U.S. Cl.
CPC ........... *H04N 5/35554* (2013.01); *H04N 5/367* (2013.01); *H04N 5/3591* (2013.01); *H04N 9/045* (2013.01)

(58) Field of Classification Search
CPC ............................. H04N 5/3591; H04N 5/367
USPC .......................... 348/234, 241, 273, 248, 246
See application file for complete search history.

(56) References Cited

U.S. PATENT DOCUMENTS

| 7,532,225 | B2 | 5/2009 | Fukushima et al. |  |
|---|---|---|---|---|
| 2002/0105579 | A1* | 8/2002 | Levine et al. | 348/187 |
| 2002/0122123 | A1* | 9/2002 | Kimura | 348/246 |
| 2005/0063513 | A1* | 3/2005 | Hsieh et al. | 378/98.8 |
| 2008/0107358 | A1* | 5/2008 | Saito | 382/300 |
| 2008/0278609 | A1* | 11/2008 | Otsuki | 348/247 |
| 2008/0291296 | A1* | 11/2008 | Oike | 348/234 |
| 2009/0310849 | A1* | 12/2009 | Katou | 382/149 |
| 2010/0085517 | A1 | 4/2010 | Hong |  |
| 2011/0069204 | A1* | 3/2011 | Vakrat et al. | 348/234 |
| 2011/0157471 | A1 | 6/2011 | Seshadri et al. |  |
| 2012/0194686 | A1* | 8/2012 | Lin et al. | 348/208.4 |
| 2012/0229442 | A1 | 9/2012 | Inoue |  |

(Continued)

FOREIGN PATENT DOCUMENTS

JP 02-174470 A 7/1990
JP 07-095481 A 4/1995

(Continued)

*Primary Examiner* — Nicholas Giles
*Assistant Examiner* — Abdelaaziz Tissire
(74) *Attorney, Agent, or Firm* — Wolf, Greenfield & Sacks, P.C.

(57) ABSTRACT

Provided is an imaging device including an image sensor for outputting a high-sensitivity pixel signal from a long-time exposure pixel and a low-sensitivity pixel signal from a short-time exposure pixel; and a blooming correction processing unit for receiving the output pixel signal from the image sensor and executing blooming correction for the pixel signal. The blooming correction processing unit executes pixel value correction of the input pixel from the image sensor according to a difference between or a ratio of an input pixel value from the image sensor and an ideal pixel value not affected by blooming.

18 Claims, 49 Drawing Sheets

(56) References Cited

U.S. PATENT DOCUMENTS

| | | |
|---|---|---|
| 2012/0256974 A1 | 10/2012 | Minami et al. |
| 2012/0268627 A1* | 10/2012 | Oike ............................ 348/241 |
| 2012/0306864 A1 | 12/2012 | Inoue |
| 2013/0050177 A1 | 2/2013 | Sato et al. |
| 2013/0050284 A1 | 2/2013 | Sato et al. |
| 2013/0076723 A1 | 3/2013 | Niioka et al. |
| 2013/0293534 A1 | 11/2013 | Sato et al. |

FOREIGN PATENT DOCUMENTS

| | | |
|---|---|---|
| JP | 11-85119 A | 3/1999 |
| JP | 2004-118140 A | 4/2004 |
| JP | 2006-253876 A | 9/2006 |
| JP | 2008-147818 A | 6/2008 |
| JP | 2008-294698 A | 12/2008 |
| JP | 4689620 B2 | 5/2011 |
| WO | WO 2006-049098 A1 | 5/2006 |

* cited by examiner

FIG.39

|       |       |       |       |       |
|-------|-------|-------|-------|-------|
| Rd15  | Gd25  | Rb35  | Gb45  | Rd55  |
| Gd14  | Bd24  | Gb34  | Bb44  | Gd54  |
| Rd13  | Gd23  | Rb33 | Gb43  | Rd53  |
| Gd12  | Bd22  | Gb32  | Bb42  | Gd52  |
| Rd11  | Gd21  | Rb31  | Gb41  | Rd51  |

FIG.41

| Rd17 | Gd27 | Rb37 | Gb47 | Rd57 | Gd67 | Rb77 |
|------|------|------|------|------|------|------|
| Gd16 | Bd26 | Gb36 | Bb46 | Gd56 | Bd66 | Gb76 |
| Rd15 | Gd25 | Rb35 | Gb45 | Rd55 | Gd65 | Rb75 |
| Gd14 | Bd24 | Gb34 | Bb44 | Gd54 | Bd64 | Gb74 |
| Rd13 | Gd23 | Rb33 | Gb43 | Rd53 | Gd63 | Rb73 |
| Gd12 | Bd22 | Gb32 | Bb42 | Gd52 | Bd62 | Gb72 |
| Rd11 | Gd21 | Rb31 | Gb41 | Rd51 | Gd61 | Rb71 | ptions.

IMAGING DEVICE, IMAGE PROCESSING METHOD AND PROGRAM FOR CORRECTION OF BLOOMING

CROSS REFERENCE TO RELATED APPLICATIONS

This application claims priority to Japanese Priority Patent Application JP 2011-171040, filed in the Japan Patent Office on Aug. 4, 2011, the entire content of which is hereby incorporated by reference.

BACKGROUND

The present disclosure relates to an imaging device, an image processing method, and a program. More specifically, the present disclosure relates to an imaging device, an image processing method, and a program that perform correction of image degradation, for example, due to blooming.

In recent years, a CCD image sensor or a CMOS (Complementary Metal Oxide Semiconductor) image sensor has been used as a solid-state image sensor such as a video camera or a digital still camera. In such an image sensor, the number of pixels is rapidly increasing or a size of the image sensor is being rapidly reduced.

However, with the increase in the number of pixels or the size reduction, an interval between adjacent pixels in the image sensor becomes small, and a new problem of charge leakage between the pixels, which is called blooming, is generated.

Blooming refers to a phenomenon in which one of adjacent pixels is in a saturation state and charges overflow and leak to the other pixel.

The blooming phenomenon will be described with reference to FIG. 1.

When strong light is incident on one of adjacent pixels, weak light is incident to the other pixel, and a light receiving part 1 on which the strong light is incident is in a saturation state, charges generated by the light incident on the light receiving part 1 are not accumulated in the light receiving part 1 and some of the charges leak to an adjacent light receiving part 2. This phenomenon is called blooming.

Here, to classify the pixels, the pixel that generates charge overflowing, that is, the blooming generation pixel, is defined as an aggressor pixel and the pixel that accumulates charges overflowing from the aggressor pixel, that is, the blooming receiving pixel, is defined as a victim pixel.

When such blooming is generated, a pixel value of the pixel that generates charge overflowing, that is, the aggressor pixel that generates the blooming, becomes a saturation value. Meanwhile, a pixel value of the pixel accumulating the overflowing charges, that is, the victim pixel that receives the blooming, is set to an incorrect pixel value due to the overflowing charges.

FIG. 2 is a diagram illustrating transitions of accumulated charges of an aggressor pixel and a victim pixel due to blooming.

Temporal changes of charge amounts when light is incident on the aggressor pixel and the victim pixel adjacent to each other are shown. At a time t1, the aggressor pixel is saturated and charge overflowing occurs.

The overflowing charges flow into the adjacent victim pixel and an accumulated charge amount of the victim pixel is changed.

A dotted line corresponding to the victim pixel shown in FIG. 2 indicates a transition of normal accumulated charges when there is no blooming, and a solid line indicates a transition of the accumulated charges changed due to blooming.

Adjacent pixels have different sensitivity according to a wavelength of incident light and a characteristic of a color filter, but when a pixel having high sensitivity (an aggressor) is saturated, a pixel having low sensitivity (a victim) is affected.

When the incident light is constant, a change in a charge amount will have linearity. However, the victim pixel has nonlinearity due to the influence of blooming As a result, there is a problem in that an image is discolored.

In general, since the influence of blooming is generated in the vicinity of saturation of an image, a technique for eliminating the influence of blooming through a solution process of thinning a color component in the vicinity of the saturation is often used.

An example of this solution to blooming is disclosed in, for example, Japanese Patent Application Laid-Open Publication No. 2008-294698.

Japanese Patent Application Laid-Open Publication No. 2008-294698 describes a blooming solution for a captured image of a wide dynamic range image.

A wide dynamic range image will be simply described. Image capture environments by an imaging device are assumed to be various environments: indoors or outdoors and daytime or nighttime. When the image sensor (an image sensor) is used in the various environments, it is necessary for sensitivity to have an optimal value by controlling a charge accumulation time of a photoelectric conversion element, that is, adjusting an exposure time according to brightness of a photography environment.

For example, an effective pixel value can be output from each pixel by suppressing occurrence of saturation of the pixel value or sensitivity insufficiency by setting a short exposure time in a bright environment and a long exposure time in a dark environment.

However, for example, when an image in which both a bright subject and a dark subject are present is captured, early charge accumulation begins to become saturated in a photographed pixel of the bright subject if photography is performed in a constant exposure time. However, an imbalance in which sufficient charge accumulation is not achieved may be generated in a photographed pixel of the dark subject.

A technique of outputting an effective pixel value from the bright subject to the dark subject is a process of extending a dynamic range, and such an imaging process is called high dynamic range (HDR) imaging or wide dynamic range (WDR) imaging.

Hereinafter, an image capture technique for outputting an effective pixel value from the bright subject to the dark subject will be described as an HDR image capture technique.

The following two techniques have been proposed as HDR image capture techniques.

(Technique 1) Multi-shot technique: a technique of generating a wide dynamic range image through a process of combining a long-time exposure image and a short-time exposure image using a plurality of images continuously captured in a plurality of different exposure times.

(Technique 2) One-shot technique: a technique of generating a wide dynamic range image by combining a long-time exposure pixel and a short-time exposure pixel included in one image by setting, for example, different exposure times in units of rows of a pixel arrangement without continuously capturing a plurality of images.

The multi-shot technique is disclosed in, for example, Japanese Patent Application Laid-Open Publication Nos. Hei 2-174470, Hei 7-95481, and Hei 11-75118.

Specifically, as shown in FIG. 3, a short-time exposure image (low-sensitivity image) whose exposure time is short, and a long-time exposure image (high-sensitivity image) whose exposure time is long are alternately captured for each frame.

These captured images having the different exposure times are accumulated in a frame memory, and signal processing such as selection and acquisition of an effective pixel value from each image is executed. For example, an image having a high dynamic range is generated through signal processing, such as preferential acquisition of a pixel value of a short-time exposure image (low-sensitivity image) for a bright subject area and preferential acquisition of a pixel value of a long-time exposure image (high-sensitivity image) for a dark subject area.

In Japanese Patent Application Laid-Open Publication No. 2008-294698 described above, a blooming correction process for an HDR image by such a multi-shot technique has been described.

(a) A short-time exposure image, and
(b) a long-time exposure image,
which are continuously captured by a multi-shot technique are shown in FIG. 4.

Japanese Patent Application Laid-Open Publication No. 2008-294698 describes blooming correction when an exposure time of one entire image is the same, that is, all exposure times of adjacent pixels are the same, as shown in FIG. 4.

A configuration in which an amount of blooming generated between adjacent pixels of a long-time exposure pixel is estimated using a pixel value of a short-time exposure image, and correction of a pixel value of a long-time exposure image is performed based on this estimation is disclosed.

Even when blooming is generated in the long-time exposure image, a continuously captured short-time exposure image does not have nonlinearity such as saturation or blooming since the exposure time is sufficiently short in the continuously captured short-time exposure image.

Due to this characteristic, in the case of an HDR captured image by multi-shot, an amount of blooming generated between the adjacent pixels of the long-time exposure image is estimated based on a pixel value of the short-time exposure image, and correction of the long-time exposure pixel can be performed based on the estimation value.

Japanese Patent Application Laid-Open Publication No. 2008-294698 describes a blooming correction process for the HDR image by such a multi-shot technique.

However, it is difficult for a blooming correction process disclosed in Japanese Patent Application Laid-Open Publication No. 2008-294698 to apply to an image captured by a one-shot technique (Technique 2) of the HDR image capture technique described above.

The one-shot technique (Technique 2) is a technique of generating a wide dynamic range image by combining a long-time exposure pixel and a short-time exposure pixel included in one image by setting, for example, different exposure times in units of rows of a pixel arrangement without continuously capturing a plurality of images.

Further, a photography process of an HD image using a one-shot technique is disclosed in, for example, Japanese Patent Application Laid-Open Publication No. 2006-253876 and Japanese Patent Application Publication No. 2006-542337.

For a captured image using the one-shot technique, both a long-time exposure pixel and a short-time exposure pixel are present in one image.

Accordingly, it is difficult to perform a process using the two images as shown in FIG. 4:

(a) short-time exposure image, and
(b) long-time exposure image.

For example, one captured image is an image in which both low-sensitivity pixels that are short-time exposure pixels and high-sensitivity pixels that are long-time exposure pixels are present, as shown in FIG. 5.

Thus, a plurality of pixels with sensitivity are present in the image captured by the one-shot technique. In such an image, blooming is generated in a very complex form.

That is, the following blooming between various pixels is generated in the image:
    Blooming from a long-time exposure pixel to a long-time exposure pixel
    Blooming from a short-time exposure pixel to a short-time exposure pixel
    Blooming from a long-time exposure pixel to a short-time exposure pixel
    Blooming from a short-time exposure pixel to a long-time exposure pixel Accordingly, it is necessary to correct blooming in consideration of such blooming generation forms.

In Japanese Patent Application Laid-Open Publication No. 2008-294698 described above, a blooming correction amount for an HDR captured image by a multi-shot technique has been estimated using a short-time exposure image not affected by blooming.

However, in the case of an HDR image captured in one shot, since blooming correction must be performed using a short-time exposure image not affected by blooming, for example, a process for reducing an error of the correction amount is necessary.

Further, Japanese Patent Application Laid-Open Publication No. 2008-147818 discloses a method of minimizing blooming generation by changing reading timing control for an image sensor rather than by performing signal processing.

In this method, since a reading timing is discontinuous according to positions of the image, for example, a frame memory is necessary to obtain continuous data. Further, when the exposure time is desired to be changed, a data reading timing is changed according to an exposure time and control for signal processing in a subsequent stage is difficult.

SUMMARY

The present disclosure has been made in view of, for example, the above problems, and it is desirable to provide an imaging device, and image processing method, and a program that execute a correction process of blooming due to charge leakage between the pixels.

It is desirable to provide an imaging device, an image processing method, and a program that execute a blooming correction process suitable for, for example, an imaging device that generates a one-shot type of high dynamic range (HDR) image generated based on one captured image.

DETAILED DESCRIPTION OF THE EMBODIMENTS

According to the first embodiment of the present disclosure, there is provided an imaging device including an image sensor for outputting a high-sensitivity pixel signal from a long-time exposure pixel and a low-sensitivity pixel signal from a short-time exposure pixel, and a blooming correction processing unit for receiving the output pixel signal from the image sensor and executing blooming correction for the pixel signal. The blooming correction processing unit executes pixel value correction of the input pixel from the image sensor according to a difference between or a ratio of an input pixel value from the image sensor and an ideal pixel value not affected by blooming.

The blooming correction processing unit includes a blooming amount estimation unit for estimating a blooming amount corresponding to charge leakage from a pixel in the vicinity of a noticed pixel that is a blooming correction target using the low-sensitivity pixel signal input from the image sensor, and a calculation unit for subtracting the blooming amount estimated by the blooming amount estimation unit from the input pixel value from the image sensor.

The blooming correction processing unit includes a blooming amount estimation unit for calculating a blooming amount corresponding to charge leakage from a pixel in the vicinity of a noticed pixel that is a blooming correction target based on a pixel arrangement of the image sensor and a mathematical model for which an exposure control pattern of a high-sensitivity pixel and a low-sensitivity pixel of the image sensor is considered.

The blooming correction processing unit includes a signal generation unit for generating a high-sensitivity pixel value and a low-sensitivity pixel value of each color corresponding to a pixel position of a noticed pixel that is a blooming correction target, and a correction processing unit for receiving a signal generated by the signal generation unit and executing blooming correction of the noticed pixel.

The blooming correction processing unit executes pixel value correction of the input pixel from the image sensor by applying a table in which an input pixel value from the image sensor is associated with an ideal pixel value not affected by blooming.

The blooming correction processing unit estimates a blooming amount contained in the input pixel from the image sensor by applying a table in which an input pixel value from the image sensor is associated with a difference between the input pixel value and an ideal pixel value not affected by blooming.

The blooming correction processing unit includes a blooming amount estimation unit for estimating a blooming amount corresponding to charge leakage from a pixel in the vicinity of a noticed pixel that is a blooming correction target using the low-sensitivity pixel signal input from the image sensor, a multiplication unit for multiplying the blooming amount estimated by the blooming amount estimation unit by a predefined attenuation parameter to calculate an attenuation blooming amount, and a calculation unit for subtracting the attenuation blooming amount calculated by the multiplication unit from the input pixel value from the image sensor.

The blooming correction processing unit estimates a blooming amount corresponding to charge leakage from a pixel in the vicinity of a noticed pixel that is a blooming correction target using the low-sensitivity pixel signal input from the image sensor, and executes estimation of the blooming amount again using a low-sensitivity pixel signal obtained by subtracting the blooming amount based on the estimation result.

The blooming correction processing unit comprises a motion detection unit for determining whether a noticed pixel that is a blooming correction target is a motion area, and changes a blooming correction aspect according to detection information of the motion detection unit.

The blooming correction processing unit includes an edge detection unit for determining whether a noticed pixel that is a blooming correction target is an edge area, and changes a blooming correction aspect according to detection information of the edge detection unit.

The blooming correction processing unit includes an over-correction solving unit for reducing an estimation blooming amount corresponding to the noticed pixel when a noticed pixel that is a blooming correction target is a motion area or an edge area The blooming correction processing unit determines whether the input pixel value is saturated and does not execute the blooming correction when the input pixel value is a saturation value.

The imaging device further includes a high dynamic range (HDR) image generation unit for receiving the blooming correction image generated by the blooming correction processing unit to generate a wide dynamic range image.

According to the second embodiment of the present disclosure, there is provided an imaging device including an image sensor for outputting a high-sensitivity pixel signal from a long-time exposure pixel and a low-sensitivity pixel signal from a short-time exposure pixel, and a correction processing unit for receiving the output pixel signal from the image sensor and executing correction for the pixel signal. The correction processing unit executes pixel value correction of the input pixel from the image sensor according to a difference between or a ratio of an input pixel value from the image sensor and an ideal pixel value according to an ideal linear characteristic of an amount of incident light to the image sensor and an output value.

The correction processing unit corrects a nonlinear characteristic contained in an input pixel value from the image sensor by applying the ideal pixel value according to the ideal linear characteristic.

The correction processing unit acquires the ideal pixel value of the image sensor acquired through a photography process performed multiple times, or the look-up table (LUT) applied to corrected pixel value calculation based on the ideal pixel value, from a storage unit and executes pixel value correction.

According to the third embodiment of the present disclosure, there is provided an image processing method executed in an imaging device. The imaging device includes an image sensor for outputting a high-sensitivity pixel signal from a long-time exposure pixel and a low-sensitivity pixel signal from a short-time exposure pixel, and a blooming correction processing unit for receiving the output pixel signal from the image sensor and executing blooming correction for the pixel signal, and the blooming correction processing unit executes pixel value correction of the input pixel from the image sensor according to a difference between or a ratio of an input pixel value from the image sensor and an ideal pixel value not affected by blooming.

According to the fourth embodiment of the present disclosure, there is provided a program for causing an imaging device to execute image processing. The imaging device includes an image sensor for outputting a high-sensitivity pixel signal from a long-time exposure pixel and a low-sensitivity pixel signal from a short-time exposure pixel, and a blooming correction processing unit for receiving the output pixel signal from the image sensor and executing blooming correction for the pixel signal, and the program causes the blooming correction processing unit to execute pixel value correction of the input pixel from the image sensor according to a difference between or a ratio of an input pixel value from the image sensor and an ideal pixel value not affected by blooming.

The program according to the present disclosure is recorded in a recording medium and is provided to an information processing apparatus or a computer system that can execute various program codes. By executing the program by a program executing unit on the information processing apparatus or the computer system, processing according to the program is realized.

Further features and advantages of the present disclosure will become apparent from the embodiments of the present disclosure described below or more detailed description based on the drawings. Note that a system in this specification is a logical collection configuration of a plurality of devices, and is not limited to a system in which a device of each configuration is accommodated within a single housing.

According to an embodiment of the present disclosure, a device and a method that realize highly accurate blooming correction for a one-shot type of wide dynamic range captured image are realized.

Specifically, an output pixel signal from the image sensor that outputs a high-sensitivity pixel signal and a low-sensitivity pixel signal is received, and blooming correction for the pixel signal is executed. The correction processing unit executes the pixel value correction of the input pixel according to the difference between or the ratio of the input pixel value from the image sensor and the ideal pixel value not affected by blooming. For example, a blooming amount corresponding to charge leakage from a pixel in the vicinity of the correction target pixel is estimated using the low-sensitivity pixel signal, and the estimated blooming amount is subtracted from the input pixel value. Specifically, the process of applying the mathematical model or the LUT is performed.

According to the configuration of the present disclosure, nonlinearity due to blooming is corrected by suppressing a blooming amount of a pixel suffering from blooming, thereby realizing correct color reproduction, accurately representing image gradation, and improving image quality.

BRIEF DESCRIPTION OF THE DRAWINGS

FIG. 39 is a diagram illustrating a technique of generating a pixel value through linear interpolation using a peripheral pixel in a signal generation process example in a signal generation unit;

FIG. 41 is a diagram illustrating a process of generating a low frequency signal through a process using a peripheral pixel of a noticed pixel in a high-sensitivity low-frequency signal generation unit and a low-sensitivity low-frequency signal generation unit;

DETAILED DESCRIPTION OF THE EMBODIMENTS

Figure 1:
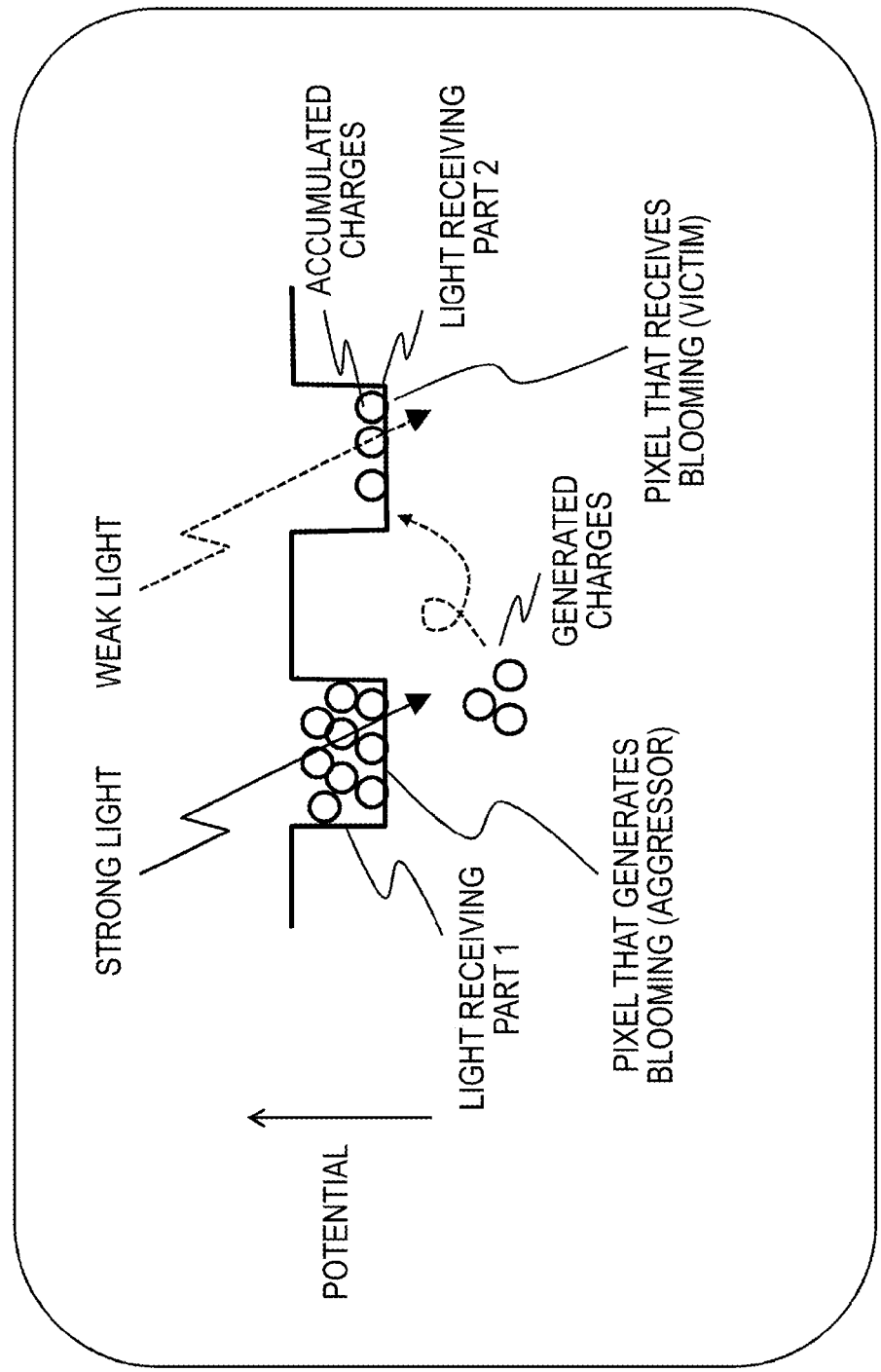
FIG. 1 is a diagram illustrating a blooming generation principle.
Figure 2:
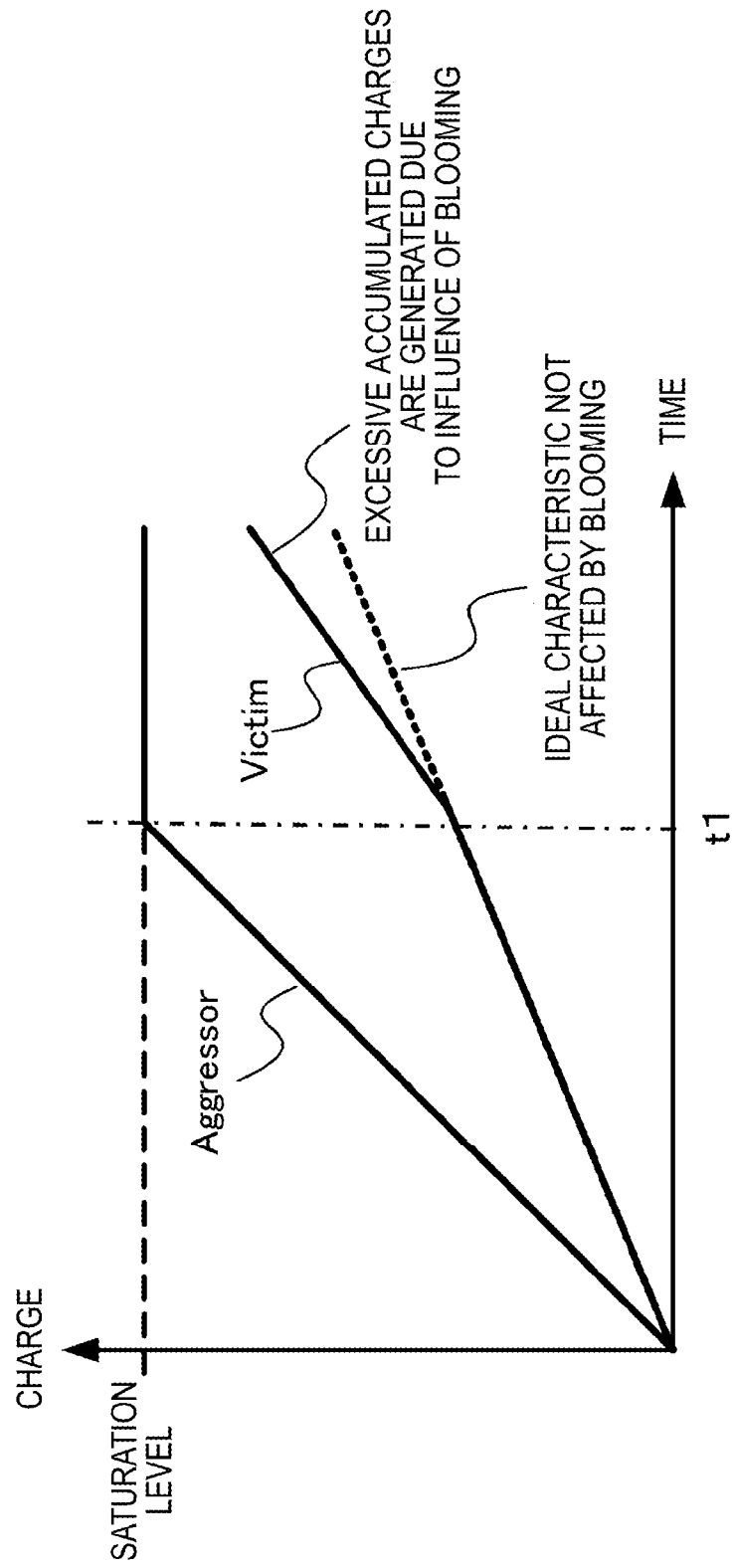
FIG. 2 is a diagram illustrating transitions of accumulated charges of an aggressor pixel and a victim pixel due to blooming.
Figure 3:
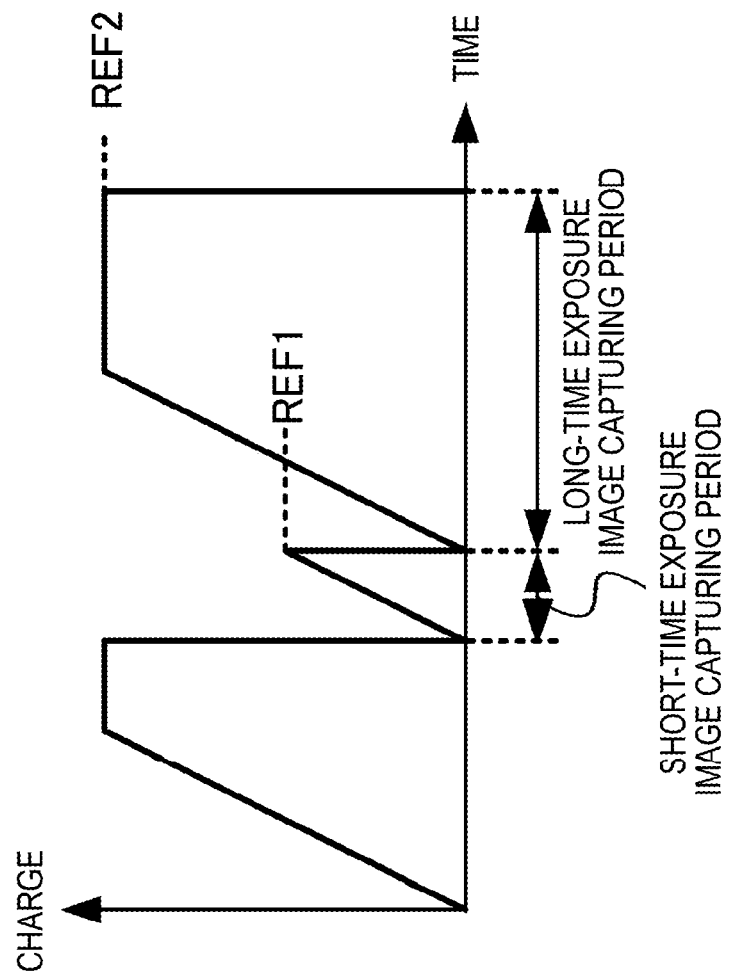
FIG. 3 is a diagram illustrating a process sequence in which a short-time exposure image (low-sensitivity image) whose exposure time is short and a long-time exposure image (high-sensitivity image) whose exposure time is long are alternately captured for each frame.
Figure 4:
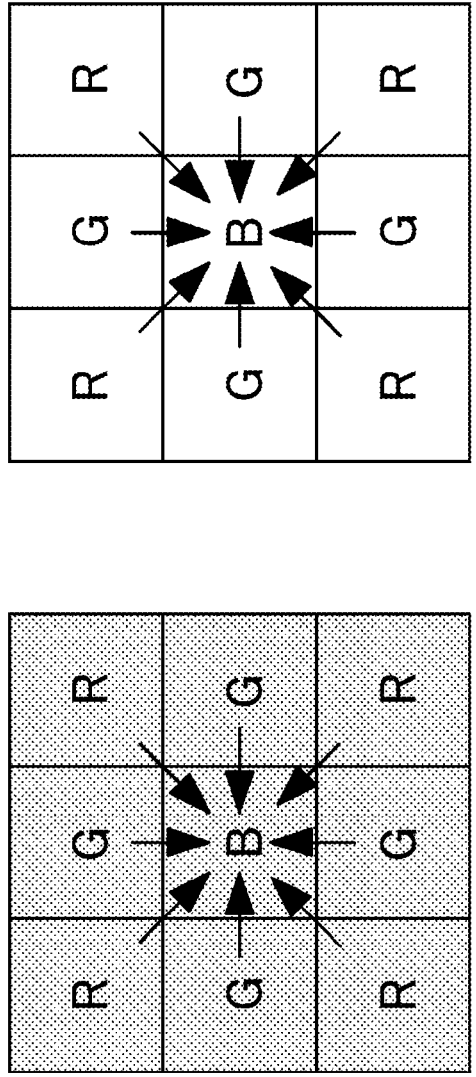
FIGS. 4A-B are diagrams illustrating a blooming correction process for a short-time exposure image and a long-time exposure image continuously captured by a multi-shot technique.
Figure 5:
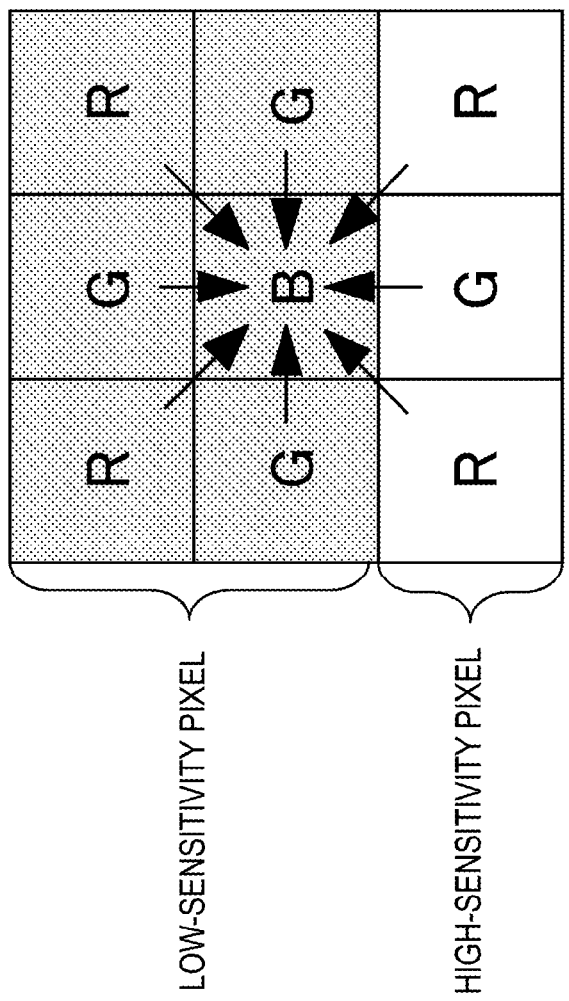
FIG. 5 is a diagram illustrating a blooming correction process in an image in which both a low-sensitivity pixel that is a short-time exposure pixel and a high-sensitivity pixel that is a long-time exposure pixel are present.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, an imaging device, an image processing method, and a program of the present disclosure will be described in detail with reference to the appended drawings. The description will be given according to the following items:

1. Process of Measuring Characteristic of Image Sensor
2. Example of Correction Process Using Mathematical Model for Blooming
   2-1. Blooming Amount LL from Long-Time Exposure Pixel to Long-Time Exposure Pixel
   2-2. Blooming Amount LS from Long-Time Exposure Pixel to Short-Time Exposure Pixel
   2-3. Blooming Amount SL from Short-Time Exposure Pixel to Long-Time Exposure Pixel
   2-4. Blooming Amount SS from Short-Time Exposure Pixel to Short-Time Exposure Pixel
3. Embodiment in which Interaction from Plurality of Blooming Generation Pixels is Considered
4. Embodiment of Blooming Correction Process
   4-1. Example of Basic Blooming Correction Process Using Mathematical Model
   4-2. Example of Blooming Correction Process in which Over-Correction Solution is Performed Using Mathematical Model
   4-3. Process Example in which Iterative Correction is Performed Using Mathematical Model
   4-4. Example of Correction Process based on Pre-Acquired Data such as LUT
   4-5. Blooming Correction Process Using Combination of Different Correction Techniques
   4-6. Example of Correction Process in which Solution to Over-Correction by Moving Subject or Edge is Performed
5. Configuration Example of Imaging Device
   5-1. Configuration Example 1 of Imaging Device
   5-2. Configuration Example 2 of Imaging Device
6. Other Embodiment: Correction of Image Based on Sensor Characteristic other than Blooming
7. Conclusion of Configuration of the Present Disclosure

[1. Process of Measuring Characteristic of Image Sensor]

In an embodiment of an imaging device of the present disclosure that will be described hereinafter, blooming correction is performed using a characteristic of an image sensor.

First, a process of measuring characteristic information of an image sensor will be described with reference to FIG. 6 and subsequent diagrams.

Figure 6:
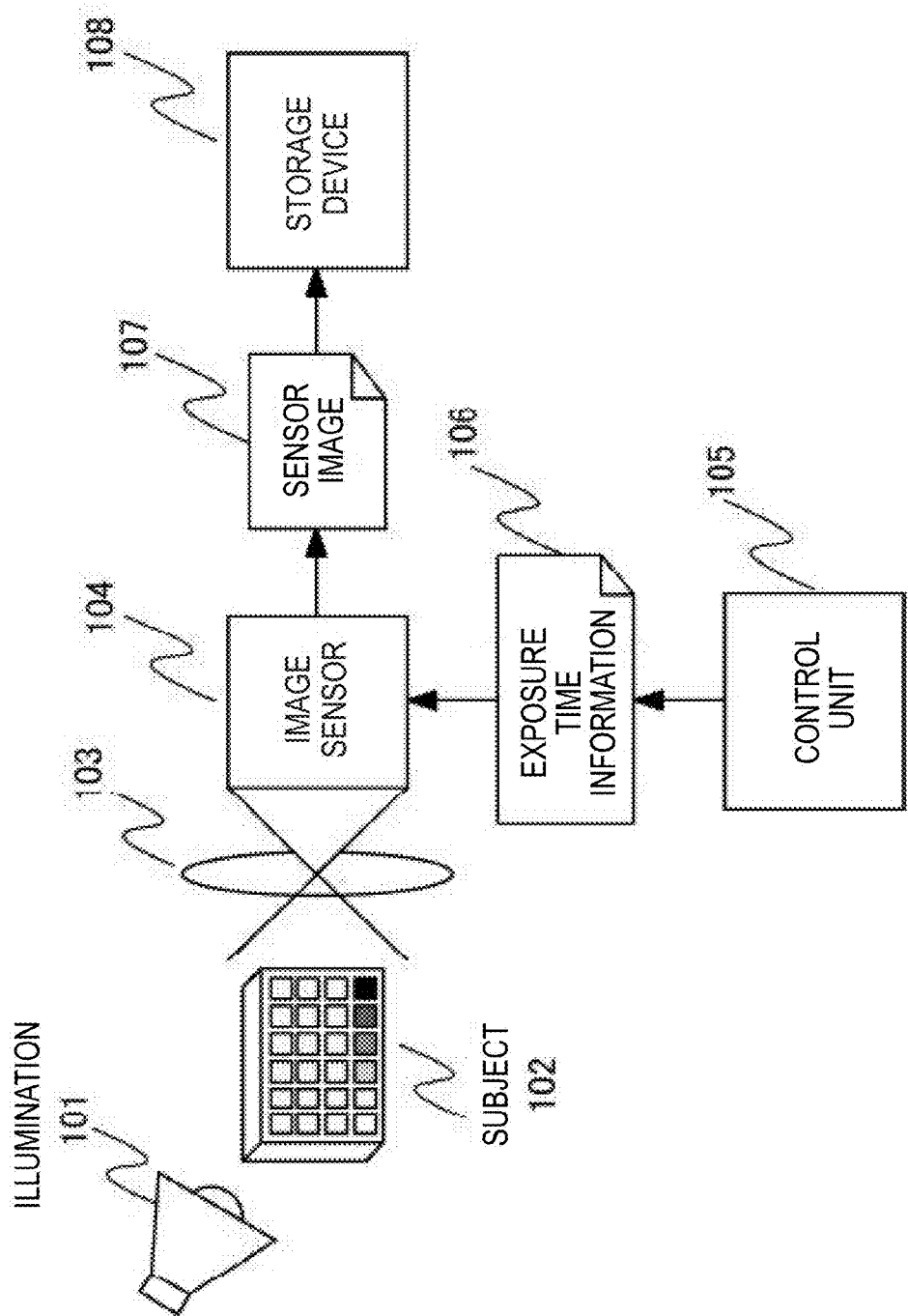
FIG. 6 is a diagram illustrating a process of measuring characteristic information in an image sensor.

FIG. 6 shows an example of a system configuration for performing measurement of the characteristic information of the image sensor.

A subject 102 that is a photography target is, for example, a test pattern in which various color or luminance areas are set. Specifically, for example, a Macbeth chart used in a color check process may be used.

An illumination 101 is irradiated to the subject 102 and an image is captured in an imaging device (camera) including an image sensor (image sensor) 104 for characteristic measurement.

Further, a camera capable of acquiring a RAW image may be applied as the device applied to the characteristic measurement shown in FIG. 6, but it is not essential that it have a configuration of a general camera. A base or device having a configuration capable of acquiring raw data of a sensor, which is an image sensor, may be applied.

If conditions, positions and the like of the illumination 101 and the subject 102 are fixed and the image sensor (image sensor) 104 is also under the same condition for photography, the same image can be acquired when noise is neglected.

The image sensor (image sensor) 104 is a sensor capable of photography by changing an exposure time for each pixel. The exposure time can be set in units of pixels based on exposure time information 106 that is control information generated by a control unit 105 shown in FIG. 6 and then the photography can be performed.

First, the photography is performed with the same exposure time for all the pixels.

A sensor image 107 is acquired as the control unit 105 changes a total exposure time of the image sensor 104 between a short exposure time and a long exposure time in detail, and sequentially recorded in a storage device 108.

Figure 7:
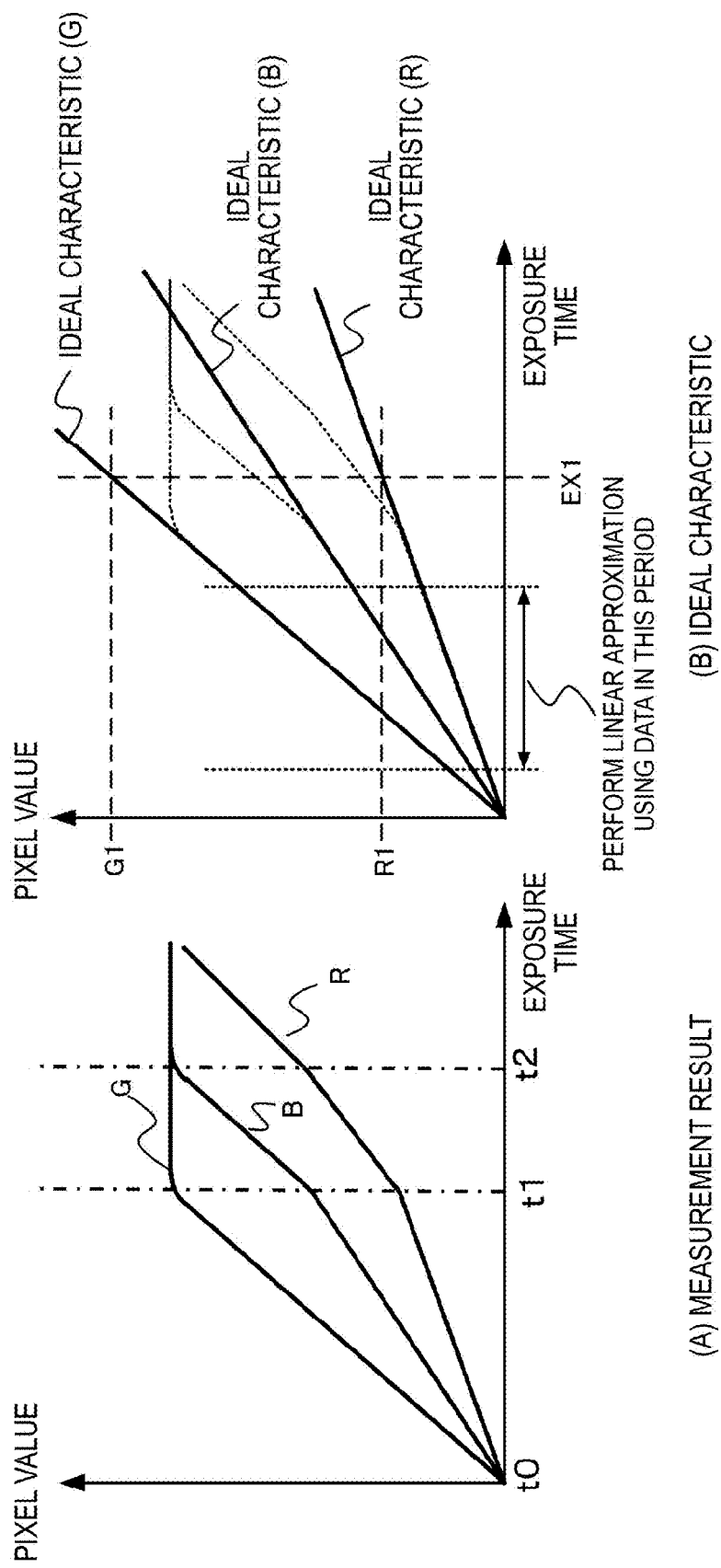
FIGS. 7A-B are diagrams illustrating characteristic information of the image sensor.

A measurement result in FIG. 7(A) shows changes in adjacent R, G and B pixel values in the sensor image 107 acquired while changing the exposure time.

In general, when there is no change in the subject, the exposure time and the pixel value have a proportional relationship.

However, when the exposure time is short, there is linearity, but when the exposure time is longer and a specific pixel approaches a saturation level, nonlinearity is generated, as shown in FIG. 7(A). This is nonlinearity due to saturation or blooming.

At a time t1, the G pixel is saturated, and blooming in which overflowing charges in the G pixel flow into the adjacent B and R pixels is generated due to this saturation. Due to this blooming, the linearity of the B pixel and the R pixel is broken. That is, an accumulated charge pace increases.

Further, at a time t2, the B pixel is saturated, and blooming in which overflowing charges in the B pixel flow into the adjacent R pixel is generated based on this saturation. Due to this blooming, the linearity of the R pixel is broken again and the accumulated charge pace further increases.

An ideal characteristic of FIG. 7(B) shows a result of linear regression using only data in a period (a time t0 to the time t1) in which there is the linearity in the measurement data of the FIG. 7(A). The linear regression is performed, for example, using a least-square method. Accordingly, ideal data [ideal characteristics] without pixel blooming can be acquired. For example, when the exposure time is EX1, an ideal pixel value of the R pixel can be obtained as R1 and an ideal pixel value of the G pixel can be obtained as G1.

In this exposure time EX1, for example, the B pixel and the R pixel are in a period in which the B pixel and the R pixel are affected by blooming, but an ideal characteristic (B) and an ideal characteristic (R) without the influence of blooming can be obtained. Similarly, the G pixel is saturated, but an ideal characteristic (G) when the saturation is neglected can be obtained.

Thus, the linear regression using the data in the period (the time t0 to the t1) in which there is linearity in the measurement data is performed to obtain the ideal data (ideal characteristic) that is data indicated by solid lines in FIG. 7(B).

The ideal characteristic is calculated according to a pixel arrangement pattern of the image sensor, and an exposure control pattern used for actual photography in the image sensor. It is preferable to apply an ideal characteristic with settings by which the arrangement pattern and the exposure control pattern match, to a captured image correction process.

Figure 8:
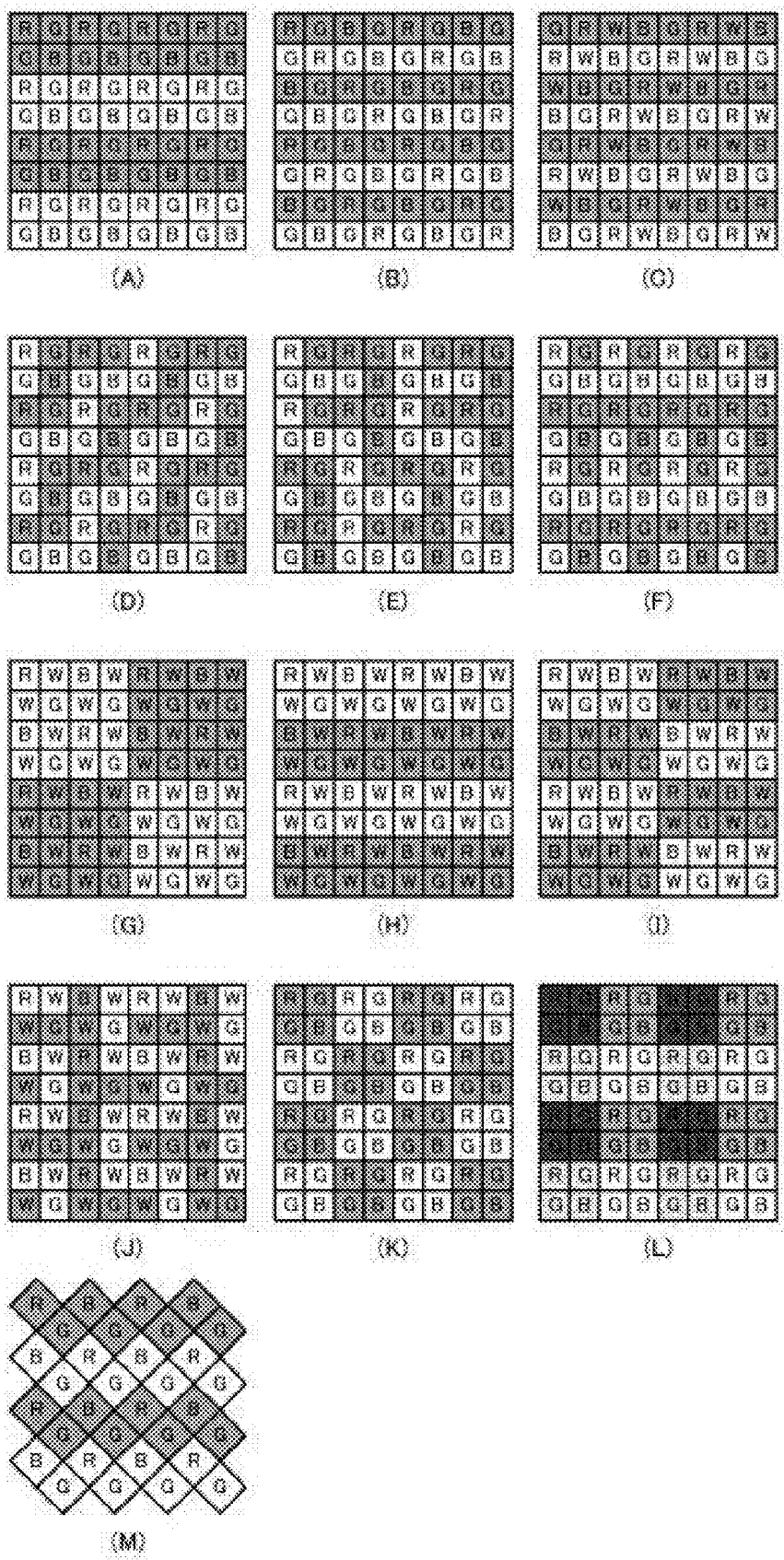
FIGS. 8A-M are diagrams illustrating an example of a pixel arrangement pattern and an exposure control pattern of the image sensor.

Further, an example of the pixel arrangement pattern and the exposure control pattern of the image sensor 104 is shown in FIG. 8.

In FIG. 8, 13 types of pixel arrangement patterns and exposure control patterns (A) to (M) are shown.

White pixels are long-time exposure pixels (high-sensitivity pixels) and gray pixels are short-time exposure pixels (low-sensitivity pixels).

For example, an ideal characteristic in a unit of each of the colors (R, G, B) or (R, G, B, W) is calculated for each of the patterns (A) to (M) shown in FIG. 8. The calculated ideal characteristic is stored in a storage unit of an image processing device or an imaging device that performs the blooming correction.

The blooming correction is performed as a correction process using the ideal characteristic, which is such ideal data, and actually measured data obtained in an actual photography process.

Specifically, the blooming correction is executed as a process of calculating the ideal data from the actually measured data.

For example, there are the following methods as concrete correction processing methods.

(a) A method of deriving a mathematical model for blooming and performing correction using an inverse function thereof, (b) a method of holding one-to-one correspondence data of actually measured data and ideal data as a table (LUT: Look Up Table) and performing correction by referencing the table, (c) a method of approximation and correction using only a representative point of the LUT, and (d) a correction method of combining and using the above methods.

For example, there are these methods.

There are several pixel arrangement or exposure control aspects of the image sensor 104, as described above with reference to FIG. 8, and a correspondence relationship between an ideal characteristic and actually measured data varies with such types. In the following embodiment, a process example using the image sensor 104 according to the pixel arrangement and the exposure control configuration shown in FIG. 8(A) will be described by way of example.

Further, for the pixel arrangements and an exposure control configurations other than that shown in FIG. 8(A), correspondence relationship data between the ideal characteristic and the actually measured data is only different, and a process of the present disclosure described below may be applied.

[2. Example of Correction Process Using Mathematical Model for Blooming]

First, an example of a correction process using a mathematical model for blooming will be described.

Derivation of a mathematical model for blooming and how to describe a blooming phenomenon most simply are shown.

Simple model: blooming from one pixel to the other pixel

Here, only blooming from one pixel (aggressor) to the other pixel (victim) is considered, and interaction or blooming from a plurality of pixels is not considered.

A wavelength of incident light, a temperature characteristic, or the like are considered as factors of variation of a blooming amount. However, such factors are not considered herein and a simple model is shown on the assumption that the factors are constant.

A type of generated blooming has a pattern according to the exposure time.

Figure 9:
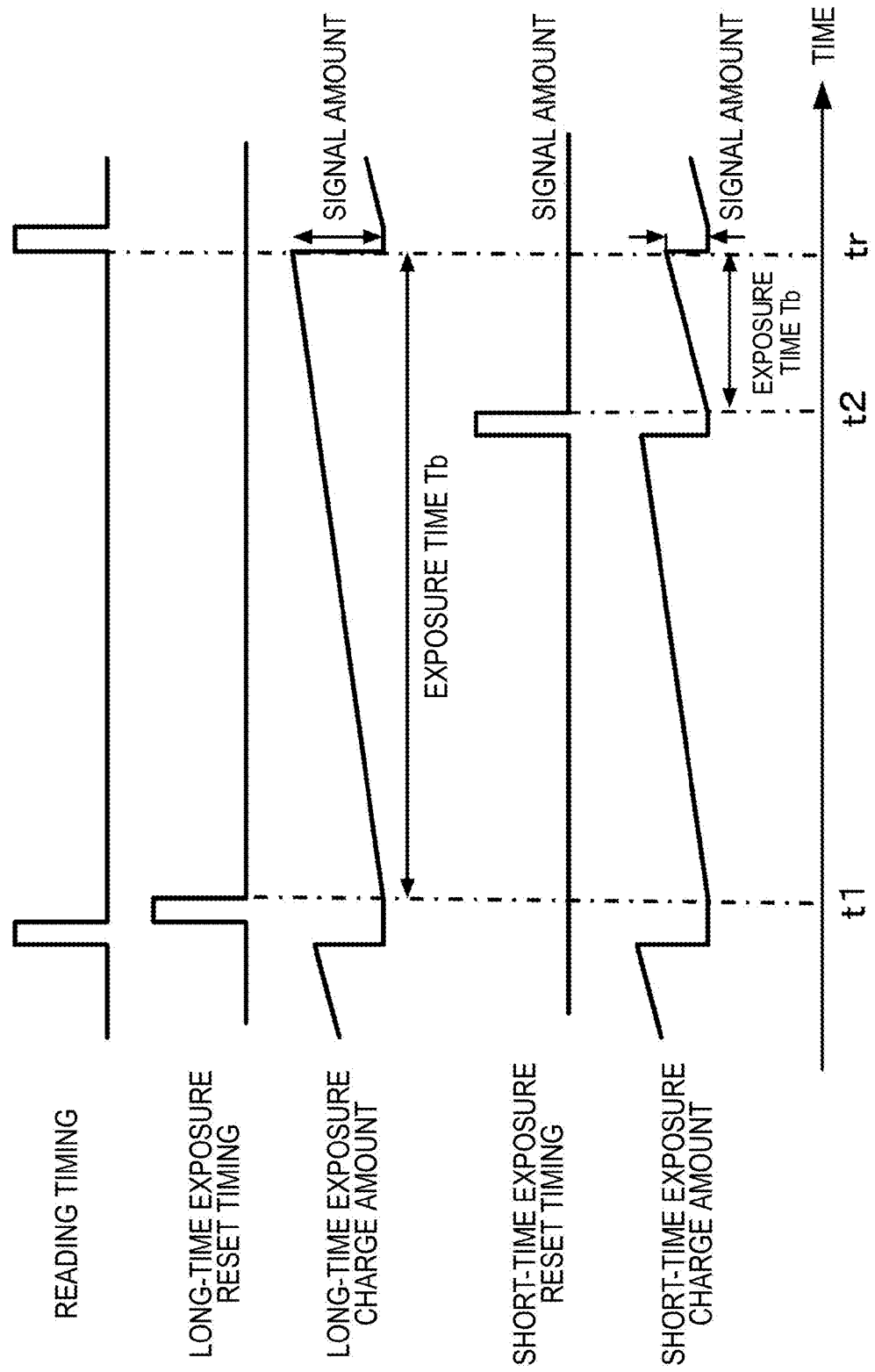
FIG. 9 is a diagram illustrating a charge accumulation sequence in long-time exposure and short-time exposure.

Further, a mathematical model for charge accumulation in long-time exposure and short-time exposure is introduced assuming a charge accumulation operation by which a photography process is accompanied as shown in FIG. 9.

FIG. 9 shows temporal transitions of:

(a) reading timing, (b) long-time exposure reset timing, (c) long-time exposure charge amount, (d) short-time exposure reset timing, and (e) short-time exposure charge amount.

For a long-time exposure pixel, charge accumulation is performed in the pixel from a long-time exposure reset timing t1, which is a charge accumulation start time, to a next reading timing tr (an exposure time tb), and a signal amount according to a charge amount is read as a pixel value.

For a short-time exposure pixel, charge accumulation is performed in the pixel from a short-time exposure reset timing t2, which is a charge accumulation start time, to the next reading timing tr (an exposure time td), and a signal amount according to a charge amount is read as a pixel value.

Further, charges are assumed to be accumulated before the short-time exposure reset timing.

For introduction of a mathematical model, respective parameters are defined as follows:

Ai: an ideal value when a blooming generation pixel (an aggressor pixel) is subjected to exposure by the time Tb (a value when saturation does not occur), As: a sensor output value of the aggressor pixel, Vi: an ideal value (not affected by blooming) when the blooming receiving pixel (a victim pixel) is subjected to exposure by the time Tb, Vs: a sensor output value of the victim pixel, Tb: an exposure time of high-sensitivity (long-time exposure), Td: an exposure time of low-sensitivity (short-time exposure), bth: a signal level at which the aggressor pixel generates blooming, brt: a blooming ratio from the aggressor pixel, and R: an exposure ratio Tb/Td of the long-time exposure pixel and the short-time exposure pixel.

In fact, bth (blooming generation signal level) and brt (blooming ratio) vary with a sensor characteristic, a temperature characteristic, or a wavelength of incident light, but are simply assumed herein to be parameters uniquely obtained by a sensor.

Hereinafter, examples of calculation equations of blooming amounts according to the following respective blooming aspects, that is, inflow charge amounts due to charge overflowing, will be described. The following four types of blooming amounts will be described with reference to FIGS. 10 to 13.

(1) A blooming amount LL from a long-time exposure pixel to a long-time exposure pixel, (2) a blooming amount LS from a long-time exposure pixel to a short-time exposure pixel, (3) a blooming amount SL from a short-time exposure pixel to a long-time exposure pixel, and (4) a blooming amount SS from a short-time exposure pixel to a short-time exposure pixel.

Further, hereinafter, a description will be given on the assumption that a pixel that generates blooming and causes charge overflowing is a blooming generation pixel (A: aggressor pixel), and a pixel into which overflowing charges from an adjacent pixel flow is a blooming receiving pixel (V: victim pixel).

[2-1. Blooming Amount LL from Long-Time Exposure Pixel to Long-Time Exposure Pixel]

First, a calculation equation of the blooming amount LL from a long-time exposure pixel to a long-time exposure pixel will be described with reference to FIG. 10.

Figure 10:
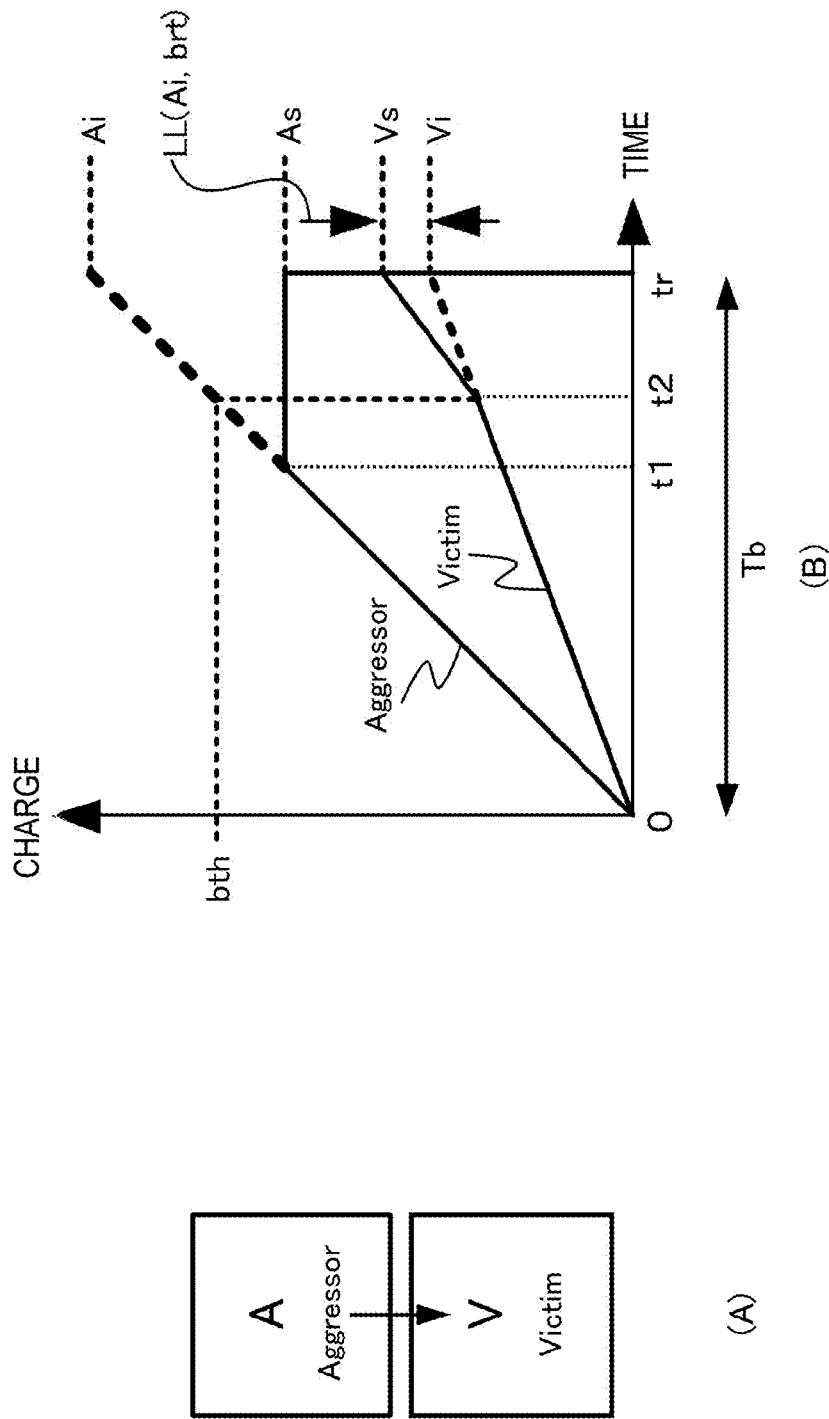
FIGS. 10A-B are diagrams illustrating an example of a process of calculating a blooming amount LL from a long-time exposure pixel to a long-time exposure pixel.

In an example shown in FIG. 10, a blooming generation pixel (A: aggressor pixel) is set as a long-time exposure pixel, and a blooming receiving pixel (V: victim pixel) is set as a long-time exposure pixel.

A horizontal axis indicates time and a vertical axis indicates an accumulated charge amount. Temporal transitions of accumulated charges in the respective pixels, that is, the blooming generation pixel (A: aggressor pixel), which is the long-time exposure pixel, and the blooming receiving pixel (V: victim pixel), which is a long-time exposure pixel, are shown.

A solid line indicates transition data of actually accumulated charges, and a dotted line indicates an ideal characteristic.

An exposure time is Tb and a blooming generation signal level is bth.

Further, the blooming generation signal level bth is higher than a saturation signal level.

At a time t1, the blooming generation pixel (A: aggressor pixel) is saturated, and blooming is generated at a time t2 at which a signal level of the ideal characteristic indicated by the dotted line becomes the blooming generation signal level bth. That is, charge overflowing and charge inflowing between the pixels start.

After the blooming generation timing of the time t2, the charge amount of the blooming receiving pixel (V: victim pixel) draws a straight line deviating from the ideal characteristic indicated by the dotted line.

A difference between an actual charge amount Vs of the blooming receiving pixel (V: victim pixel) and a charge amount Vi on an ideal characteristic of the blooming receiving pixel (V: victim pixel) in a final exposure end time tr is a blooming amount.

The blooming generation pixel (A: aggressor pixel) is a long-time exposure pixel, the blooming receiving pixel (V: victim pixel) is a long-time exposure pixel, and the blooming amount LL between the long-time exposure pixels is calculated as follows.

First, when a blooming amount brt calculated based on the ideal characteristic Ai of the blooming generation pixel (A: aggressor pixel) is LL(Ai, brt), a relational equation between the actual charge amount Vs of the blooming receiving pixel (V: victim pixel) and the charge amount Vi on the ideal characteristic of the blooming receiving pixel (V: victim pixel) in the final exposure end time tr becomes the following relational equation (Equation 1):

$$Vs = Vi + LL(Ai, brt) \qquad \text{(Equation 1)}$$

Further, when the blooming amount brt in an exposure time X=0~tr is LL(X, brt), a calculation equation of the blooming amount LL(X, brt) is shown as the following (Equation 2).

$$LL(X, brt) = \begin{cases} 0, & (X < bth) \\ (X - bth) \times brt, & (\text{otherwise}) \end{cases} \qquad \text{(Equation 2)}$$

[2-2. Blooming Amount LS from Long-Time Exposure Pixel to Short-Time Exposure Pixel]

Next, a calculation equation for a blooming amount LS from a long-time exposure pixel to a short-time exposure pixel will be described with reference to FIG. 11.

Figure 11:
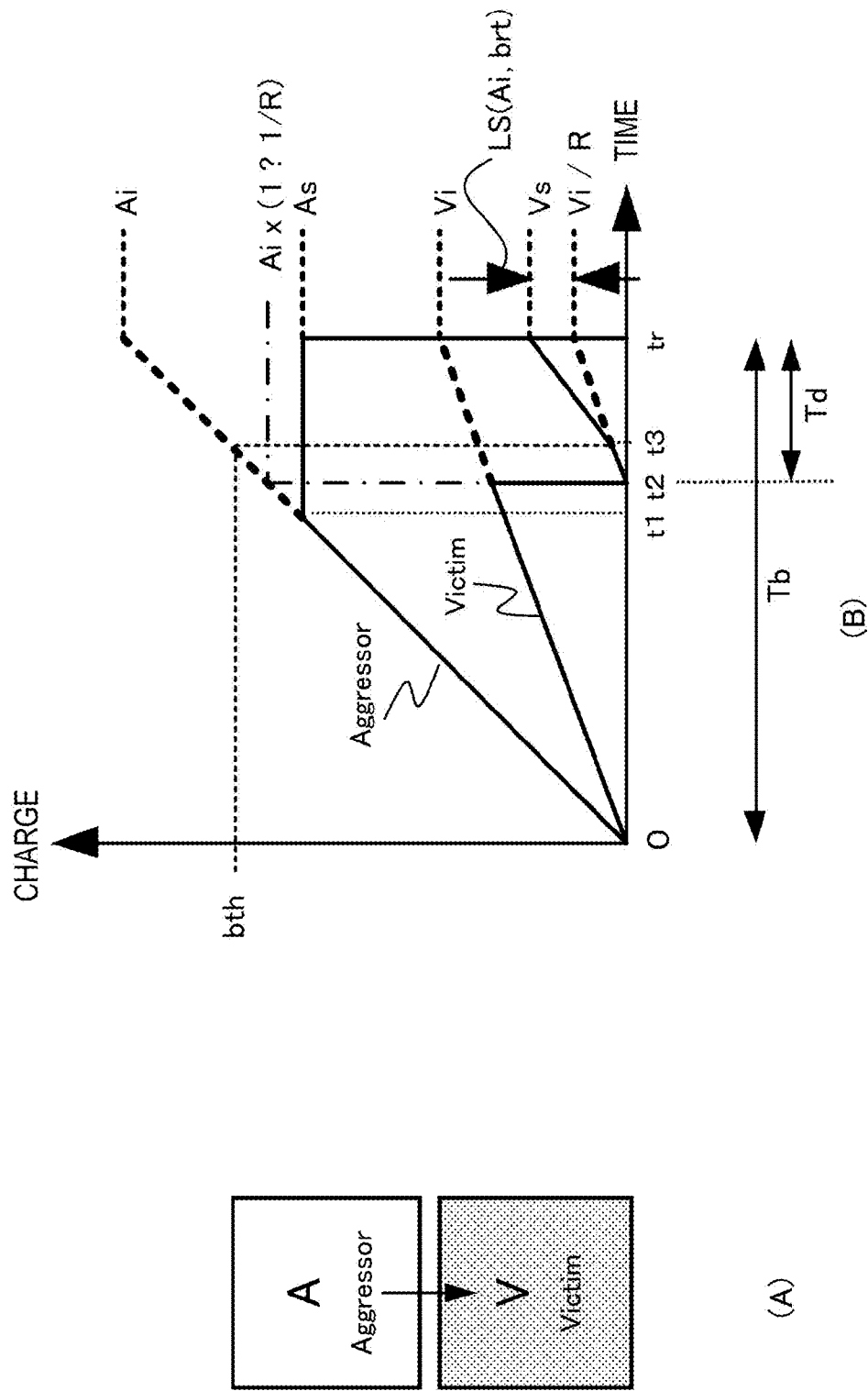
FIGS. 11A-B are diagrams illustrating an example of a process of calculating a blooming amount LS from a long-time exposure pixel to a short-time exposure pixel.

In an example shown in FIG. 11, the blooming generation pixel (A: aggressor pixel) is set as a long-time exposure pixel, and the blooming receiving pixel (V: victim pixel) is set as a short-time exposure pixel.

A horizontal axis indicates time and a vertical axis indicates an accumulated charge amount. Temporal transitions of accumulated charges of respective pixels, that is, the blooming generation pixel (A: aggressor pixel), which is the long-time exposure pixel, and the blooming receiving pixel (V: victim pixel), which is a short-time exposure pixel, are shown.

A solid line indicates transition data of actually accumulated charges, and a dotted line indicates an ideal characteristic.

The blooming receiving pixel (V: victim pixel), which is a short-time exposure pixel, is reset at a time t2, and a charge accumulation amount after the time t2 is an output pixel value Vs.

Two lines that become Vi and Vi/R at a time Tr are shown as dotted lines according to the ideal characteristic of the blooming receiving pixel (V: victim pixel).

The line that becomes Vi at the time tr is the ideal characteristic line when the charge accumulation is executed continuously from a time 0.

Meanwhile, the line that becomes Vi/R at the time tr is an ideal characteristic line when the exposure is executed from a time t2.

R denotes an exposure ratio Tb/Td of the long-time exposure pixel and the short-time exposure pixel.

The exposure time of the long-time exposure pixel is Tb, and the exposure time of the short-time exposure pixel is Td. A blooming generation signal level is bth.

The blooming generation pixel (A: aggressor pixel) that is the long-time exposure pixel is saturated at a time t1, and blooming is generated at a time t3 at which a signal level of the ideal characteristic indicated by the dotted line becomes the blooming generation signal level bth. That is, charge overflowing and charge inflow between the pixels start.

Further, the charge accumulation of the blooming receiving pixel (V: victim pixel), which is the short-time exposure pixel, is set to start in the time t2 between the time t1 and the time t3.

In the case of the blooming receiving pixel (V: victim pixel) that is the short-time exposure pixel, the charge accumulation not affected by blooming is executed between the time t2 and the time t3.

However, after the blooming generation timing of the time t3, the charge amount of the blooming receiving pixel (V: victim pixel) draws a straight line deviated from the ideal characteristic indicated by the dotted line.

In a final exposure end time tr, a difference between the actual charge amount Vs of the blooming receiving pixel (V: victim pixel) and the charge amount Vi/R on the ideal characteristic of the blooming receiving pixel (V: victim pixel) is the blooming amount.

The blooming generation pixel (A: aggressor pixel) is the long-time exposure pixel, and the blooming receiving pixel (V: victim pixel) is the short-time exposure pixel. The blooming amount LS from the long-time exposure pixel to the short-time exposure pixel is calculated as follows.

First, when a blooming amount brt calculated based on the ideal characteristic Ai of the blooming generation pixel (A: aggressor pixel) is LS(Ai, brt), a relational equation of the actual charge amount Vs of the blooming receiving pixel (V: victim pixel) and the charge amount Vi/R on the ideal characteristic of the blooming receiving pixel (V: victim pixel) in the final exposure end time tr becomes the following relational equation (Equation 3).

$$Vs = \frac{Vi}{R} + LS(Ai, brt) \quad \text{(Equation 3)}$$

Further, when the blooming amount brt in an exposure time X=0~tr is LS(X, brt), a calculation equation of the blooming amount LS(X, brt) is shown as the following Equation 4:

$$LS(X, brt) = \begin{cases} 0, (X < bth) & \text{(Equation 4)} \\ (X - bth) \times brt, \left(X \times \left(1 - \frac{1}{R}\right) < bth\right) \\ \frac{X}{R} \times brt, \text{(otherwise)} \end{cases}$$

[2-3. Blooming Amount SL from Short-Time Exposure Pixel to Long-Time Exposure Pixel]

Next, a calculation equation for a blooming amount SL from a short-time exposure pixel to a long-time exposure pixel will be described with reference to FIG. 12.

Figure 12:
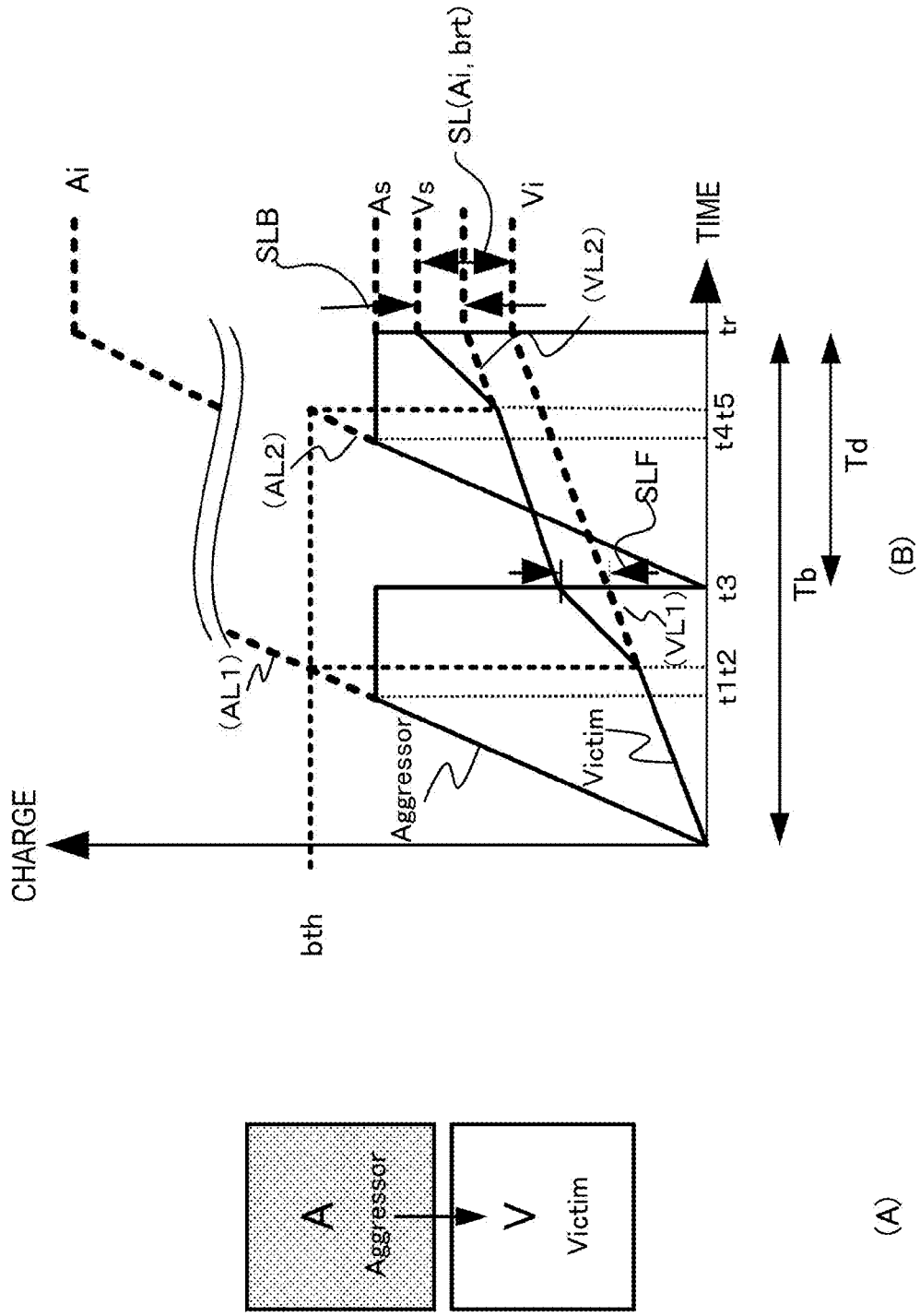
FIGS. 12A-B are diagrams illustrating an example of a process of calculating a blooming amount SL from a short-time exposure pixel to a long-time exposure pixel.

In an example shown in FIG. 12, a blooming generation pixel (A: aggressor pixel) is set as the short-time exposure pixel and a blooming receiving pixel (V: victim pixel) is set as the long-time exposure pixel.

A horizontal axis indicates time and a vertical axis indicates an accumulated charge amount. Temporal transitions of accumulated charges of the respective pixels, that is, the blooming generation pixel (A: aggressor pixel) that is the short-time exposure pixel and the blooming receiving pixel (V: victim pixel) that is the long-time exposure pixel, are shown.

A solid line denotes transition data of actually accumulated charges, and a dotted line denotes an ideal characteristic.

The blooming generation pixel (A: aggressor pixel), which is the short-time exposure pixel, is reset at a time t3 and a charge accumulation amount after the time t3 is an output pixel value Vs.

Dotted lines according to an ideal characteristic of the blooming receiving pixel (V: victim pixel) show lines that become Vi and Vi/R at the time tr.

The line that becomes Vi at the time tr indicates an ideal characteristic line when the charge accumulation is executed continuously from a time 0.

Meanwhile, the line that becomes Vi/R at the time tr is an ideal characteristic line when the exposure is executed from a time t2.

R denotes an exposure ratio Tb/Td of the long-time exposure pixel and the short-time exposure pixel.

The exposure time of the long-time exposure pixel is Tb and the exposure time of the short-time exposure pixel is Td. The blooming generation signal level is bth.

The blooming generation pixel (A: aggressor pixel) that is the short-time exposure pixel is saturated at a time t1, and blooming is generated at a time t2 at which a signal level of the ideal characteristic indicated by the dotted line AL1 becomes the blooming generation signal level bth. That is, charge overflowing and charge inflowing between the pixels start.

Further, a charge accumulation process based on a process of photographing the blooming generation pixel (A: aggressor pixel) that is the short-time exposure pixel is executed in an exposure time td between the time t3 and the time tr, and charges accumulated in the short-time exposure pixel by the exposure between the time 0 and the time t3 are charges reset at a photography start time t3.

An example in which blooming is generated due to the charges that are a reset target is shown.

In the blooming receiving pixel (V: victim pixel) that is the long-time exposure pixel, charge accumulation not affected by blooming is executed between the time 0 and the time t2.

However, after the blooming generation timing of the time t2, the charge amount of the blooming receiving pixel (V: victim pixel) draws a straight line deviating from the ideal characteristic indicated by the dotted line VL1.

Then, at the time t3, a reset process is performed for the blooming generation pixel (A: aggressor pixel) that is the short-time exposure pixel, and the exposure process of the exposure time td according to photography of a subject starts.

At a time when the exposure process starts, charges accumulated in the short-time exposure pixel is reset and charge accumulation according to a subject luminance is newly start. Accordingly, charge overflowing stops. That is, the blooming generation stops.

However, at the time t3, blooming charges of an amount corresponding to a difference SLF between the ideal characteristic line VL1 shown in FIG. 12 and the real charge line indicated by the solid line have been already accumulated as excess charges related to subject luminance in the blooming receiving pixel (V: victim pixel) that is the long-time exposure pixel.

Further, in the exposure time td of the blooming generation pixel (A: aggressor pixel), which is the short-time exposure pixel, after the time t3, the short-time exposure pixel is again saturated at a time t4, and the blooming is generated at a time t5 at which the signal level of the ideal characteristic indicated by the dotted line AL2 becomes the blooming generation signal level bth. That is, charge overflowing and charge inflowing between the pixels are generated again.

The blooming receiving pixel (V: victim pixel) that is the long-time exposure pixel draws a straight line deviating from the ideal characteristic indicated by the dotted line VL2 after the time t5. The blooming amount after this time t5 is SLB shown in FIG. 12.

A difference between an actual charge amount Vs of the blooming receiving pixel (V: victim pixel) and a charge amount Vi on the ideal characteristic of the blooming receiving pixel (V: victim pixel) in a final exposure end time tr is a blooming amount.

The final blooming amount corresponds to a sum of SLA and SLB.

The blooming generation pixel (A: aggressor pixel) is the short-time exposure pixel, and the blooming receiving pixel (V: victim pixel) is the long-time exposure pixel. The blooming amount SL from the short-time exposure pixel to the long-time exposure pixel is calculated as follows:

First, when a blooming amount brt calculated based on the ideal characteristic Ai of the blooming generation pixel (A: aggressor pixel) is SL(Ai, brt), a relational equation of the actual charge amount Vs of the blooming receiving pixel (V: victim pixel) and the charge amount Vi on the ideal characteristic of the blooming receiving pixel (V: victim pixel) in the final exposure end time tr becomes the following relational equation (Equation 5):

$$Vs = Vi + SL(Ai, brt) \quad \text{(Equation 5)}$$

Further, when the blooming amount brt is SL(X, brt) in exposure time: X=0 to tr, a calculation equation of blooming amount SL(X, brt) is shown as the following equation 6.

$$SL(X, brt) = SLF(X, brt) + SLB(X, brt)$$

However, $$SLF(X, brt) = \begin{cases} 0, & \left(X \times \left(1 - \frac{1}{R}\right) < bth\right) \\ \left(X \times \left(1 - \frac{1}{R}\right) - bth\right) \times brt, & \text{(otherwise)} \end{cases} \quad \text{(Equation 6)}$$

$$SLB(X, brt) = \begin{cases} 0, & \left(\frac{X}{R} < bth\right) \\ \left(\frac{X}{R} - bth\right) \times brt, & \text{(otherwise)} \end{cases}$$

[2-4. Blooming Amount SS from Short-Time Exposure Pixel to Short-Time Exposure Pixel]

Next, a calculation equation of the blooming amount SS from a short-time exposure pixel to a short-time exposure pixel will be described with reference to FIG. 13.

Figure 13:
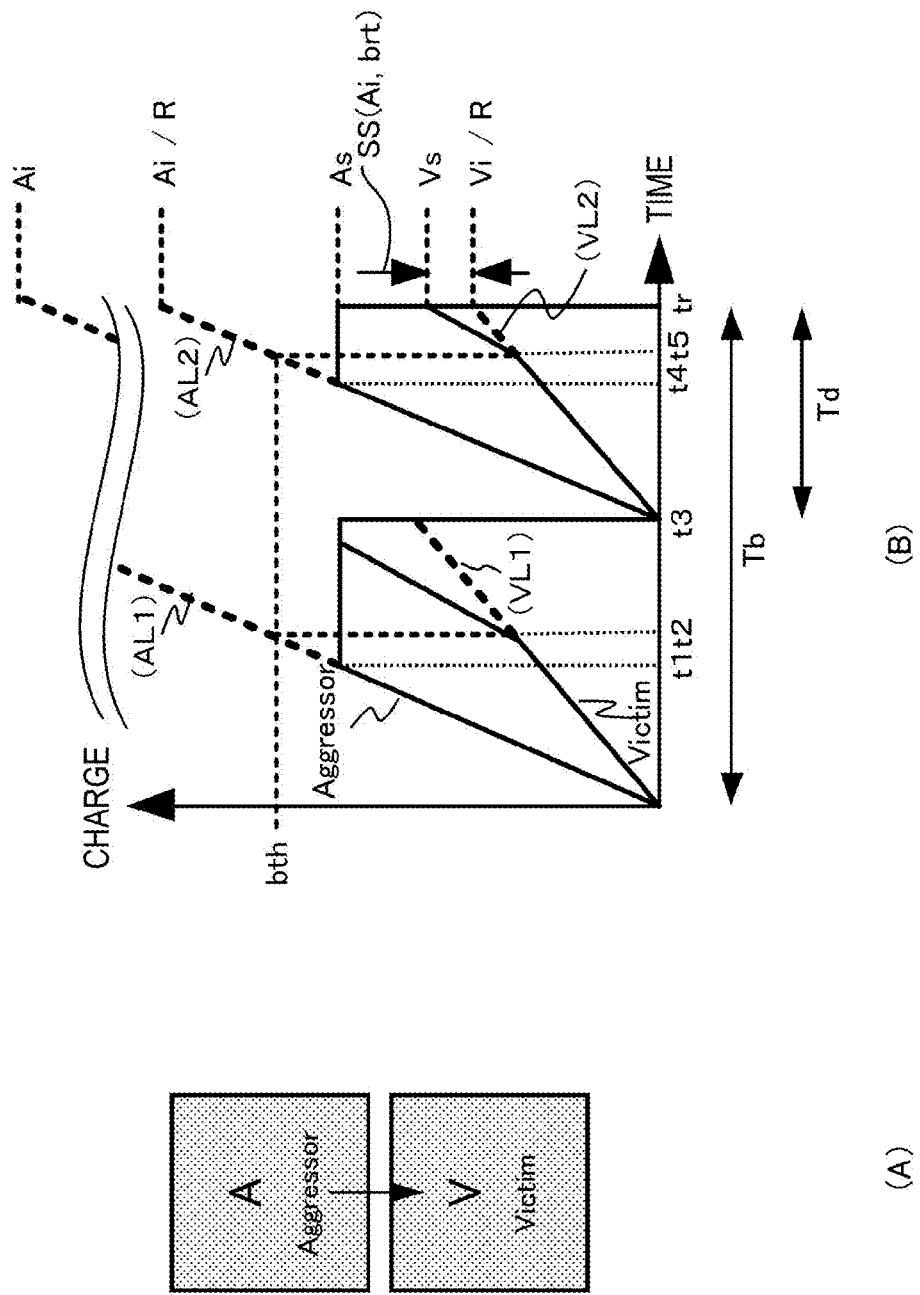
FIGS. 13A-B are diagrams illustrating an example of a process of calculating a blooming amount SS from a short-time exposure pixel to a short-time exposure pixel.

In the example shown in FIG. 13, the blooming generation pixel (A: aggressor pixel) is set as a short-time exposure pixel, and the blooming receiving pixel (V: victim pixel) is set as a short-time exposure pixel.

A horizontal axis indicates time, and a vertical axis indicates an accumulated charge amount. Temporal transitions of accumulated charges of the respective pixels, that is, the blooming generation pixel (A: aggressor pixel), which is the short-time exposure pixel, and the blooming receiving pixel (V: victim pixel), which is the short-time exposure pixel, are shown.

A solid line is transition data of actually accumulated charges, and a dotted line is an ideal characteristic.

The blooming generation pixel (A: aggressor pixel) that is the short-time exposure pixel and the blooming receiving pixel (V: victim pixel) that is the short-time exposure pixel are also reset at a time t3, and a charge accumulation amount after the time t3 is an output pixel value (As, Vs).

An exposure time of the long-time exposure pixel is Tb and an exposure time of the short-time exposure pixel is Td. A blooming generation signal level is bth.

At a time t1, the blooming generation pixel (A: aggressor pixel) that is the short-time exposure pixel is saturated, and blooming is generated at a time t2 at which a signal level of the ideal characteristic indicated by the dotted line AL1 becomes the blooming generation signal level bth. That is, charge overflowing and charge inflowing between the pixels start.

Further, a charge accumulation process based on a photography process of the blooming generation pixel (A: aggressor pixel) that is the short-time exposure pixel is executed in an exposure time td between the time t3 and the time tr, and charges accumulated in the short-time exposure pixel by the exposure between the time 0 and the time t3 are charges reset at a photography start time t3.

An example in which blooming is generated by charges that are the reset target is shown.

In the blooming receiving pixel (V: victim pixel) that is the short-time exposure pixel, charge accumulation not affected by blooming is executed between a time 0 and the time t2.

However, after the blooming generation timing of the time t2, the charge amount of the blooming receiving pixel (V: victim pixel) draws a straight line deviating from the ideal characteristic indicated by the dotted line VL1.

Then, at the time t3, a reset process is performed for the blooming generation pixel (A: aggressor pixel), which is the short-time exposure pixel, and the blooming receiving pixel (V: victim pixel), and an exposure process of an exposure time td according to photography of a subject starts.

At a time when the exposure process starts, charges accumulated in the short-time exposure pixel are reset and charge accumulation according to subject luminance newly starts. Accordingly, charge overflowing stops. That is, the blooming generation stops.

However, at this exposure time td, the blooming generation pixel (A: aggressor pixel) that is the short-time exposure pixel is saturated again at the time t4, and blooming is generated at a time t5 at which a signal level of the ideal characteristic indicated by a dotted line AL2 becomes a blooming generation signal level bth. That is, the charge overflowing and the charge inflowing between the pixels occur again.

The blooming receiving pixel (V: victim pixel) that is the short-time exposure pixel draws a straight line deviating from the ideal characteristic indicated by the dotted line VL2 after the time t5.

In the final exposure end time tr, a difference between an actual charge amount Vs of the blooming receiving pixel (V: victim pixel) and a charge amount Vi/R on the ideal characteristic of the blooming receiving pixel (V: victim pixel) is a blooming amount.

The blooming generation pixel (A: aggressor pixel) is the short-time exposure pixel and the blooming receiving pixel (V: victim pixel) is the short-time exposure pixel. The blooming amount SS between the short-time exposure pixels is calculated as follows.

First, when a blooming amount brt calculated based on the ideal characteristic Ai of the blooming generation pixel (A: aggressor pixel) is SS(Ai, brt), a relational equation of the actual charge amount Vs of the blooming receiving pixel (V: victim pixel) and the charge amount Vi on the ideal characteristic of the blooming receiving pixel (V: victim pixel) in the final exposure end time tr have the following relational equation (Equation 5):

$$Vs = \frac{Vi}{R} + SS(Ai, brt) \quad \text{(Equation 7)}$$

Further, when the blooming amount brt in an exposure time X=0~tr is SS(X, brt), a calculation equation of the blooming amount SS(X, brt) is shown as the following equation 8:

$$SS(X, brt) = \begin{cases} 0, & \left(\frac{X}{R} < bth\right) \\ \left(\frac{X}{R} - bth\right) \times brt, & \text{(otherwise)} \end{cases} \quad \text{(Equation 8)}$$

The mathematical model for blooming when the pixels having different exposure times are adjacent has been shown above. This mathematical model is only an example of applying the mathematical model, for example, in a specific sensor driving scheme such as the sensor driving scheme shown in FIG. 9, but the process of calculating a blooming amount may be set corresponding to various other sensor driving schemes.

For example, a setting of a mathematical model corresponding to a sensor driving scheme shown in FIG. 14 different from the sensor driving scheme shown in FIG. 9 described above will be described.

Figure 14:
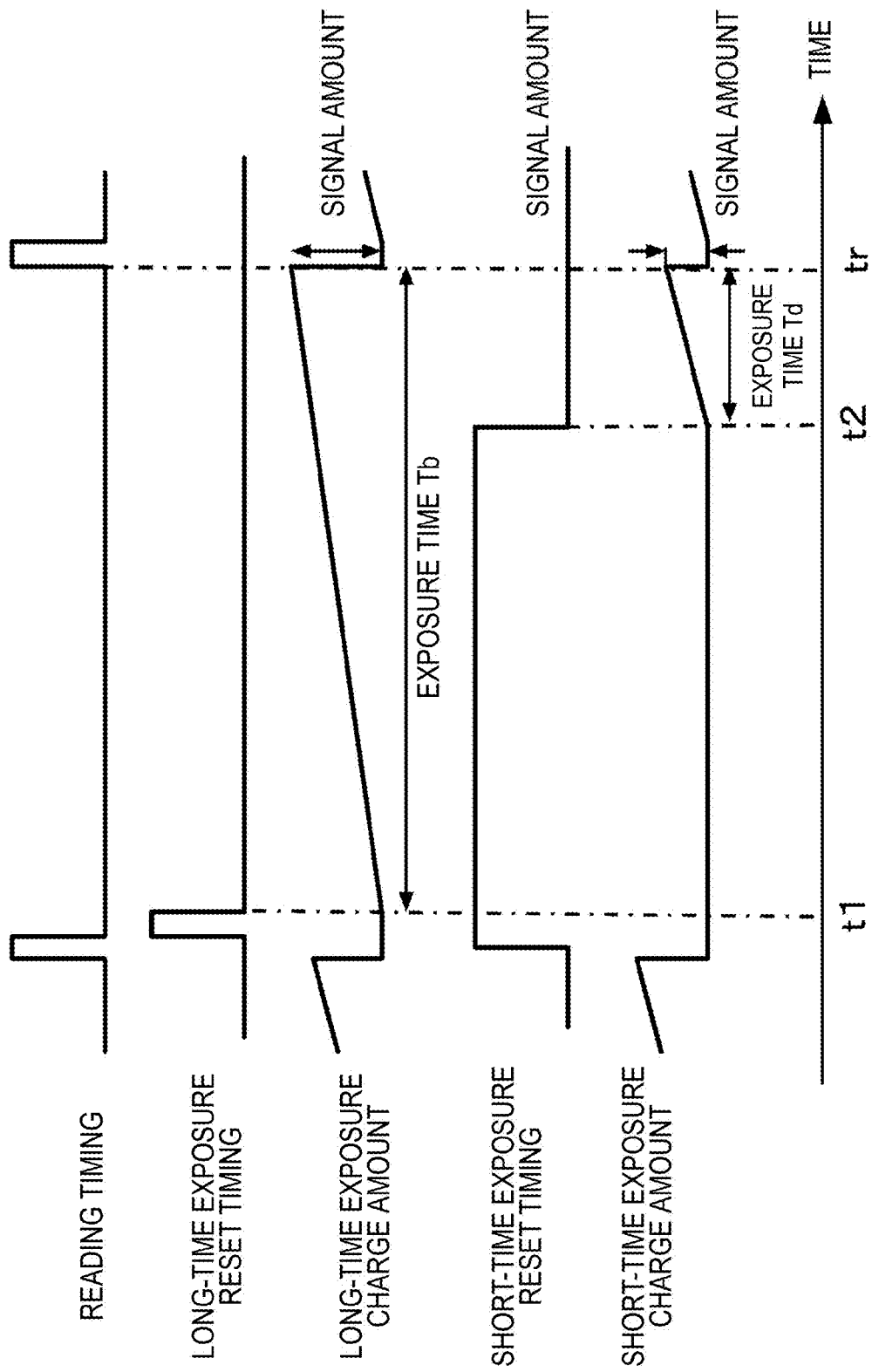
FIG. 14 is a diagram illustrating a charge accumulation sequence in long-time exposure and short-time exposure.

In the sensor driving scheme shown in FIG. 14, reset is always performed until the short-time exposure pixel starts the exposure, such that the charges are not accumulated, that is, blooming does not occur. The mathematical model in this driving scheme corresponds to replacement with:

$$SLF(X, brt) = 0$$

in the calculation equation (Equation 6) of the blooming amount SL(X, brt) described above.

Further, even existing blooming between pixels whose exposure times are the same and whose sensitivities are different is included in Equation 1 described above. Accordingly, a mathematical model for blooming for a sensor including pixels whose exposure time is constant and whose sensitivity differs rather than whose sensitivity differs in the exposure time can be calculated.

[3. Embodiment in which Interaction from Plurality of Blooming Generation Pixels is Considered]

In the above-described embodiment, the example of the process of calculating a blooming charge amount in the model simplified with the setting by which the number of the blooming generation pixels (aggressor pixels) is 1 and the number of the blooming receiving pixels (victim pixels) is 1 has been described.

However, in fact, respective pixels constituting the image sensor may become the blooming generation pixels (aggressor pixels), which generate blooming, or the blooming receiving pixels (victim pixels).

Modeling of such a complex configuration is difficult, but the model is approximately set, as will be described below.

Figure 15:
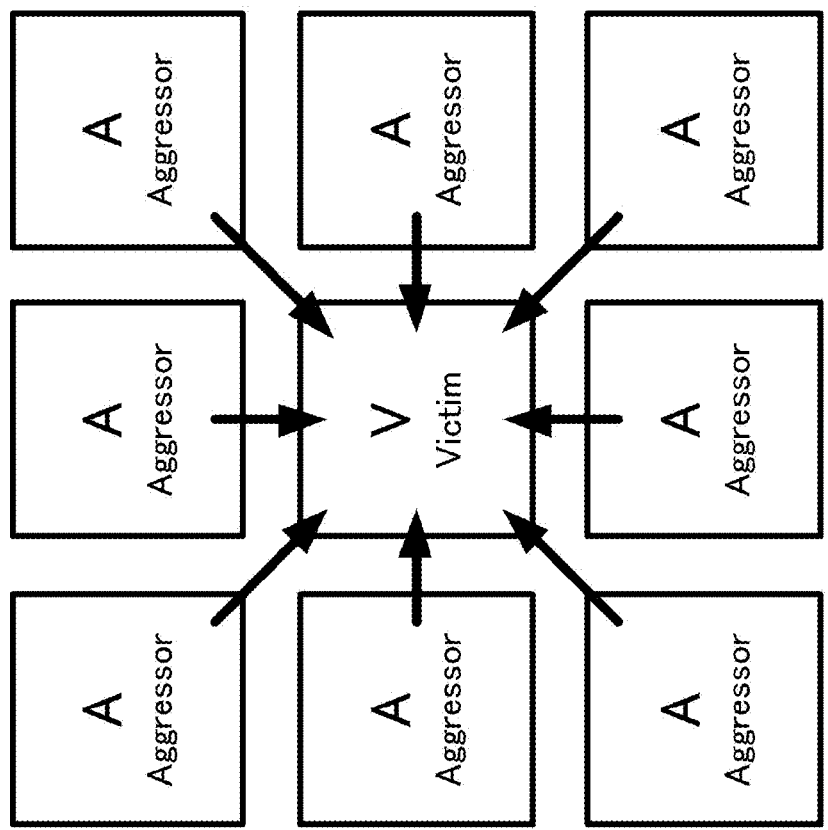
FIG. 15 is a diagram illustrating that 8 pixels in vertical, horizontal and diagonal directions becomes blooming generation pixels (aggressor pixels) for a blooming receiving pixel (V: victim pixel)

In FIG. 15, a 3×3 pixel area is shown. A noticed pixel is a center pixel, which is assumed to be the blooming receiving pixel (V: victim pixel).

With respect to the blooming receiving pixel (V: victim pixel), 8 pixels in vertical, horizontal and diagonal directions are likely to become blooming generation pixels (aggressor pixels), and the blooming receiving pixel is affected by the 8 pixels.

In general, the ratio (the above-described brt) of the blooming in the diagonal direction becomes smaller than that of the blooming in the vertical and horizontal directions. Hereinafter, in the case of a pixel arrangement and an exposure control setting shown in FIG. 16, influence of blooming of each pixel with sensitivity and color will be described.

Figure 16:
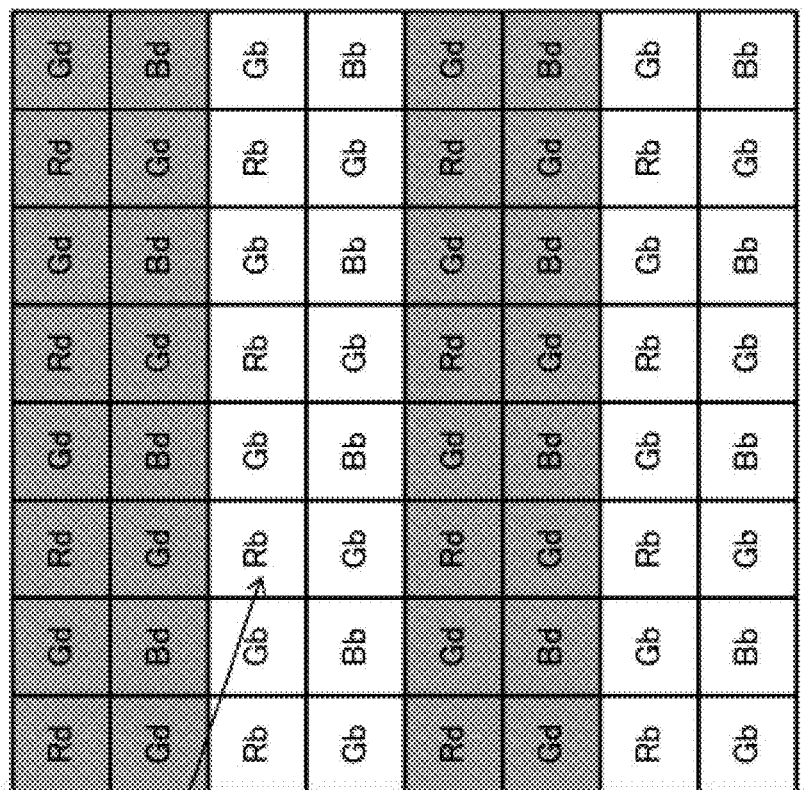
FIG. 16 is a diagram illustrating an example of a pixel arrangement and exposure control setting of the image sensor.

In the pixel arrangement shown in FIG. 16, white pixels are long-time exposure pixels (high-sensitivity pixels) and gray pixels are short-time exposure pixels (low-sensitivity pixels).

Specifically, notations are as follows:
Rb: a red, high-sensitivity pixel (long-time exposure pixel)
Gb: a green, high-sensitivity pixel
Bb: a blue, high-sensitivity pixel
Rd: a red, low-sensitivity pixel (short-time exposure pixel)
Gd: a green, low-sensitivity pixel
Bd: a blue, low-sensitivity pixel Further, ideal pixel values of respective pixels, that is, pixel values of the respective RGB pixels when there is no blooming generation, are indicated as follows:
Ri: an ideal value of Rb (having linearity without saturation or blooming),
Gi: an ideal value of Gb (having linearity without saturation or blooming), and
Bi: an ideal value of Bb (having linearity without saturation or blooming).

In the above setting, if noise is neglected in a situation in which there is no saturation or blooming, pixel values of the respective pixels becomes the following pixel values:

Rb=Ri,

Gb=Gi,

Bb=Bi,

Rd=Ri/R=Rb/R,

Gd=Gi/R=Gb/R, and

Bd=Bi/R=Bb/R.

Further, R denotes an exposure ratio Tb/Td of the long-time exposure pixel and the short-time exposure pixel.

For example, referring to 8 pixels around an Rb pixel 120 shown in FIG. 16, There are three Gb pixels and one Gd pixel in vertical and horizontal directions.

There are two Bd pixels and two Bb pixels in a diagonal direction.

Thus, the Rb pixel is assumed to be affected by the blooming from a total of 8 pixels, and a blooming amount of each pixel with sensitivity and color is modeled.

Blooming amounts of the respective pixels calculated by applying ideal pixel values Ri, Gi and Bi are indicated as follows:

A blooming amount of the high-sensitivity pixel Rb: blmRb(Ri, Gi, Bi), a blooming amount of the high-sensitivity pixel Gb: blmGb (Ri, Gi, Bi), a blooming amount of the high-sensitivity pixel Bb: blmBb (Ri, Gi, Bi), a blooming amount of the low-sensitivity pixel Rd: blmRd (Ri, Gi, Bi), a blooming amount of the low-sensitivity pixel Gd: blmGd (Ri, Gi, Bi), and a blooming amount of the low-sensitivity pixel Bd: blmBd (Ri, Gi, Bi).

The blooming amounts of the respective pixels may be calculated by the following equations:

(a) The Blooming Amounts of the High-Sensitivity Pixels $$blmRb(Ri, Gi, Bi)=3 \cdot LL(Gi, brt\_hv)+SL(Gi, brt\_hv)+2 \cdot SL(Bi, brt\_ad)+2 \cdot LL(Bi, brt\_ad),$$

$$blmGb(Ri, Gi, Bi)=2 \cdot LL(Ri, brt\_hv)+LL(Bi, brt\_hv)+SL(Bi, brt\_hv)+2 \cdot SL(Gi, brt\_ad)+2 \cdot LL(Gi, brt\_ad), \text{ and}$$

$$blmBb(Ri, Gi, Bi)=3 \cdot LL(Gi+, brt\_hv)+SL(Gi, brt\_hv)+2 \cdot SL(Ri, brt\_ad)+2 \cdot LL(Ri, brt\_ad). \quad \text{(Equation A)}$$

(b) The Blooming Amounts of the Low-Sensitivity Pixels $$blmRd(Ri, Gi, Bi)=3 \cdot SS(Gi, brt\_hv)+LS(Gi, brt\_hv)+2 \cdot LS(Bi, brt\_ad)+2 \cdot SS(Bi, brt\_ad),$$

$$blmGd(Ri, Gi, Bi)=2 \cdot SS(Ri, brt\_hv)+SS(Bi, brt\_hv)+LS(Bi, brt\_hv)+2 \cdot LS(Gi, brt\_ad)+2 \cdot SS(Gi, brt\_ad), \text{ and}$$

$$blmBd(Ri, Gi, Bi)=3 \cdot SS(Gi+, brt\_hv)+LS(Gi, brt\_hv)+2 \cdot LS(Ri, brt\_ad)+2 \cdot SS(Ri, brt\_ad) \quad \text{(Equation B)}$$

Further, in Equations A and B described above, pq(xi, brt_yy) includes four types of notations: LL, LS, SL and SS.

LL: Blooming from a long-time exposure pixel to a long-time exposure pixel,

LS: Blooming from a long-time exposure pixel to a short-time exposure pixel,

SL: Blooming from a short-time exposure pixel to a long-time exposure pixel, and SS: Blooming from a short-time exposure pixel to a short-time exposure pixel.

x is any one of R, G and B, and xi implies that ideal characteristic data of each pixel is referenced.

yy denotes any one of hv and ad, brt_hv denotes a blooming ratio for leakage from pixels adjacent in the vertical and horizontal directions, and brt_ad denotes a blooming ratio for leakage from pixels adjacent in a diagonal direction.

However, in fact, the blooming is generated between adjacent pixels, and accurate modeling is difficult.

Figure 17:
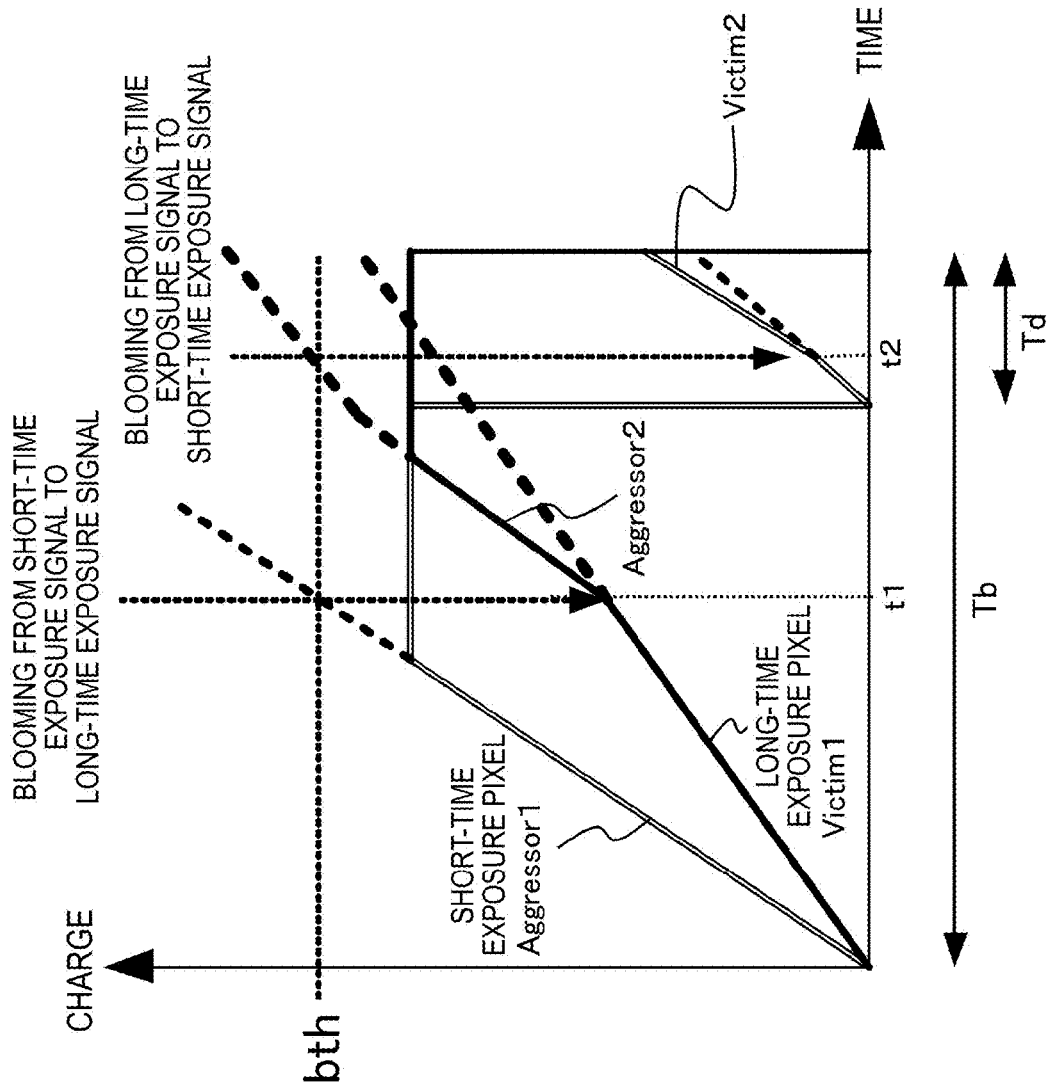
FIG. 17 is a diagram illustrating blooming generation aspect.

That is, blooming generation and reception between adjacent pixels may be performed. That is, at a time t1, the long-time exposure pixel becomes the blooming generation pixel (A: aggressor 1), and the short-time exposure pixel becomes the blooming receiving pixel (V: victim 1), and then, at a time t2, the short-time exposure pixel becomes the blooming generation pixel (A: aggressor 2), and the long-time exposure pixel becomes the blooming receiving pixel (V: victim 2), as shown in FIG. 17.

Accordingly, accurate modeling is difficult.

Further, since the blooming is generated between pixels in the vertical and horizontal directions and the diagonal directions, accurate modeling is very complex.

However, most of the blooming amount can be modeled using Equations A and B, and when the value of the blooming ratio (brt) is small, it can be neglected as an error.

[4. Embodiment of Blooming Correction Process]

Next, a concrete embodiment of pixel value correction in which the blooming amount obtained through the above process of calculating a blooming correction amount is applied, that is, a blooming correction process, will be described.

[4-1. Example of Basic Blooming Correction Process Using Mathematical Model]

First, an example of the blooming correction process using a mathematical model will be described with reference to FIG. 18.

Figure 18:
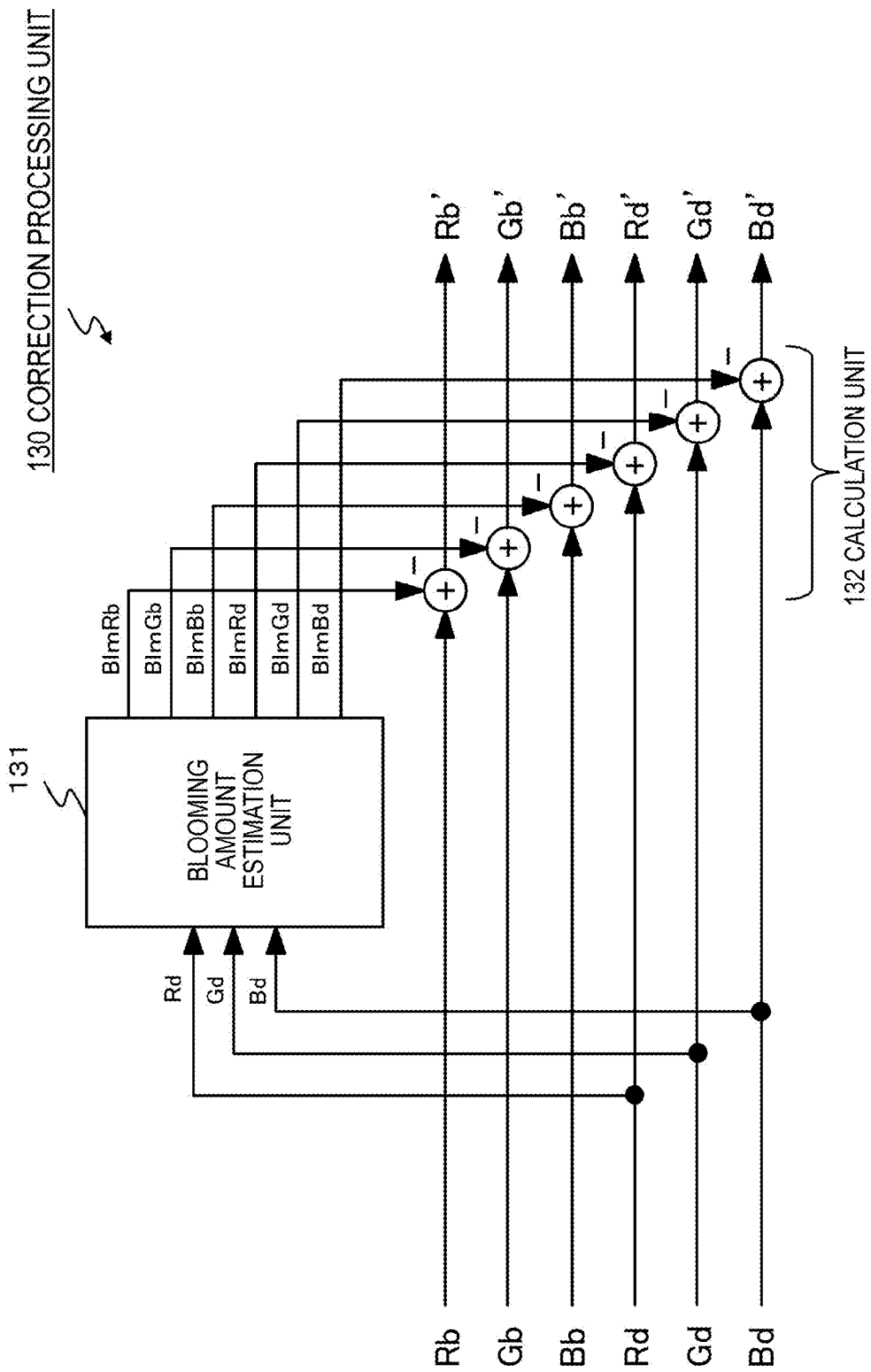
FIG. 18 is a diagram illustrating a configuration example of a correction processing unit that performs blooming correction.

FIG. 18 is a diagram showing a configuration example of a correction processing unit 130 that performs blooming correction by estimating a blooming amount from the pixel values Rd, Gd and Bd of the low-sensitivity pixels and subtracting the blooming amount from a sensor output signal.

The correction processing unit 130 shown in FIG. 18 includes a blooming amount estimation unit 131 and a calculation unit 132.

An input to the correction processing unit 130 shown in FIG. 18 is an output from an image sensor (image sensor) or a signal generated based on the output.

For example, both the long-time exposure pixels (high-sensitivity pixels) and the short-time exposure pixels (low-sensitivity pixels) shown in FIG. 16 are present in the image sensor (image sensor).

That is,

Rb: an output of a high-sensitivity pixel of R

Gb: an output of a high-sensitivity pixel of G

Bb: an output of a high-sensitivity pixel of B

Rd: an output of a low-sensitivity pixel of R

Gd: an output of a low-sensitivity pixel of G

Bd: an output of a low-sensitivity pixel of R

The correction processing unit 130 shown in FIG. 18 sequentially selects respective constituent pixels of the image sensor as a noticed pixel that is a blooming correction target and performs correction. When this correction process is performed, for example, the above 6 types of pixel values corresponding to the pixel positions of the noticed pixel selected as the correction target are input and the blooming correction is performed.

Further, a process of generating the 6 types of pixel values corresponding to the pixel positions of the noticed pixel is performed by a signal generation unit (a signal generation unit 251 shown in FIG. 38) that receives a signal from the image sensor. For example, generation of each pixel value is performed through a linear interpolation process in which the pixel values of the peripheral pixels of the noticed pixel are referenced.

This process will be described later in detail with reference to, for example, FIG. 38.

The correction processing unit 130 shown in FIG. 18 receives the respective pixel values Rb, Gb, Bb, Rd, Gd, and Bd corresponding to the noticed pixel generated by the signal generation unit (a signal generation unit 251 shown in FIG. 38), and generates and outputs corrected pixel values Rb', Gb', Bb', Rd', Gd' and Bd' of an output pixel in the noticed pixel position as a result of the blooming correction for the noticed pixel using the input values.

Further, the noticed pixel is sequentially selected one by one from among the constituent pixels of the image sensor, and the same blooming correction is executed for all the pixels.

When noise or the interdependent relationship as in FIG. 17 is neglected, the input pixel values Rb, Gb, Bb, Rd, Gd and Bd of the correction processing unit 130 may be shown as the following equation (Equation 11):

$$Rb = Ri + blmRb(Ri, Gi, Bi)$$

$$Gb = Gi + blmGb(Ri, Gi, Bi)$$

$$Bb = Bi + blmBb(Ri, Gi, Bi)$$

$$Rd = Ri/R + blmRd(Ri, Gi, Bi)$$

$$Gd = Gi/R + blmGd(Ri, Gi, Bi)$$

$$Bd = Bi/R + blmBd(Ri, Gi, Bi) \quad \text{(Equation 11)}$$

where Ri, Gi and Bi denote pixel values that are output according to an ideal characteristic without blooming, blmxx(Ri, Gi, Bi) denotes the blooming amount in each pixel (xx=Rb, Gb, Bb, Rd, Gd or Bd), which is calculated by Equations A and B described above, and R denotes an exposure ratio Tb/Td of the long-time exposure pixel and the short-time exposure pixel.

Based on Equation 11, pixel values Ri, Gi, Bi, Ri/R, Gi/R and Bi/R output from the respective pixels according to the ideal characteristic without the blooming may be represented as the following equation (Equation 22):

$$Ri = Rb - blmRb(Ri, Gi, Bi)$$

$$Gi = Gb - blmGb(Ri, Gi, Bi)$$

$$Bi = Bb - blmBb(Ri, Gi, Bi)$$

$$Ri/R = Rd - blmRd(Ri, Gi, Bi)$$

$$Gi/R = Gd - blmGd(Ri, Gi, Bi)$$

$$Bi/R = Bd - blmBd(Ri, Gi, Bi) \quad \text{(Equation 12)}$$

The ideal values calculated according to Equation 12 may be calculated and output as corrected pixel values Rb', Gb', Bb', Rd', Gd', and Bd' that are outputs of the correction processing unit 130 shown in FIG. 18.

However, in fact, it is difficult for Ri, Gi, and Bi at a right side of Equation 12 to be obtained as ideal values, and accordingly, the blooming amount estimation unit 131 calculates, in an approximation process, estimation values for the ideal pixel values using the pixel values Rd, Gd and Bd of the low-sensitivity pixels that are inputs of the correction processing unit corresponding to the outputs of the image sensor according to the following approximate equation (Equation 13).

The blooming amount estimation unit 131 calculates estimation values for the ideal pixel values Ri, Gi, and Bi according to the following approximate equation (Equation 13):

$$Ri \approx Rd \times R,$$

$$Gi \approx Gd \times R, \text{ and}$$

$$Bi \approx Bd \times R. \quad \text{(Equation 13)}$$

The blooming amount estimation unit 131 shown in FIG. 18 calculates the estimation values for the ideal pixel values Ri, Gi, and Bi according to the approximate equation (Equation 13) using the pixel values Rd, Gd and Bd of the low-sensitivity pixels, which are the input pixel values of the correction processing unit, and calculates blooming amounts blmxx(Rd×R, Gd×R, Bd×R) corresponding to the respective pixels according to Equations A and B described above. Further, xx is Rb, Gb, Bb, Rd, Gd, or Bd.

Further, the calculation unit 132 shown in FIG. 18 executes a process of subtracting the blooming amount blmxx(Rd×R, Gd×R, Bd×R) corresponding to the respective pixels calculated by the blooming amount estimation unit 131 from the input values Rb, Gb, Bb, Rd, Gd and Bd of the correction processing unit corresponding to the outputs from the image sensor.

Corrected pixel values Rb', Gb', Bb', Rd', Gd' and Bd' that are output values obtained by removing the blooming amount from the respective input pixel values are output as a result of the above calculation process.

That is, the corrected pixel values Rb', Gb', Bb', Rd', Gd' and Bd' are calculated and output according to the following calculation (Equation 14):

$$Rb' \approx Rb - blmRb(Rd \times R, Gd \times R, Bd \times R)$$

$$Gb' \approx Gb - blmGb(Rd \times R, Gd \times R, Bd \times R)$$

$$Bb' \approx Bb - blmBb(Rd \times R, Gd \times R, Bd \times R)$$

$$Rd' \approx Rd - blmRd(Rd \times R, Gd \times R, Bd \times R)$$

$$Gd' \approx Gd - blmGd(Rd \times R, Gd \times R, Bd \times R)$$

$$Bd' \approx Bd - blmBd(Rd \times R, Gd \times R, Bd \times R) \quad \text{(Equation 14)}$$

Thus, the correction processing unit 130 shown in FIG. 18 estimates the blooming amounts contained in the input pixel values Rb, Gb, Bb, Rd, Gd, and Bd and performs removal of the estimated blooming amounts, and outputs pixel values that are results of the removal as the corrected pixel values Rb', Gb', Bb', Rd', Gd' and Bd'.

[4-2. Example of Blooming Correction Process in which Solution to Over-Correction is Performed using Mathematical Model]

Next, an example of the blooming correction process in which a solution to over-correction is performed will be described with reference to FIG. 19. In the correction process described in [4-1. Example of Basic Blooming Correction Process Using Mathematical Model] described above, the blooming amount estimation unit 131 shown in FIG. 18 calculates, in the approximation process, the estimation values for the ideal pixel values according to the following approximate equation using the pixel values Rd, Gd and Bd of the low-sensitivity pixels, which are the input pixel values of the correction processing unit corresponding to the outputs from the image sensor.

$$Ri \approx Rd \times R,$$

$$Gi \approx Gd \times R, \text{ and}$$

$$Bi \approx Bd \times R.$$

However, in fact, the Rd, Gd, and Bd that are the input pixel values of the short-time exposure pixel (low-sensitivity pixel) from the image sensor are also affected by the blooming, and if the influence of the blooming of the pixels is considered, the following relational equation is satisfied in many cases:

$Ri \leq Rd \times R$, $Gi \leq Gd \times R$, and $Bb \leq Bd \times R$.

Accordingly, the blooming amount blmxx of each pixel satisfies the following relational equation:

$blmxx(Ri, Gi, Bi) \leq blmxx(Rd \times R, Gd \times R, Bd \times R)$, where xx=Rb, Gb, Bb, Rd, Gd or Bd As described above, if a blooming amount of the input pixel value of the short-time exposure pixel (low-sensitivity pixel) for estimating the blooming amount is considered, over-correction may be performed in the correction process in [4-1. Example of Basic Blooming Correction Process Using Mathematical Model] described above.

As a solution thereto, a blooming amount estimated based on the short-time exposure pixel (low-sensitivity pixel) that is the input pixel value is multiplied by a pre-defined attenuation parameter attxx, $0 \leq attxx \leq 1$, and the corrected pixel values Rb', Gb', Bb', Rd', Gd' and Bd' are calculated and output according to the following equation (Equation 21):

$Rb' \approx Rb - attRb \times blmRb(Rd \times R, Gd \times R, Bd \times R)$, $Gb' \approx Gb - attGb \times blmGb(Rd \times R, Gd \times R, Bd \times R)$, $Bb' \approx Bb - attBb \times blmBb(Rd \times R, Gd \times R, Bd \times R)$, $Rd' \approx Rd - attRd \times blmRd(Rd \times R, Gd \times R, Bd \times R)$, $Gd' \approx Gd - attGd \times blmGd(Rd \times R, Gd \times R, Bd \times R)$, and $Bd' \approx Bd - attBd \times blmBd(Rd \times R, Gd \times R, Bd \times R)$. (Equation 21)

where attxx denotes the attenuation parameter and is any coefficient of $0 \leq attxx \leq 1$, and xx=Rb, Gb, Bb, Rd, Gd or Bd.

In Equation 21, the attenuation parameter attxx serves to suppress an actual correction amount.

Further, it is preferable to measure the estimation value and the actual measurement value of the blooming amount in a specific color of a specific light source in advance and adjust the attenuation parameter so that a difference between the estimation value and the actual measurement value is reduced.

Figure 19:
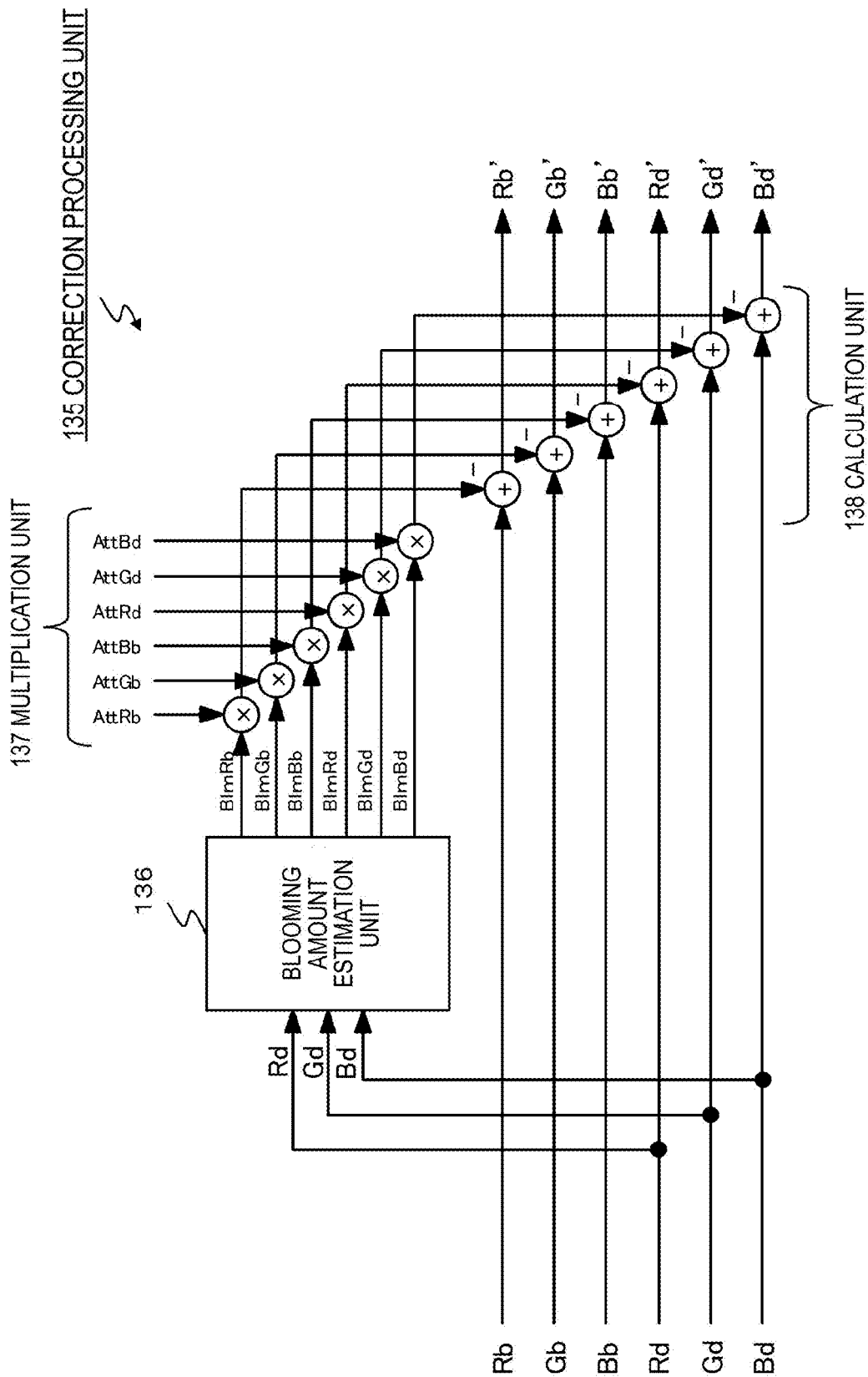
FIG. 19 is a diagram illustrating a blooming correction process example in which an over-correction solution is performed.

Thus, the correction processing unit 135 shown in FIG. 19 estimates the blooming amounts contained in the input pixel values Rb, Gb, Bb, Rd, Gd, and Bd, performs removal of the estimated blooming amounts, and outputs pixel values that are results of the removal as corrected pixel values Rb', Gb', Bb', Rd', Gd' and Bd'.

First, the blooming amount estimation unit 136 calculates estimation values for the ideal pixel values Ri, Gi, and Bi according to the approximate equation (Equation 13) previously described in [4-1. Example of Basic Blooming Correction Process Using Mathematical Model] using the pixel values Rd, Gd and Bd of the low-sensitivity pixels, which are the input pixel values of the correction processing unit corresponding to the output from the image sensor, and calculates the blooming amount blmxx(Rd×R, Gd×R, Bd×R) corresponding to the respective pixels according to Equations A and B described above. Further, xx is Rb, Gb, Bb, Rd, Gd, or Bd. Next, the multiplication unit 137 shown in FIG. 19 multiplies the blooming amount blmxx(Rd×R, Gd×R, Bd×R) corresponding to each pixel, which has been calculated by the blooming amount estimation unit 131, by the following attenuation parameter:

attxx, where $0 \leq attxx \leq 1$, and xx=Rb, Gb, Bb, Rd, Gd or Bd.

Outputs of the multiplication unit 137 become the following values:

attRb×blmRb(Rd×R, Gd×R, Bd×R),
attGb×blmGb(Rd×R, Gd×R, Bd×R),
attBb×blmBb(Rd×R, Gd×R, Bd×R),
attRd×blmRd(Rd×R, Gd×R, Bd×R),
attGd×blmGd(Rd×R, Gd×R, Bd×R), and
attBd×blmBd(Rd×R, Gd×R, Bd×R).

Next, the calculation unit 138 shown in FIG. 19 executes a process of subtracting the outputs of the multiplication unit 137 from the input values Rb, Gb, Bb, Rd, Gd and Bd of the correction processing unit corresponding to the outputs from the image sensor.

That is, the corrected pixel values Rb', Gb', Bb', Rd', Gd' and Bd' that are output values obtained by removing the blooming amounts from the respective input pixel values are output through the following calculation.

$Rb' \approx Rb - attRb \times blmRb(Rd \times R, Gd \times R, Bd \times R)$, $Gb' \approx Gb - attGb \times blmGb(Rd \times R, Gd \times R, Bd \times R)$, $Bb' \approx Bb - attBb \times blmBb(Rd \times R, Gd \times R, Bd \times R)$, $Rd' \approx Rd - attRd \times blmRd(Rd \times R, Gd \times R, Bd \times R)$, $Gd' \approx Gd - attGd \times blmGd(Rd \times R, Gd \times R, Bd \times R)$, and $Bd' \approx Bd - attBd \times blmBd(Rd \times R, Gd \times R, Bd \times R)$.

where attxx denotes the attenuation parameter and is any coefficient of $0 \leq attxx \leq 1$, and xx=Rb, Gb, Bb, Rd, Gd or Bd.

[4-3. Example of Process of Performing Iterative Correction Using Mathematical Model]

In the process example described above, the process of subtracting the estimated blooming amounts from the input pixel values based on the estimation values for the blooming amounts is executed once to output the corrected pixel values. A process described hereinafter is an example of a process of executing iterative correction for the correction process result using the corrected pixel values.

For example, in the process example [4-1] described above, for Rd that is the short-time exposure pixel (low-sensitivity pixel) before correction, a pixel value Rd' after correction can be obtained through the correction process. From a comparison between the pixel value Rd before correction and the pixel value Rd' after correction, the pixel value Rd' after correction when the correction has been performed once will be close to a true value.

That is, the following inequality is satisfied.

$|Rd - Ri/R| > |Rd' - Ri/R|$

The same applies to Gd and Bd, as well as Rd.

The blooming correction amount is iteratively estimated using the pixel values Rd', Gd', Bd' after correction of the short-time exposure pixels (low-sensitivity pixels).

Figure 20:
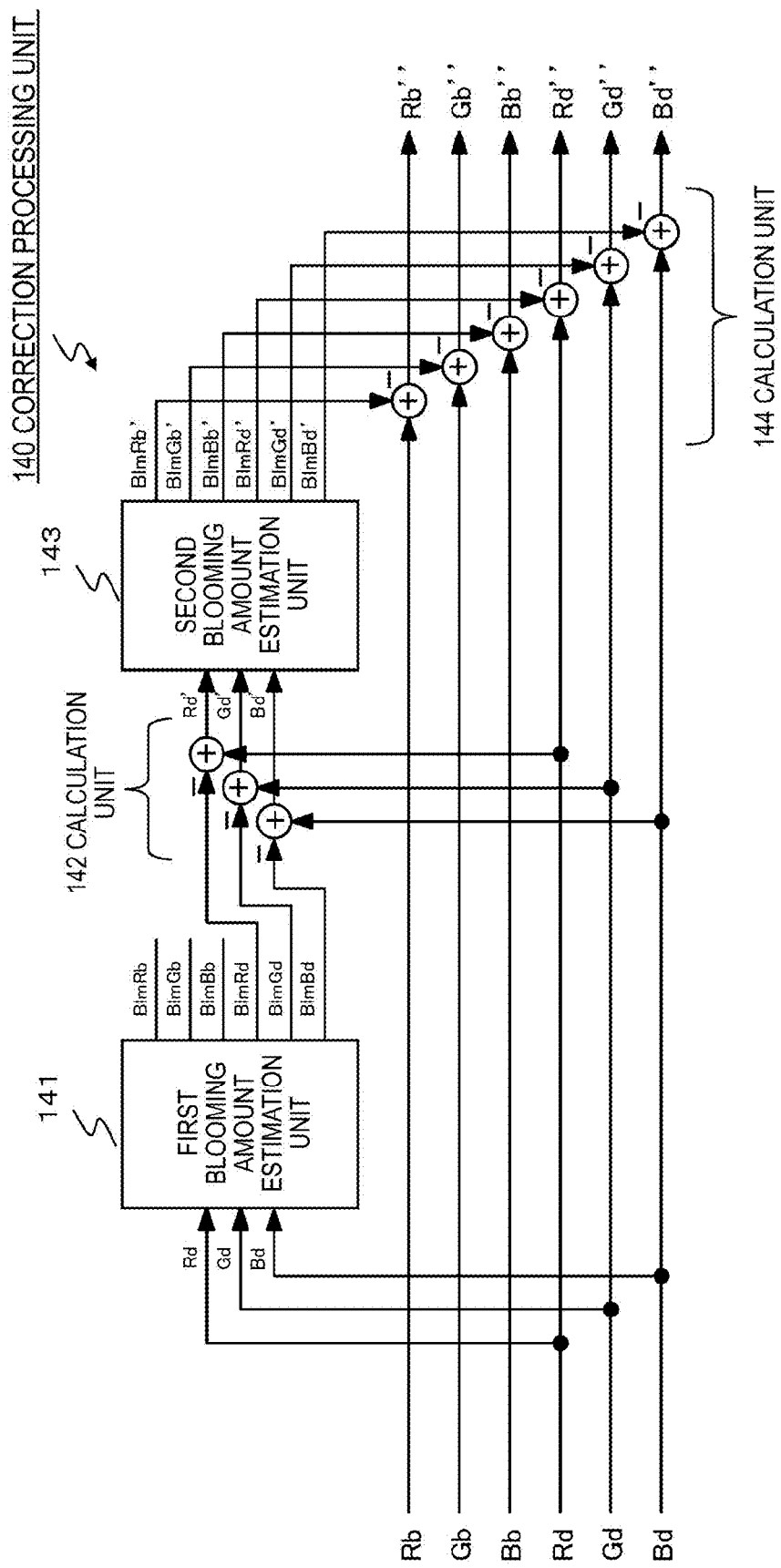
FIG. 20 is a diagram illustrating a process example in which a process of estimating a blooming correction amount is executed as an iterative process.
Figure 21:
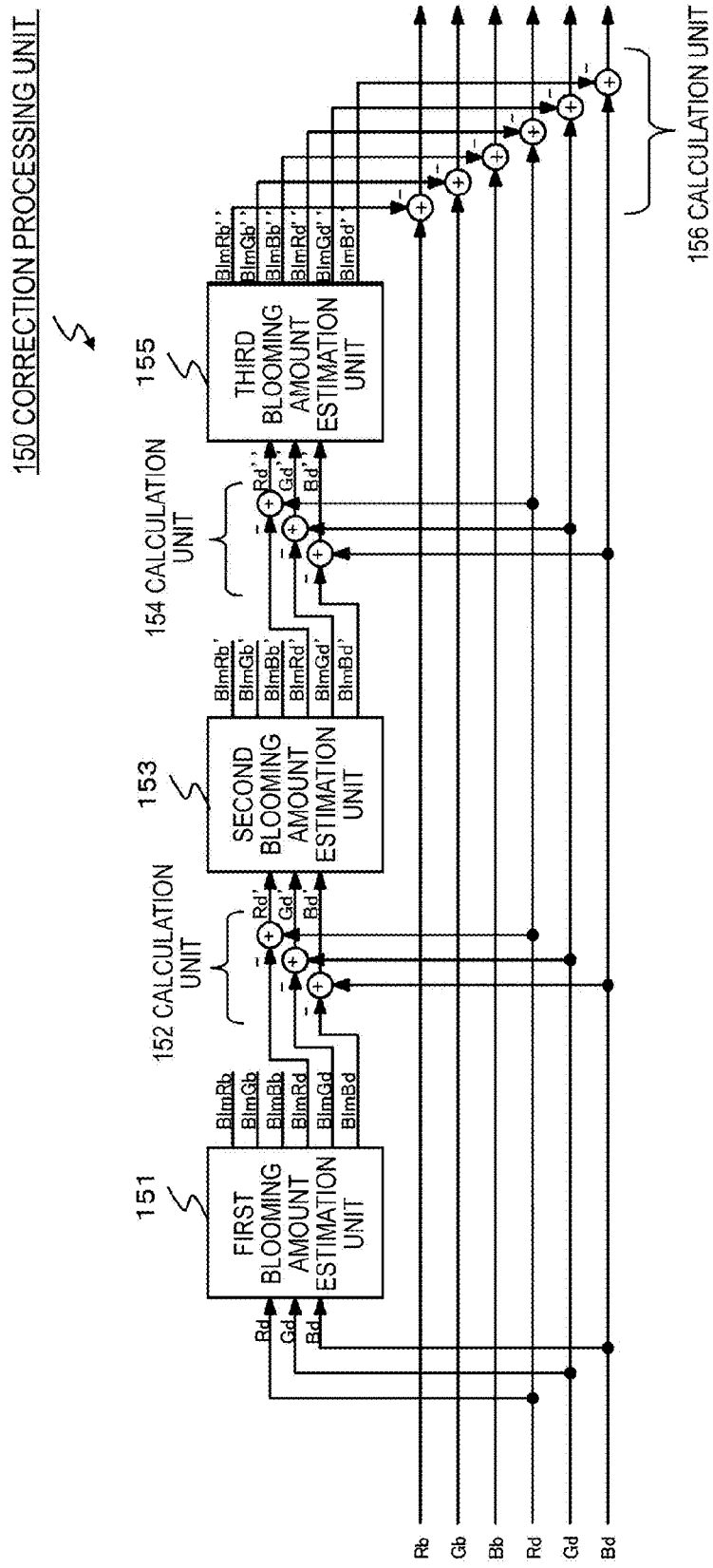
FIG. 21 is a diagram illustrating a process example in which a process of estimating a blooming correction amount is executed as an iterative process.

A correction processing unit 140 shown in FIG. 20 has an exemplary configuration in which pixel value correction is performed based on estimation of a blooming amount by a two-time iterative process, and a correction processing unit 150 shown in FIG. 21 has an exemplary configuration in which pixel value correction is performed based on estimation of a blooming amount by a three-time iterative process.

In the correction processing unit 140 shown in FIG. 20, a first blooming amount estimation unit 141 calculates estimation values for the ideal pixel values Ri, Gi, and Bi according to the approximate equation (Equation 13) described above in [4-1. Example of Basic Blooming Correction Process Using Mathematical Model] using the pixel values Rd, Gd and Bd of the low-sensitivity pixels, which are the input pixel values of the correction processing unit, and calculates blooming amounts blmxx(Rd×R, Gd×R, Bd×R) corresponding to the respective pixels according to Equations A and B described above. Further, xx is Rb, Gb, Bb, Rd, Gd, or Bd.

Next, a calculation unit 142 executes a process of subtracting the blooming amount blmxx(Rd×R, Gd×R, Bd×R) corresponding to the respective pixels calculated by the first blooming amount estimation unit 141 from the input values Rd, Gd and Bd of the correction processing unit to thereby calculate first corrected pixel values Rd', Gd' and Bd'.

Further, a second blooming amount estimation unit 143 calculates estimation values for the ideal pixel values Ri, Gi, and Bi according to the approximate equation (Equation 13) described above in [4-1. Example of Basic Blooming Correction Process Using Mathematical Model] using the first corrected pixel values Rd', Gd' and Bd', and calculates blooming amounts blmxx'(Rd×R, Gd×R, Bd×R) corresponding to the respective pixels according to Equations A and B described above, similar to the first blooming amount estimation unit 141. Further, xx is Rb, Gb, Bb, Rd, Gd, or Bd.

Further, a calculation unit 144 shown in FIG. 20 executes a process of subtracting the blooming amount blmxx'(Rd×R, Gd×R, Bd×R) corresponding to the respective pixels calculated by the second blooming amount estimation unit 143 from the input values Rb, Gb, Bb, Rd, Gd and Bd of the correction processing unit.

As a result of this calculation process, corrected pixel values Rb", Gb", Bb", Rd", Gd" and Bd" that are output values obtained by removing the blooming amounts from the respective input pixel values are output.

Meanwhile, in the correction processing unit 150 shown in FIG. 21, a first blooming amount estimation unit 151 calculates estimation values for the ideal pixel values Ri, Gi, and Bi according to the approximate equation (Equation 13) described above in [4-1. Example of Basic Blooming Correction Process Using Mathematical Model] using pixel values Rd, Gd and Bd of the low-sensitivity pixels, which are input pixel values of the correction processing unit, and calculates blooming amounts blmxx(Rd×R, Gd×R, Bd×R) corresponding to the respective pixels according to Equations A and B described above. Further, xx is Rb, Gb, Bb, Rd, Gd, or Bd.

Next, a calculation unit 152 executes a process of subtracting the blooming amount blmxx(Rd×R, Gd×R, Bd×R) corresponding to the respective pixels calculated by the first blooming amount estimation unit 151 from the input values Rd, Gd and Bd of the correction processing unit to calculate first corrected pixel values Rd', Gd' and Bd'.

Further, a second blooming amount estimation unit 153 calculates estimation values for the ideal pixel values Ri, Gi, and Bi according to the approximate equation (Equation 13) described above in [4-1. Example of Basic Blooming Correction Process Using Mathematical Model] using the first corrected pixel values Rd', Gd' and Bd', and calculates blooming amounts blmxx'(Rd×R, Gd×R, Bd×R) corresponding to the respective pixels according to Equations A and B described above, similar to the first blooming amount estimation unit 151. Further, xx is Rb, Gb, Bb, Rd, Gd, or Bd.

Next, a calculation unit 154 executes a process of subtracting the blooming amount blmxx'(Rd×R, Gd×R, Bd×R) corresponding to the respective pixels calculated by the second blooming amount estimation unit 151 from the input values Rd, Gd and Bd of the correction processing unit to calculate second corrected pixel values Rd", Gd" and Bd".

Further, a third blooming amount estimation unit 155 calculates estimation values for the ideal pixel values Ri, Gi, and Bi according to the approximate equation (Equation 13) described above in [4-1. Example of Basic Blooming Correction Process Using Mathematical Model] using the second corrected pixel values Rd", Gd" and Bd", and calculates blooming amounts blmxx"(Rd×R, Gd×R, Bd×R) corresponding to the respective pixels according to Equations A and B described above, similar to the first blooming amount estimation unit 151. Further, xx is Rb, Gb, Bb, Rd, Gd, or Bd.

Further, a calculation unit 156 shown in FIG. 21 executes a process of subtracting blooming amounts blmxx"(Rd×R, Gd×R, Bd×R) corresponding to the respective pixels calculated by the third blooming amount estimation unit 155 from the input values Rb, Gb, Bb, Rd, Gd and Bd of the correction processing unit.

As a result of this calculation process, corrected pixel values Rb''', Gb''', Bb''', Rd''', Gd''', Bd''' that are output values obtained by removing the blooming amounts from the respective input pixel values are output.

Further, two- and three-time iterative blooming amount estimation processes, as well as a more-time blooming amount estimation process, may be executed to perform the correction process.

[4-4. Example of Correction Process Based on Pre-Acquired Data such as LUT]

Next, an example of a correction process based on pre-acquired blooming correction data such as a look-up table (LUT) will be described. Any of the process examples described with reference to FIGS. 18 to 21 is the process example in which the blooming amounts are sequentially calculated based on the input pixel values and the calculated blooming amounts are used.

However, this sequential calculation technique has a problem in that the pixel values affected by the blooming are likely to be used for the blooming estimation.

Because of this, it may be said that it is difficult to calculate a true pixel value through a one-time calculation process using any one calculation model based on pixel values of pixels individually affected by different blooming.

However, if pre-calculation is used as described in the item [1. Process of Measuring Characteristic of Image Sensor] described above, it is possible to calculate the pixel value of the pixel affected by the blooming from the true pixel value.

Moreover, since a signal value of the pixel and the influence of blooming are in a monotonic increase relationship, it may be easily imagined that an inverse function exists.

Blooming amounts are measured in advance, and a LUT (look-up table) in which a correspondence relationship data between "true values of a pixels" not affected by blooming and "pixel values of pixels affected by blooming" are set is produced.

Figure 22:
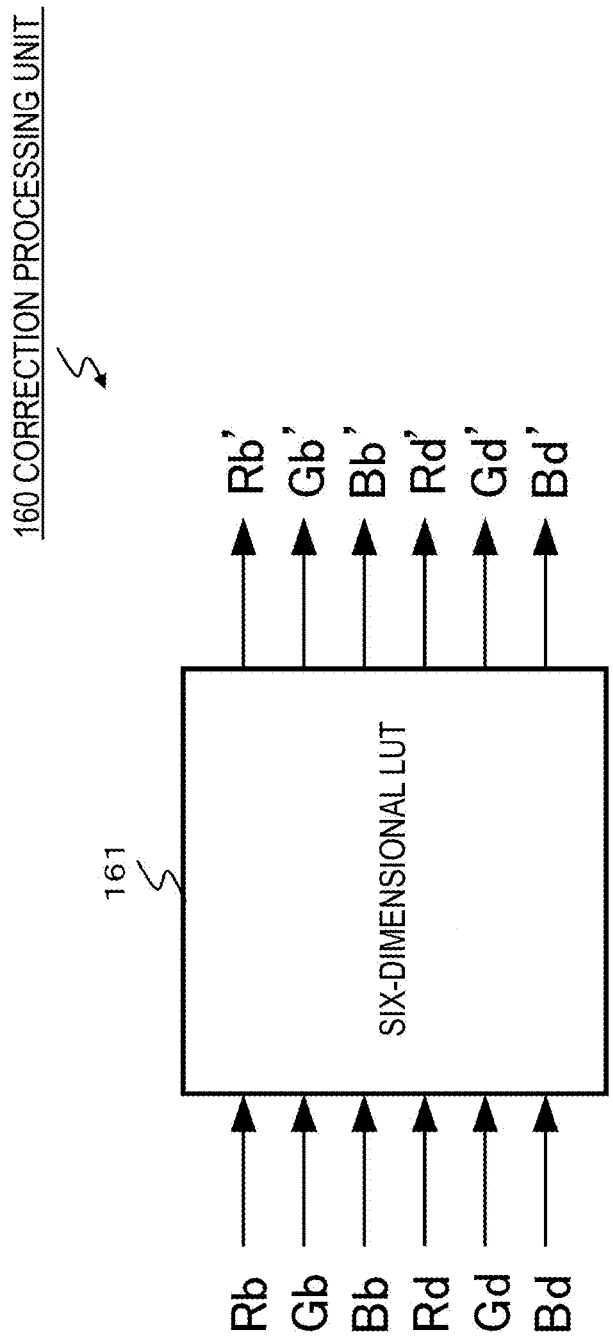
FIG. 22 is a diagram illustrating a configuration example of a correction processing unit that executes blooming correction using a LUT (look-up table)

A configuration of a correction processing unit that executes blooming correction using a LUT (look-up table) is shown in FIG. 22.

A correction processing unit 160 shown in FIG. 22 receives pixel values Rb, Gb and Bb of long-time exposure pixels (high-sensitivity pixels) and pixel values Rd, Gd and Bd of short-time exposure pixels (low-sensitivity pixels) from the image sensor, executes pixel value correction using a six-dimensional look-up table 161, and outputs corrected pixel values Rb', Gb', Bb', Rd', Gd' and Bd'.

The six-dimensional table 161 is a six-dimensional look-up table that holds a correspondence relationship between pixel values Rb, Gb, Bb, Rd, Gd and Bd of pixels affected by blooming and true pixel values Rb', Gb', Bb', Rd', Gd' and Bd' not affected by the blooming.

According to the correspondence relationship data recorded in the six-dimensional LUT, corrected pixel values (=true pixel values containing no influence of blooming) for the input pixel values (=pixel values of pixels affected by blooming) are acquired and output.

However, the six-dimensional LUT has a problem in that the data amount becomes large.

A method of reducing the LUT while holding this result may be considered as a configuration for resolving such a problem.

Figure 23:
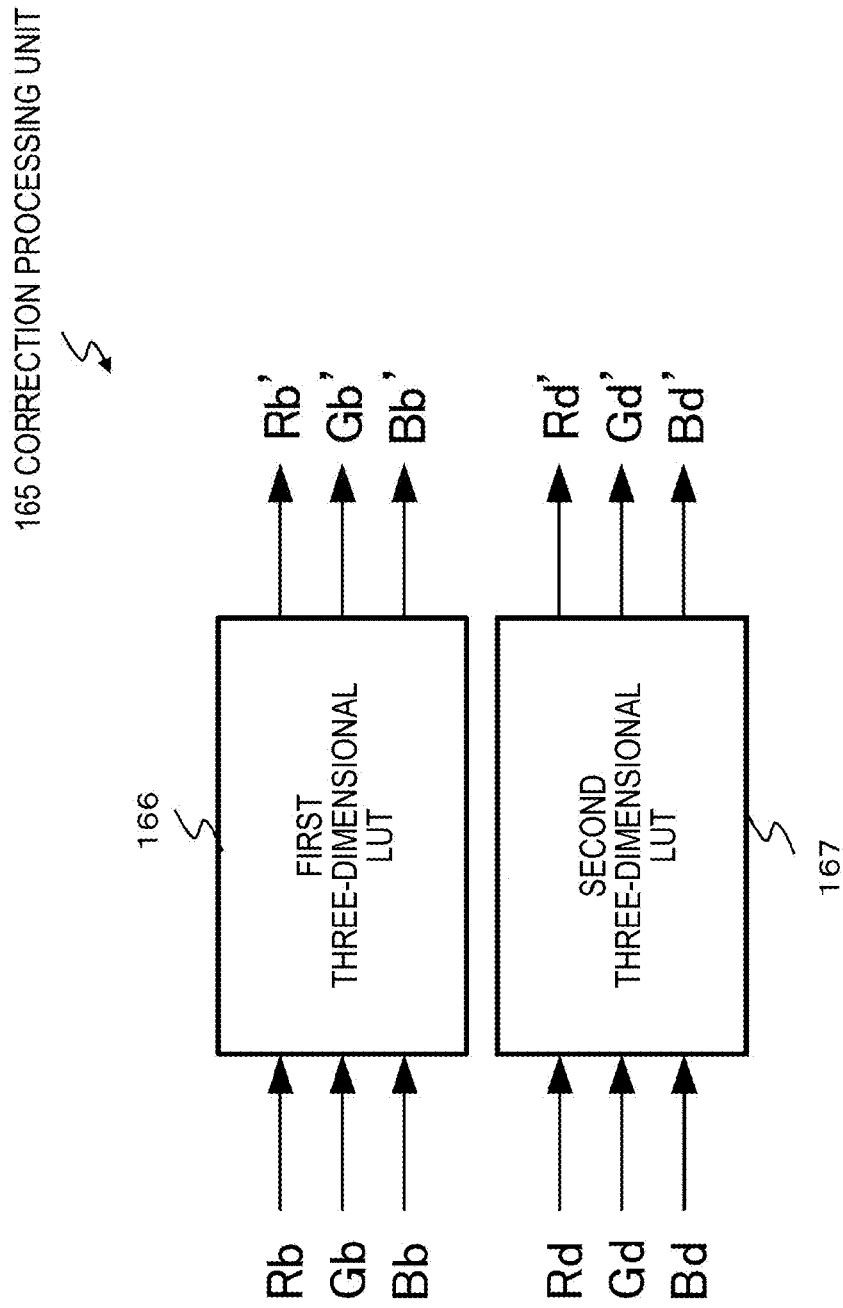
FIG. 23 is a diagram illustrating a configuration example of a correction processing unit that executes blooming correction using a LUT (look-up table)

FIG. 23 shows a configuration example in which an LUT is three-dimensional.

A correction processing unit 165 shown in FIG. 22 receives pixel values Rb, Gb and Bb of long-time exposure pixels (high-sensitivity pixels) and pixel values Rd, Gd and Bd of short-time exposure pixels (low-sensitivity pixels) from an image sensor.

For the pixel values Rb, Gb and Bb of the long-time exposure pixels (high-sensitivity pixels), correction value acquisition is executed using a first three-dimensional LUT 166 and corrected pixel values Rb', Gb' and Bb are output.

Further, for the pixel values Rd, Gd and Bd of the short-time exposure pixels (low-sensitivity pixels), correction value acquisition is executed using a second three-dimensional LUT 167 and corrected pixel values Rd', Gd' and Bd' are output.

The first three-dimensional table 166 is a three-dimensional look-up table that holds a correspondence relationship between the pixel values Rb, Gb and Bb of the long-time exposure pixels (high-sensitivity pixels) affected by blooming and the pixel values Rb', Gb' and Bb' of the true long-time exposure pixels (high-sensitivity pixels) not affected by blooming. Further, the second three-dimensional table 167 is a three-dimensional look-up table that holds a correspondence relationship between the pixel values Rd, Gd and Bd of the short-time exposure pixels (low-sensitivity pixels) affected by blooming and the pixel values Rd', Gd', and Bd' of the true short-time exposure pixels (low-sensitivity pixels) not affected by blooming.

Corrected pixel values (=true pixel values containing no influence of the blooming) for the input pixel values (=pixel values of pixels affected by the blooming) are calculated and output according to the correspondence relationship data recorded in the two three-dimensional LUTs.

Figure 24:
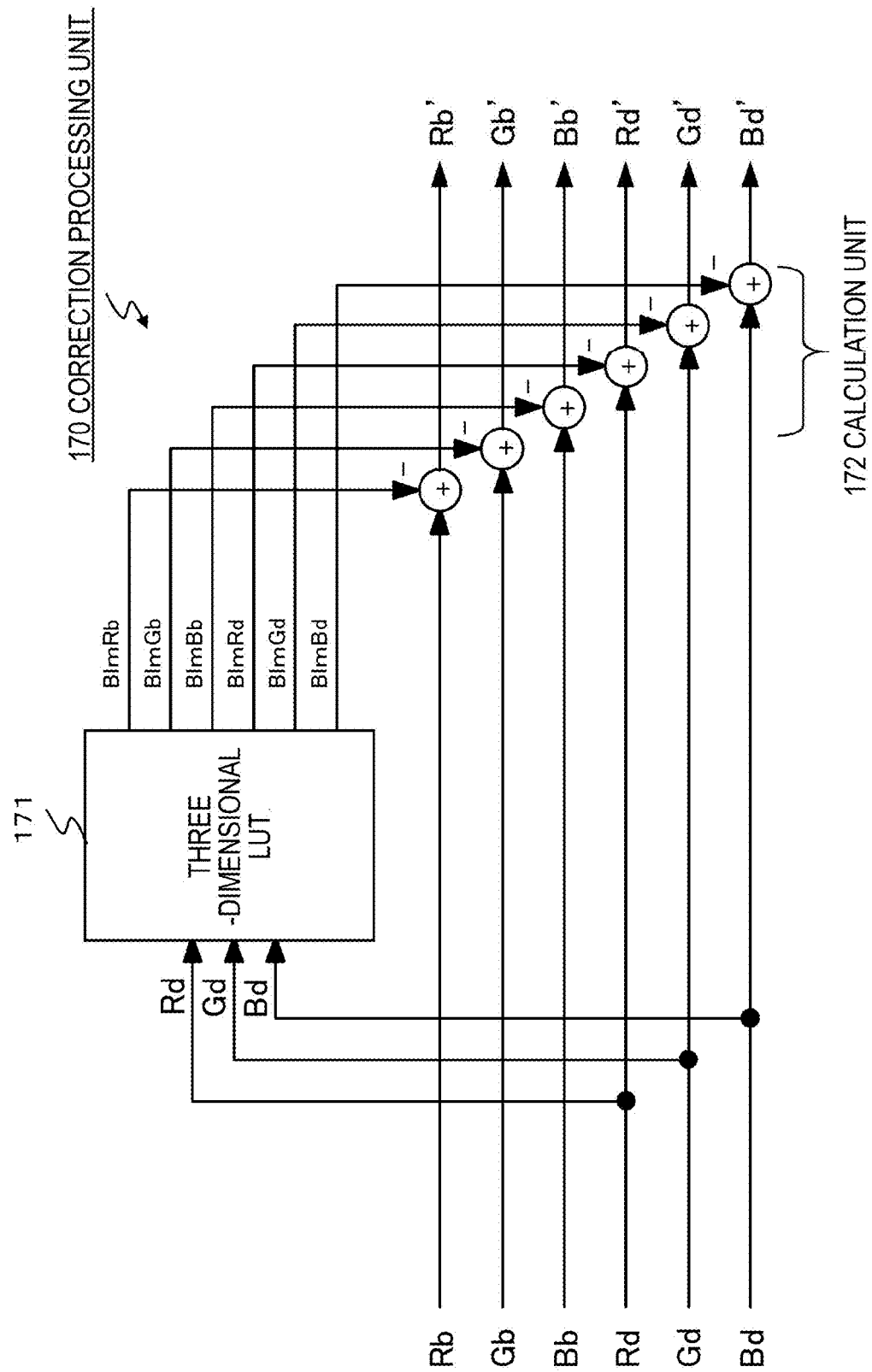
FIG. 24 is a diagram illustrating a configuration example of a correction processing unit that executes blooming correction using a LUT (look-up table)

Further, there is a configuration of a correction processing unit 170 shown in FIG. 24 as the configuration of the correction processing unit using a three-dimensional look-up table corresponding to the short-time exposure pixels (low-sensitivity pixels).

The correction processing unit 170 shown in FIG. 24 has a configuration in which the blooming amount estimation unit 131 in the correction processing unit 130 described above with reference to FIG. 18 is replaced with a three-dimensional LUT 171.

Here, the three-dimensional LUT 171 is a table that holds correspondence relationship data between pixel values Rd, Gd and Bd of short-time exposure pixels (low-sensitivity pixels) affected by blooming and blooming amounts of the respective pixels.

Outputs of the three-dimensional LUT 171 are blooming amounts BlmRb, BlmGb, BlmBb, BlmRd, BlmGd and BlmBd of the respective pixels obtained according to the LUT, which correspond to pixel values Rd, Gd and Bd of short-time exposure pixels (low-sensitivity pixels) that are input pixel values of the correction processing unit.

A calculation unit 172 executes a process of subtracting a blooming amount blmxx(Rd×R, Gd×R, Bd×R) that is outputs of the three-dimensional LUT 171 corresponding to the respective pixels from the input values Rb, Gb, Bb, Rd, Gd and Bd of the correction processing unit, and outputs corrected pixel values Rb', Gb', Bb', Rd', Gd' and Bd'.

Figure 25:
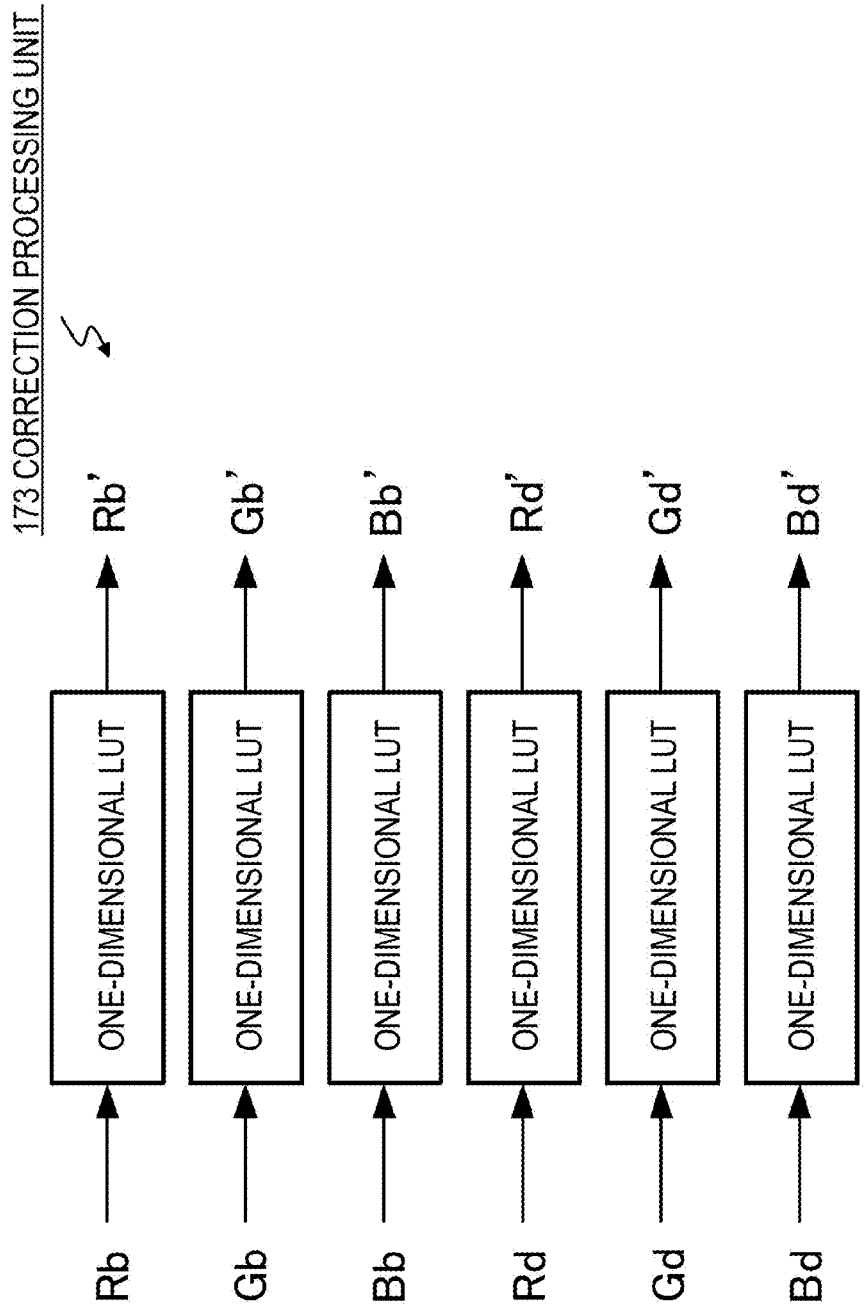
FIG. 25 is a diagram illustrating a configuration example of a correction processing unit that executes blooming correction using a LUT (look-up table)

Further, a configuration using six one-dimensional LUTs like a correction processing unit 173 shown in FIG. 25 may be used.

The one-dimensional LUTs shown in FIG. 25 include the following tables T1 to T6:

(T1) A one-dimensional look-up table holding a correspondence relationship between the pixel value Rb of the short-time exposure pixel (low-sensitivity pixel) affected by blooming and the pixel value Rb' of the true short-time exposure pixel (low-sensitivity pixel) containing no influence of the blooming.

(T2) A one-dimensional look-up table holding a correspondence relationship between the pixel value Gb of the short-time exposure pixel (low-sensitivity pixel) affected by blooming and the pixel value Gb' of the true short-time exposure pixel (low-sensitivity pixel) containing no influence of the blooming.

(T3) A one-dimensional look-up table holding a correspondence relationship between the pixel value Bb of the short-time exposure pixel (low-sensitivity pixel) affected by blooming and the pixel value Bb' of the true short-time exposure pixel (low-sensitivity pixel) containing no influence of the blooming.

(T4) A one-dimensional look-up table holding a correspondence relationship between the pixel value Rd of the short-time exposure pixel (low-sensitivity pixel) affected by blooming and the pixel value Rd' of the true short-time exposure pixel (low-sensitivity pixel) containing no influence of the blooming.

(T5) A one-dimensional look-up table holding a correspondence relationship between the pixel value Gd of the short-time exposure pixel (low-sensitivity pixel) affected by blooming and the pixel value Gd' of the true short-time exposure pixel (low-sensitivity pixel) containing no influence of the blooming.

(T6) A one-dimensional look-up table holding a correspondence relationship between the pixel value Bd of the short-time exposure pixel (low-sensitivity pixel) affected by blooming and the pixel value Bd' of the true short-time exposure pixel (low-sensitivity pixel) containing no influence of the blooming.

Figure 26:
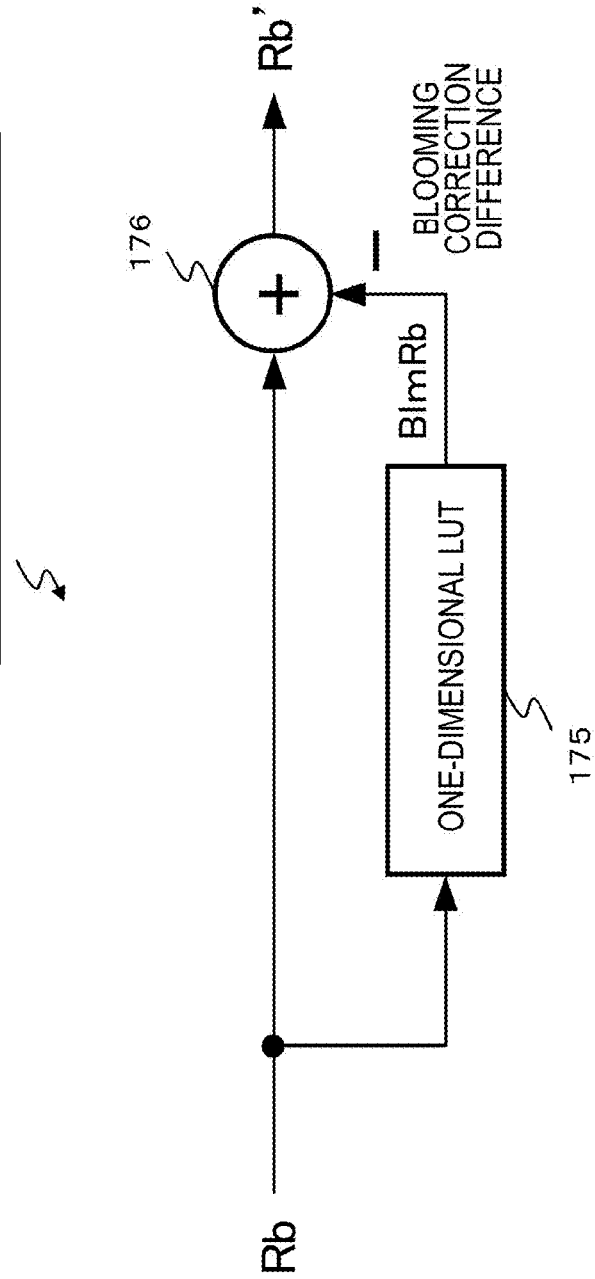
FIG. 26 is a diagram illustrating a configuration example of a correction processing unit that executes blooming correction using a LUT (look-up table)

Further, a correction processing unit 174 having a setting shown in FIG. 26 can be configured if a one-dimensional look-up table is set as correspondence relationship data between a pixel value of a pixel affected by the blooming and a blooming amount in units of various pixel units.

While the correction processing unit 174 shown in FIG. 26 is shown as a processing configuration for only Rb, the correction processing unit 174 is realized by the same configuration for other pixels as well.

The input pixel value Rb of the correction processing unit is input to a one-dimensional LUT 175, and a blooming amount BlmRb corresponding to the input pixel value Rb is acquired from the one-dimensional LUT 175.

The blooming amount BlmRb output from the one-dimensional LUT 175 is subtracted from the input pixel value Rb of the correction processing unit by a calculation unit 176 and a corrected pixel value Rb' is output. That is, the corrected pixel value obtained by removing the blooming amount through the following process:

$$Rb'=Rb-BrmRb$$

is output.

Figure 27:
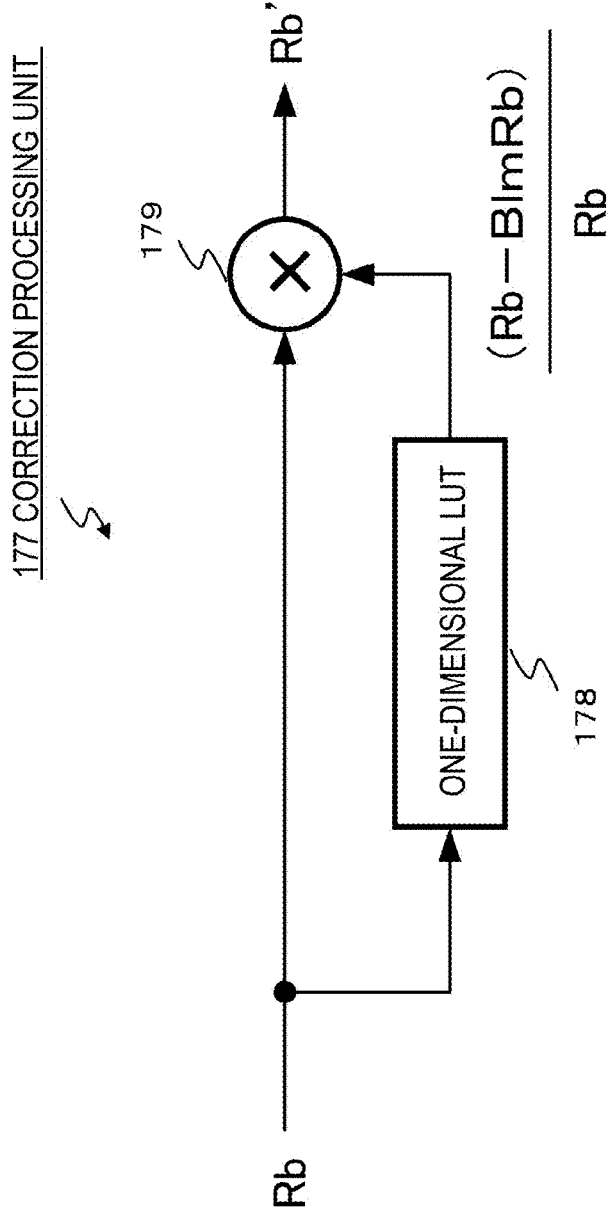
FIG. 27 is a diagram illustrating a configuration example of a correction processing unit that executes blooming correction using a LUT (look-up table)

Further, a correction processing unit 177 shown in FIG. 27 can be configured if a one-dimensional look-up table has a structure in which correspondence relationship data between:
 a pixel value of the pixel affected by the blooming and
 a ratio k between the pixel value of the pixel affected by the blooming and a true pixel value not affected by the blooming,
is set in units of various pixels.

Specifically, for example, when the input pixel value is Rb, the one-dimensional look-up table stores correspondence relationship data between:
 the pixel value Rb of the pixel affected by the blooming and
 a ratio $k=(Rb-blmRb)/Rb$ between the pixel value Rb of the pixel affected by the blooming and the true pixel value $(Rb-blmRb)$ not affected by the blooming.

Even for pixels other than Rb, a one-dimensional LUT in which the same relationship data is set is produced and used.

The correction processing unit 177 shown in FIG. 27 has a configuration in which such a one-dimensional LUT 178 is used. Further, FIG. 27 shows a process configuration for only Rb, but the correction processing unit 177 is realized by the same configuration for other pixels.

Based on the input pixel value Rb of the correction processing unit, a ratio $k=(Rb-blmRb)/Rb$ between the pixel value Rb of the pixel affected by the blooming and the true pixel value $(Rb-blmRb)$ not affected by the blooming is output from the one-dimensional LUT 178.

The ratio $k=(Rb-blmRb)/Rb$ output from the one-dimensional LUT 178 is multiplied by the input pixel value Rb of the correction processing unit by a multiplication unit 179 and a corrected pixel value Rb' is output. That is, $$Rb'=Rb\times((Rb-blmRb)/Rb)$$

The corrected pixel value obtained by removing the blooming amount through the process is output.

Figure 28:
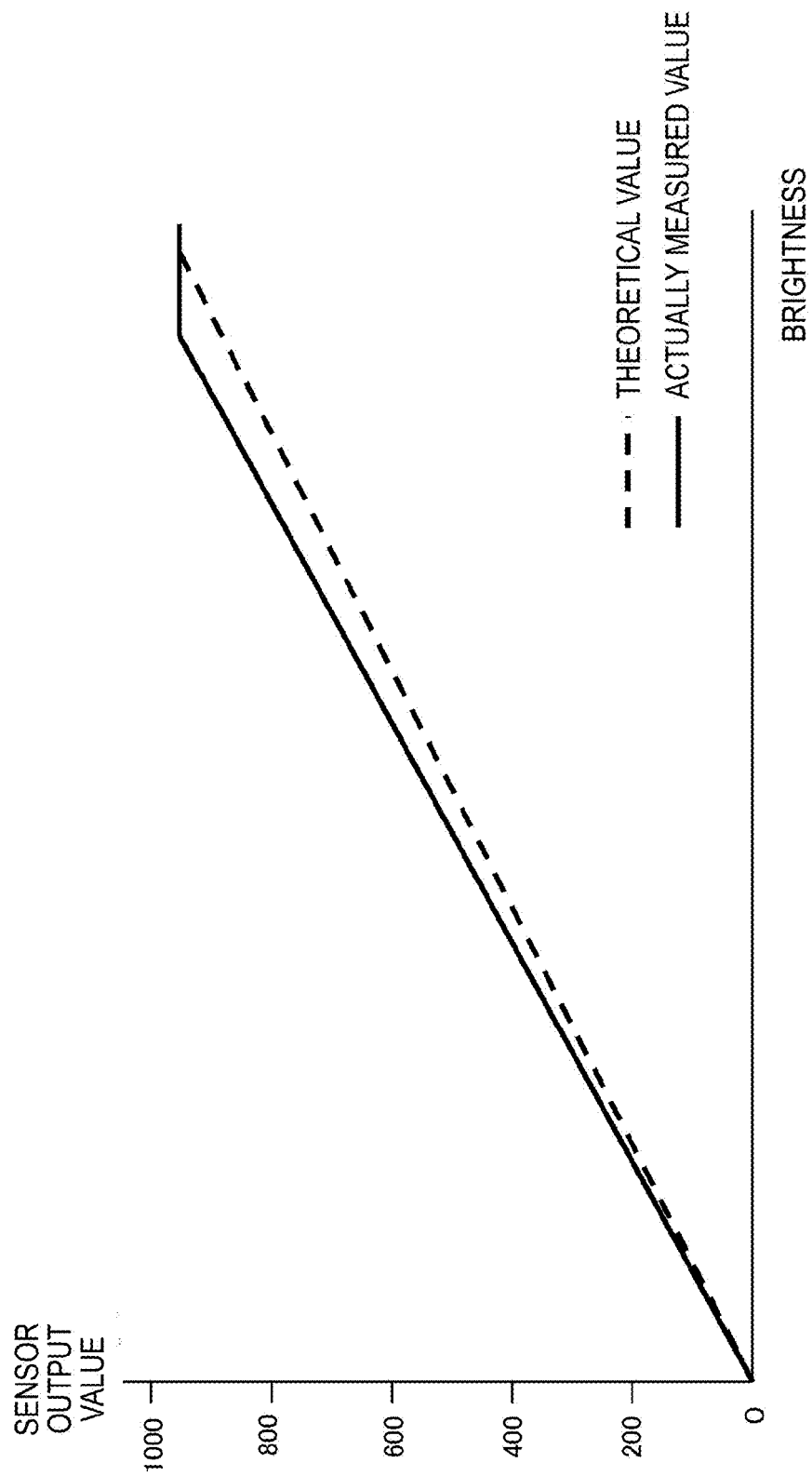
FIG. 28 is a diagram illustrating a graph showing changes in an actual measurement value (a pixel value affected by blooming) and an ideal value (a true pixel value) when brightness of a short-time exposure pixel is changed.

FIG. 28 is a graph showing changes in an actual measurement value (a pixel value affected by blooming) and an ideal value (a true pixel value) when brightness of a short-time exposure pixel is changed.

Figure 29:
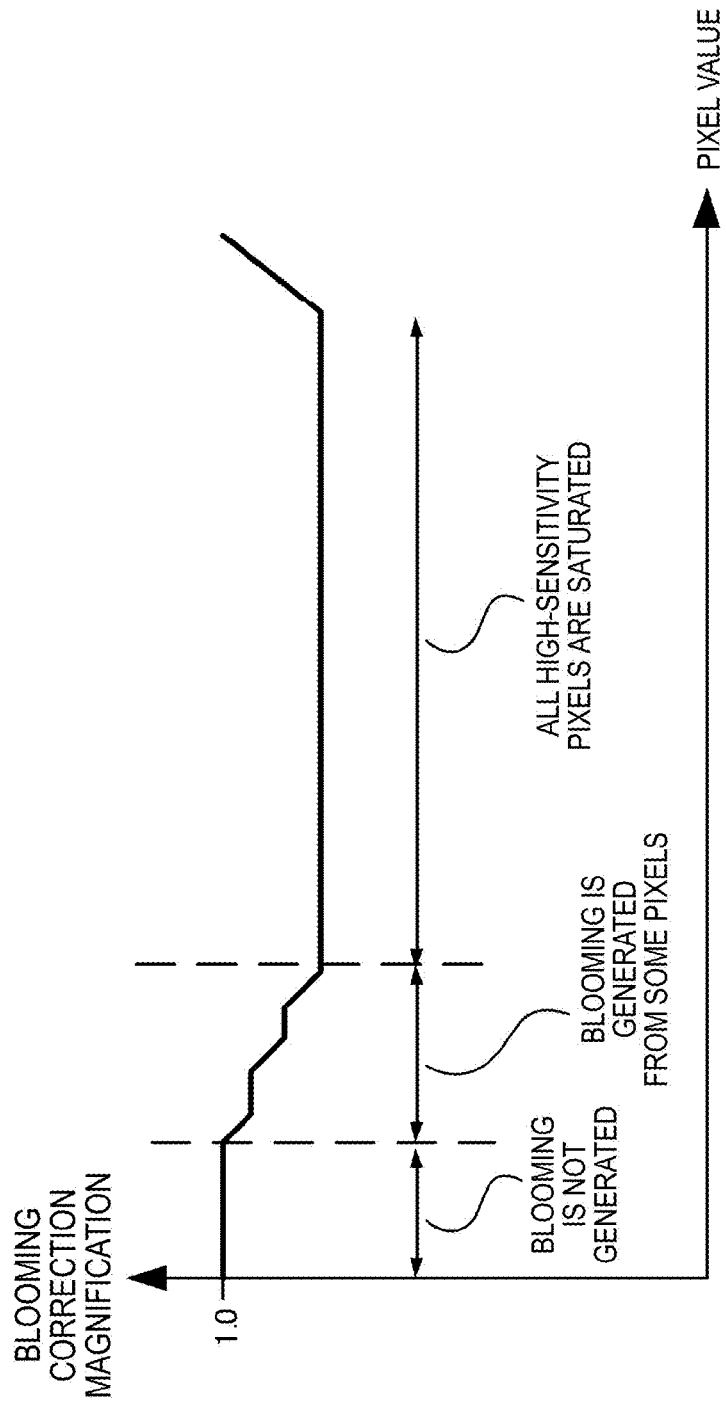
FIG. 29 is a diagram showing a relationship of correspondence data used in a one-dimensional LUT shown in FIG. 27 based on the characteristic shown in FIG. 28.

FIG. 29 is a diagram showing a relationship of correspondence data used in the one-dimensional LUT shown in FIG. 27 based on the characteristic shown in FIG. 28.

That is, FIG. 29 is a graph showing correspondence relationship data between:
 a pixel value xx that is a pixel value of a pixel affected by blooming and
 a blooming correction magnification, i.e., a ratio $k=(xx-blmxx)/xx$ of the pixel value xx of the pixel affected by the blooming and a true pixel value $(xx-blmxx)$ not affected by the blooming,
where xx=Rb, Gb, Bb, Rd, Gd or Bd.

As shown in FIG. 29, the blooming correction magnification indicated on a vertical axis has a maximum value of 1 and transitions to a value less than 1 according to a pixel value (input pixel value) indicated on a horizontal axis.

Areas are greatly classified into three types of areas from a small pixel value to a great pixel value (in a right direction):
 a pixel value area in which blooming is not generated,
 an area in which blooming is generated from some pixels, and
 an area in which all high-sensitivity pixels are saturated, A description will be given in connection with a pixel Rb by way of example. In the pixel value area in which blooming is not generated, the blooming correction magnification $k=(Rb-blmRb)/Rb=1$, and the output pixel value Rb' in the configuration of the correction processing unit 177 shown in FIG. 27 is set to be equal to the input pixel value Rb.

In the area in which blooming is generated from some pixels, the blooming correction magnification k is equal to $(Rb-blmRb)/Rb<1$, and the output pixel value Rb' in the configuration of the correction processing unit 177 shown in FIG. 27 is set to a pixel value equal to or less than the input pixel value Rb.

In the area in which all high-sensitivity pixels are saturated, the blooming correction magnification k is equal to $(Rb-blmRb)/Rb<1$, and the output pixel value Rb' in the configuration of the correction processing unit 177 shown in FIG. 27 is set to a pixel value equal to or less than the input pixel value Rb. In this case, the magnification is calculated based on a blooming amount that is based on generation of blooming from adjacent high-sensitivity pixels.

The correspondence data (LUT) shown in FIG. 29 is generated for each of Rb, Gb, Bb, Rd, Gd and Bd, and the LUT to be used is selected and used according to a type of each input pixel.

Through this process, a corrected pixel value obtained by removing the blooming amount can be calculated based on the respective input pixel values Rb, Gb, Bb, Rd, Gd and Bd and output.

Further, the example in which the correspondence relationship data between the pixel value Rb of the pixel affected by the blooming and the ratio $k=(Rb-blmRb)/Rb$ of the pixel value Rb of the pixel affected by the blooming and the true pixel value $(Rb-blmRb)$ not affected by the blooming is stored in the correction processing unit 177 described with reference to FIG. 27 has been described as the one-dimensional LUT 178.

Specifically, the correspondence relationship data is as shown in FIG. 29.

Since this correspondence relationship data shown in FIG. 29 is set as, for example, a complex broken line or a curve in the area in which blooming is generated from some pixels, a data amount increases when the relationship data is configured as an LUT.

Figure 30:
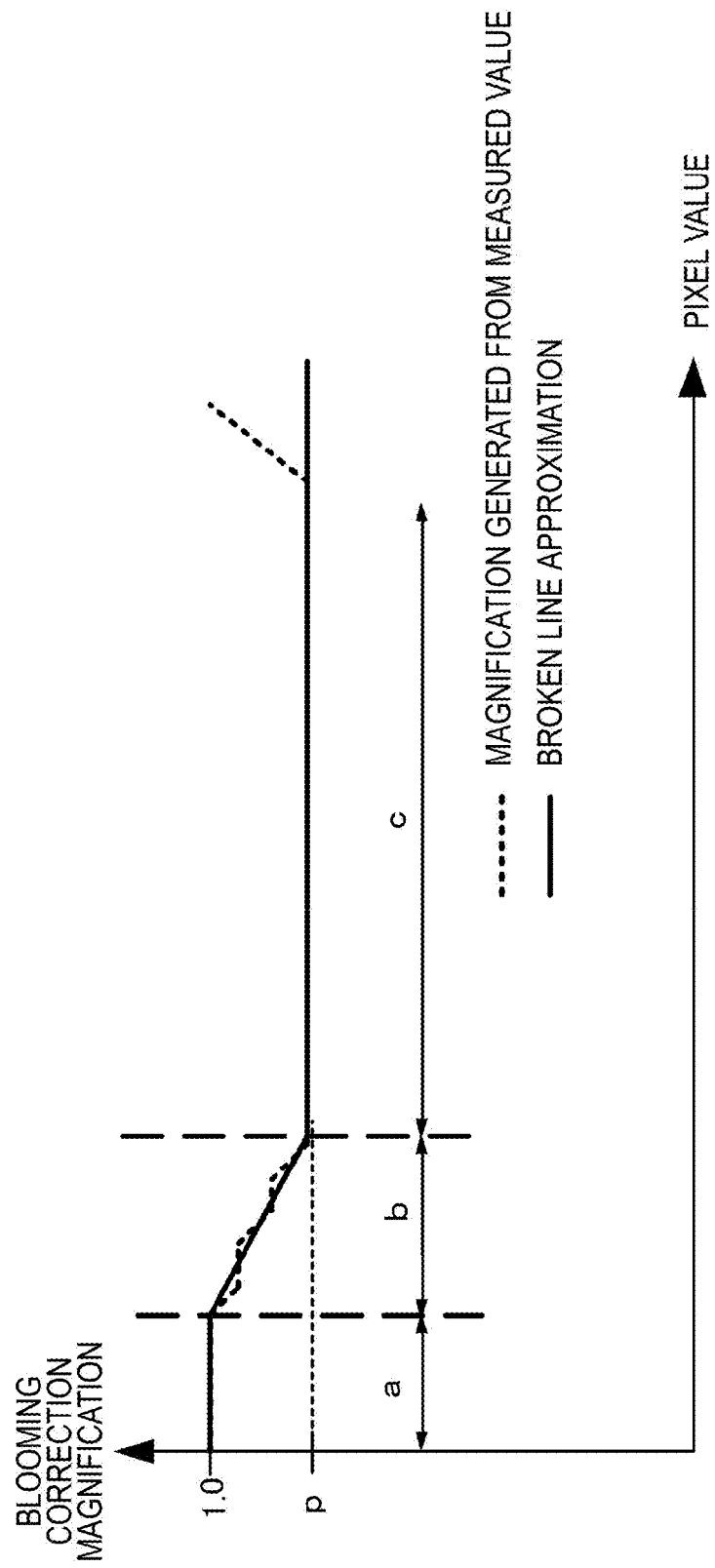
FIG. 30 is a diagram showing a result of executing an approximation process in which the relationship data shown in FIG. 29 is converted into simple broken line data.

The relationship data shown in FIG. 29 is subjected to an approximation process to obtain simple broken line data as shown in FIG. 30, and a process in which the approximation result is reflected may be performed.

Figure 31:
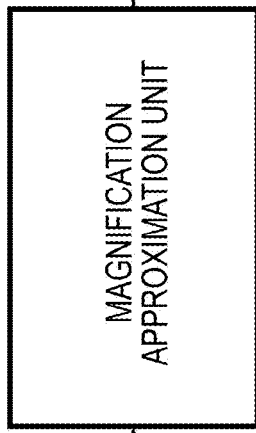
FIG. 31 is a diagram illustrating a configuration example of a correction processing unit having a magnification approximation unit.

Specifically, for example, a correction processing unit 180 having a magnification approximation unit 181 as shown in FIG. 31 can be configured.

The correction processing unit 180 shown in FIG. 31 has a configuration in which the magnification approximation unit 181 is set instead of the one-dimensional LUT 178 of the correction processing unit 177 described above with reference to FIG. 27.

The magnification approximation unit 181 outputs a blooming correction magnification according to the pixel value of the input pixel according to the simple broken line data as shown in FIG. 30.

Specifically, for example, the blooming correction magnification of 1 is output in an area a of the input pixel value shown in FIG. 30, the blooming correction magnification (1 to p) according to an approximate straight line of the area b shown in FIG. 30 is output in the area b, and the blooming correction magnification of p is output in an area c.

A multiplication unit 182 multiplies the input pixel value by the magnification and outputs a corrected pixel value Rb'.

Using such a configuration, a hardware configuration can be simplified

Similarly, in the configuration using the three-dimensional LUT described above with reference to FIG. 23, a correction unit using the approximate data can be configured.

This configuration example will be described with reference to FIG. 32.

Figure 32:
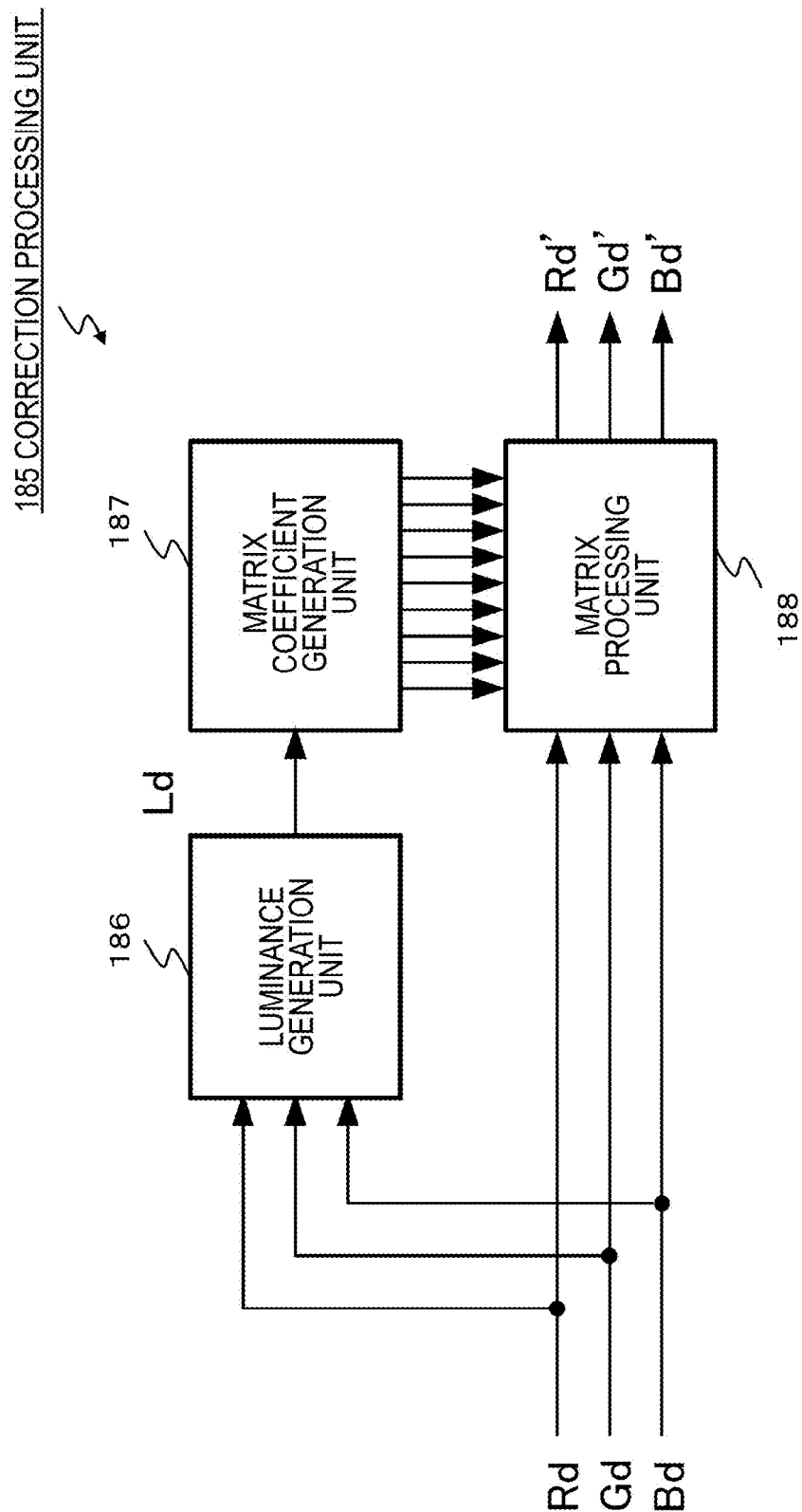
FIG. 32 is a diagram illustrating a configuration example of a correction processing unit using approximate data in a configuration using a three-dimensional LUT.

A correction processing unit 185 shown in FIG. 32 includes a luminance generation unit 186, a matrix coefficient generation unit 197, and a matrix processing unit 188.

The luminance generation unit 186 generates luminance information Ld from pixel values Rd, Gd and Bd of short-time exposure pixels (low-sensitivity pixels) that are input pixel values of the correction processing unit.

For example, the following weighted average is used.

$$Ld=(Crd \times Rd+Cgd \times Gd+Cbd \times Bd)/(Crd+Cgd+Cbd)$$

where Crd, Cgd, and Cbd are any coefficients.

The matrix coefficient generation unit 187 generates coefficients a(Ld), b(Ld), ..., i(Ld) depending on the luminance Ld generated by the luminance generation unit 186 and outputs the coefficients to the matrix processing unit 188.

The matrix processing unit 188 executes a matrix calculation of the input pixel values Rd, Gd and Bd using the coefficients a(Ld), b(Ld), ..., i(Ld) generated by the matrix coefficient generation unit 187 to generate and output corrected pixel values Rd', Gd' and Bd'.

The matrix calculation executed by the matrix processing unit 188 is, for example, a calculation shown in the following equation 9:

$$\begin{pmatrix} Rd' \\ Gd' \\ Bd' \end{pmatrix} = \begin{pmatrix} a(Ld) & b(Ld) & c(Ld) \\ d(Ld) & e(Ld) & f(Ld) \\ g(Ld) & h(Ld) & i(Ld) \end{pmatrix} \cdot \begin{pmatrix} Rd \\ Gd \\ Bd \end{pmatrix} \quad \text{(Equation 9)}$$

Further, when the luminance information Ld generated by the luminance generation unit 186 is a fixed value, the above matrix calculation is the same as a process called a linear matrix for correcting a color blend problem in a normal sensor. That is, the blooming problem can be corrected through an extension process for the linear matrix process.

Figure 33:
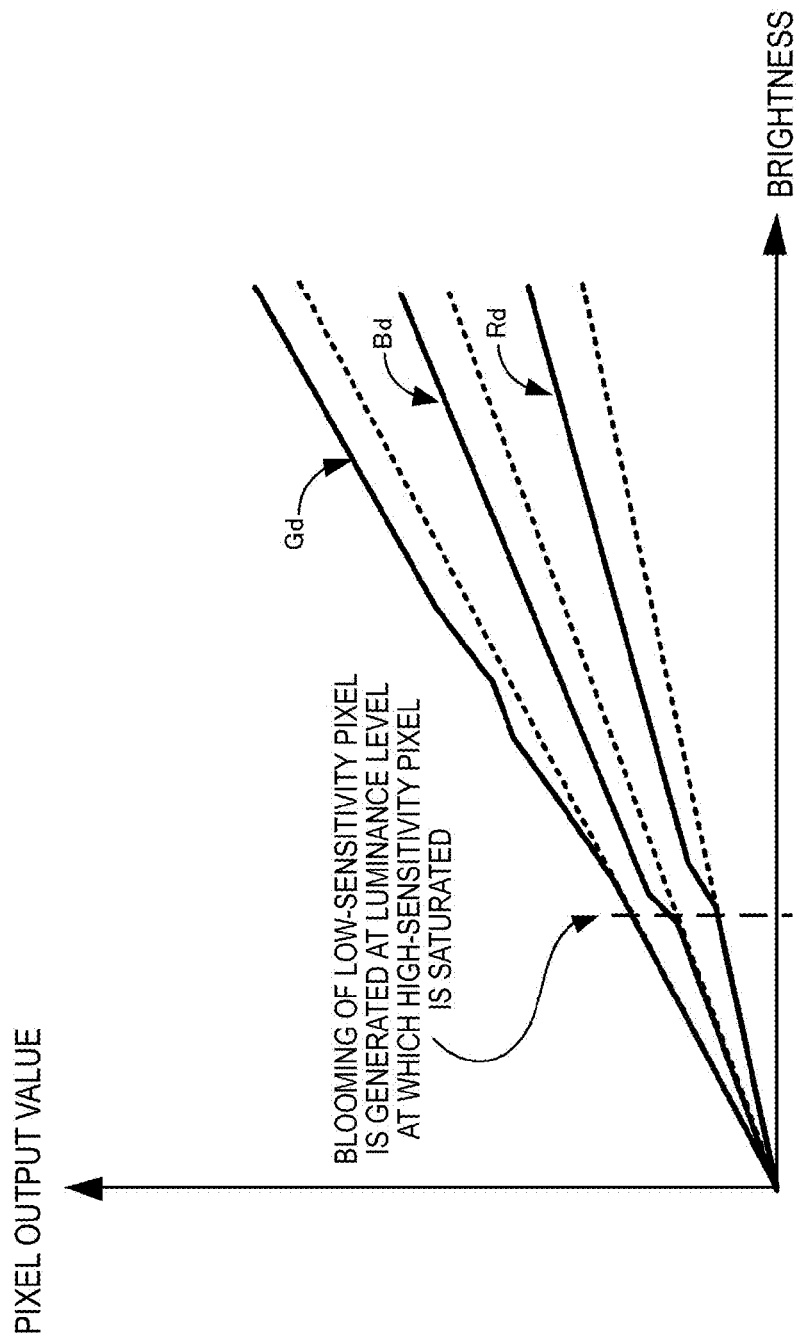
FIG. 33 is a diagram illustrating changes in brightness (luminance) of short-time exposure pixels (low-sensitivity pixels) Rd, Gd, and Bd of a pixel and a pixel output value.

FIG. 33 shows changes in brightness (luminance) of short-time exposure pixels (low-sensitivity pixels) Rd, Gd, and Bd of a pixel and a pixel output value.

Dotted lines indicate ideal characteristics, and solid lines indicate real characteristics affected by blooming.

In a place in which the brightness is small (a low luminance area), saturation of a high-sensitivity pixel does not occur and blooming is not caused, and accordingly, the ideal characteristic and the real characteristic are the same. However, as the pixel becomes bright, that is, in a high luminance area, a difference between the ideal characteristic and the real characteristic increases.

In the correction method using the matrix process, the blooming is corrected by increasing a coefficient for correcting the color blend as the brightness increases.

[4-5. Blooming Correction Process Using Combination of Different Correction Techniques]

In the above description, the following examples of the blooming correction process have been described:

4-1. Example of Basic Blooming Correction Process Using Mathematical Model 4-2. Example of Blooming Correction Process in which Over-Correction Solution is Performed Using Mathematical Model 4-3. Process Example in which Iterative Correction is Performed Using Mathematical Model 4-4. Example of Correction Process based on Pre-acquired Data such as LUT.

Among the correction processes, the respective process examples of (4-2) to (4-4) are techniques using the mathematical model, and it is possible to finally approach the ideal characteristic, but it is difficult to approach the true value with one calculation.

Meanwhile, the correction process (4-4) based on the pre-acquired data such as the LUT is a technique of correcting a characteristic into the ideal characteristic once by acquiring the correspondence relationship between the actual measurement value and the ideal characteristic in advance. However, implementation of the LUT is costly, and when the LUT is approximated in an equation, a correction error remains.

It is possible to compensate for disadvantages of the correction based on the mathematical model and the correction based on the pre-acquired data and realize a configuration using advantages of the respective corrections by combining the corrections.

Figure 34:
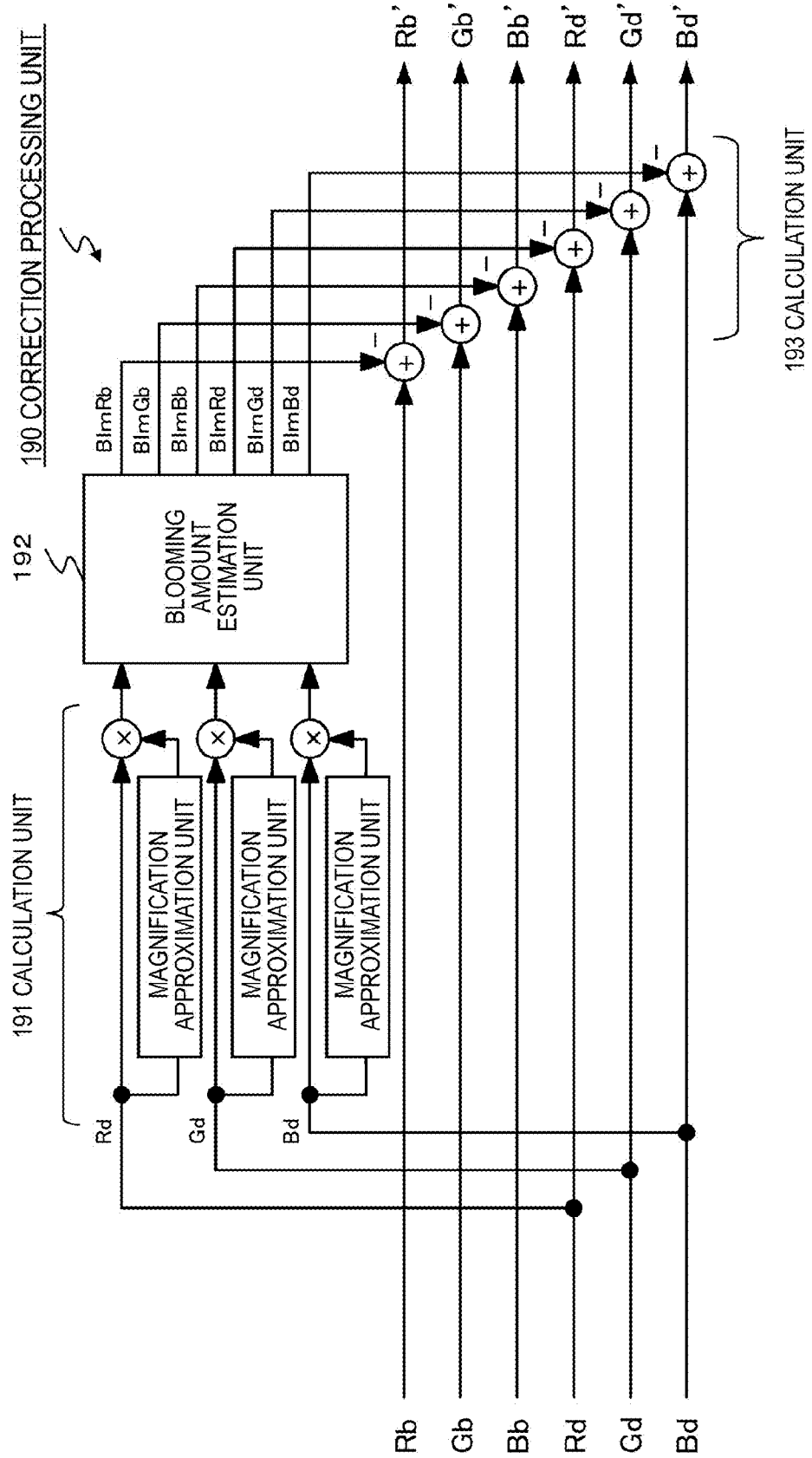
FIG. 34 is a diagram illustrating a configuration example of a correction processing unit that both compensates for disadvantages and utilizes advantages of each process by combining both correction based on the mathematical model and correction based on pre-acquired data.

For example, one combination configuration example is shown in FIG. 34.

A correction processing unit 190 shown in FIG. 34 includes a calculation unit 191 including the magnification approximation unit and the multiplication unit described above with reference to FIG. 31, a blooming amount estimation unit 192, and a calculation unit 193.

The calculation unit 191 receives respective pixel values Rd, Gd and Bd of short-time exposure pixels (low-sensitivity pixels) and generates corrected pixel values based on the blooming correction magnification according to the approximate straight line shown in FIG. 30 to input the corrected pixel values to the blooming amount estimation unit 192, as in the process described above with reference to FIG. 31.

The blooming amount estimation unit 192 generates blooming amounts BlmRb, BlmGb, BlmBb, BlmRd, BlmGd and BlmBd corresponding to the pixels Rb, Gb, Bb, Rd, Gd and Bd based on the corrected pixel values and outputs the blooming amounts to the calculation unit 193.

The calculation unit 193 executes a calculation process to subtract the blooming amounts BlmRb, BlmGb, BlmBb, BlmRd, BlmGd and BlmBd output from the blooming amount estimation unit 192 from the respective input pixel values Rb, Gb, Bb, Rd, Gd and Bd and outputs corrected pixel values Rb', Gb', Bb', Rd', Gd' and Bd' obtained by removing the blooming amounts.

In the correction processing unit 190, the calculation unit 191 calculates the correction values based on previously calculated data such as an LUT, and the blooming amount estimation unit of a subsequent stage executes the blooming amount estimation in which a mathematical model is applied using the correction values. The estimated blooming amounts are subtracted from the input pixel values to generate the corrected pixel values, and the corrected pixel values are output.

That is, convergence on a characteristic having an error but close to an ideal value is realized using the correction values based on the previously calculated data such as the LUT, and then, the blooming amounts using the mathematical model are calculated. Also, correction values for convergence on a more accurate ideal characteristic are generated and output.

[4-6. Example of Correction Process in which Solution to Over-Correction by Moving Subject or Edge is Performed]

Next, an example of a correction process in which a solution to over-correction by a moving subject or an edge is performed will be described.

In the correction method described above, modeling was performed on the assumption that an image is flat and there is no motion.

However, in fact, there are various subjects in an image of the image, including a subject with an edge and a subject with a motion.

In the example of the blooming correction process described above, the pixel values Rd, Gd and Bd of short-time exposure pixels (low-sensitivity pixels) are used for estimation of the blooming amounts. Accordingly, the following problems are generated due to influence of the edge or the moving subject in the image.

When the pixel value of the low-sensitivity pixel is relatively greater than the pixel value of the high-sensitivity pixel, a blooming correction amount is estimated to be large and accordingly over-correction is generated.

When the pixel value of the high-sensitivity pixel is relatively greater than the pixel value of the low-sensitivity pixel, the blooming correction amount is estimated to be small and accordingly insufficient correction is generated.

Such problems may be generated.

An example of a solution to these problems will be described with reference to FIG. 35.

In [4-1. Example of Basic Blooming Correction Process Using Mathematical Model] described above with reference to FIG. 18, the calculation of the corrected pixel values Rb', Gb' and Bb' of the long-time exposure pixels (high-sensitivity pixels) Rb, Gb and Bb was described as being performed through the following process:

$$Rb'=Rb-blmRb(Rd \times R, Gd \times R, Bd \times R)$$

$$Gb'=Gb-blmGb(Rd \times R, Gd \times R, Bd \times R)$$

$$Bb'=Bb-blmBb(Rd \times R, Gd \times R, Bd \times R)$$

The correction values of the high-sensitivity pixels Rb, Gb and Bb were calculated using the pixel values of the low-sensitivity pixels Rd, Gd and Bd, as described above.

However, when the pixel value of the low-sensitivity pixel becomes relatively greater than the pixel value of the high-sensitivity pixel due to influence of the moving subject or the edge, blooming is not generated since the high-sensitivity pixel is not saturated. Notwithstanding, when the process of calculating a corrected pixel value is used, a pixel value change due to blooming is regarded as being in the high-sensitivity pixel from the process of estimation from the pixel value of the low-sensitivity pixel. The correction according to the above equation is applied to the high-sensitivity pixel actually not affected by the blooming, resulting in over-correction.

Figure 35:
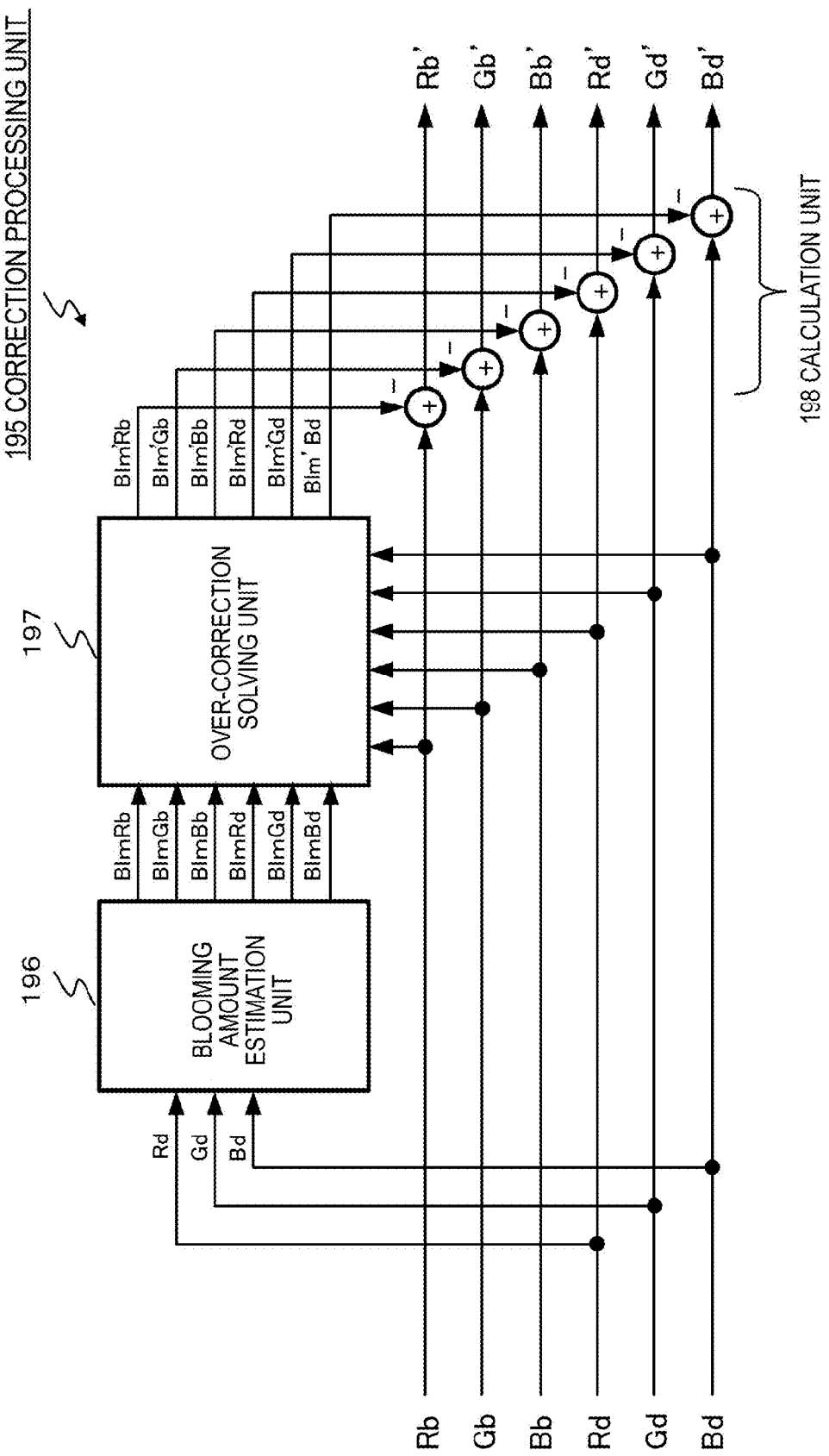
FIG. 35 is a diagram illustrating a configuration example of a correction processing unit in which an over-correction solution is performed.

A configuration example of a correction processing unit having a configuration for preventing such over-correction of the high-sensitivity pixels is shown in FIG. 35.

A correction processing unit 195 shown in FIG. 35 has a configuration in which an over-correction solving unit 197 is provided at a subsequent stage of the blooming amount estimation unit of the correction processing unit shown in FIG. 18.

The correction processing unit 195 shown in FIG. 35 receives respective pixel values Rb, Gb and Bb of long-time exposure pixels (high-sensitivity pixels) and respective pixel values Rd, Gd and Bd of short-time exposure pixels (low-sensitivity pixels) from an image sensor.

A blooming amount estimation unit 196 executes the same process as the blooming amount estimation unit 131 described above with reference to FIG. 18. That is, the blooming amount estimation unit 196 calculates estimation values for ideal pixel values Ri, Gi, and Bi according to the following approximate equation:

$$Ri \approx Rd \times R,$$

$$Gi \approx Gd \times R, \text{ and}$$

$$Bi \approx Bd \times R,$$

calculates blooming amounts blmxx(Rd×R, Gd×R, Bd×R) corresponding to the respective pixels according to Equations A and B described above, and outputs the calculated blooming amounts to the over-correction solving unit 197. Further, xx is Rb, Gb, Bb, Rd, Gd, or Bd.

The over-correction solving unit 197 receives the blooming amounts corresponding to the respective pixels from the blooming amount estimation unit 196, receives the input pixel values Rb, Gb, Bb, Rd, Gd and Bd of the correction processing unit, and performs correction on the blooming amounts calculated by the blooming amount estimation unit 196.

The over-correction solving unit 197 compares a previously set threshold (Th) with the pixel values of the input pixels, corrects the blooming amounts output to a calculation unit to generate corrected blooming amounts Blm'xx, and outputs the corrected blooming amount Blm'xx to the calculation unit 198.

Specifically, for example, the following process is executed. While a description will be given in connection with Rb by way of example, the same process is performed for other pixels.

When Rb<Th, the corrected blooming amount Blm'Rb=0.
When Rb≥Th, the corrected blooming amount Blm'Rb'BlmRb.

That is, when the input pixel value of the correction processing unit is smaller than the threshold (Th), the blooming amount calculated by the blooming amount estimation unit 196 is corrected to be 0 and output to the calculation unit 198.

Further, when the input pixel value of the correction processing unit is equal to or more than the threshold (Th), the blooming amount calculated by the blooming amount estimation unit 196 is directly output to the calculation unit 198.

The calculation unit 198 shown in FIG. 35 executes a process of subtracting the blooming amount blm'xx(Rd×R, Gd×R, Bd×R) corresponding to the respective pixels calculated by the over-correction solving unit 197 from the input values Rb, Gb, Bb, Rd, Gd and Bd of the correction processing unit.

Further, the threshold (Th) is set to a saturation value level of a pixel. Through this process, for example, when the pixel value of the input pixel of the correction processing unit is not saturated, over-correction based on a determination that blooming from the color pixel is not generated is prevented.

Further, the above process is performed, for example, as a process of setting the blooming amounts to 0 when a noticed pixel that is a blooming correction target is an image area with motion or an edge area.

For this process, for example, motion information indicating whether the noticed pixel is a motion area or edge information indicating whether the noticed pixel is an edge area may be input to the correction processing unit 195 and the process may be switched according to the information. Further, an example of a configuration of the blooming correction processing unit having such a configuration will be described with reference to FIG. 38 later.

Further, the calculation of the corrected pixel values described above with reference to FIG. 18 was performed according to the following corrected pixel value calculation equations, as described above:

$$Rb' \approx Rb - blmRb(Rd \times R, Gd \times R, Bd \times R)$$

$$Gb' \approx Gb - blmGb(Rd \times R, Gd \times R, Bd \times R)$$

$$Bb' \approx Bb - blmBb(Rd \times R, Gd \times R, Bd \times R)$$

In applying the equations, the pixel values Rb, Gb and Bb of the high-sensitivity pixels that are the input pixel values of the correction processing unit may be saturated.

Even when the high-sensitivity pixel is saturated and a constant maximum value is output, low-sensitivity pixels Rd, Gd and Bd increase and values of the blooming amounts blmRb, blmGb and blmBb included in the corrected pixel value calculations increase.

Accordingly, there may be a problem in that the corrected pixel values of the blooming correction result gradually decrease.

A concrete example will be described with reference to FIG. 36(A).

Figure 36:
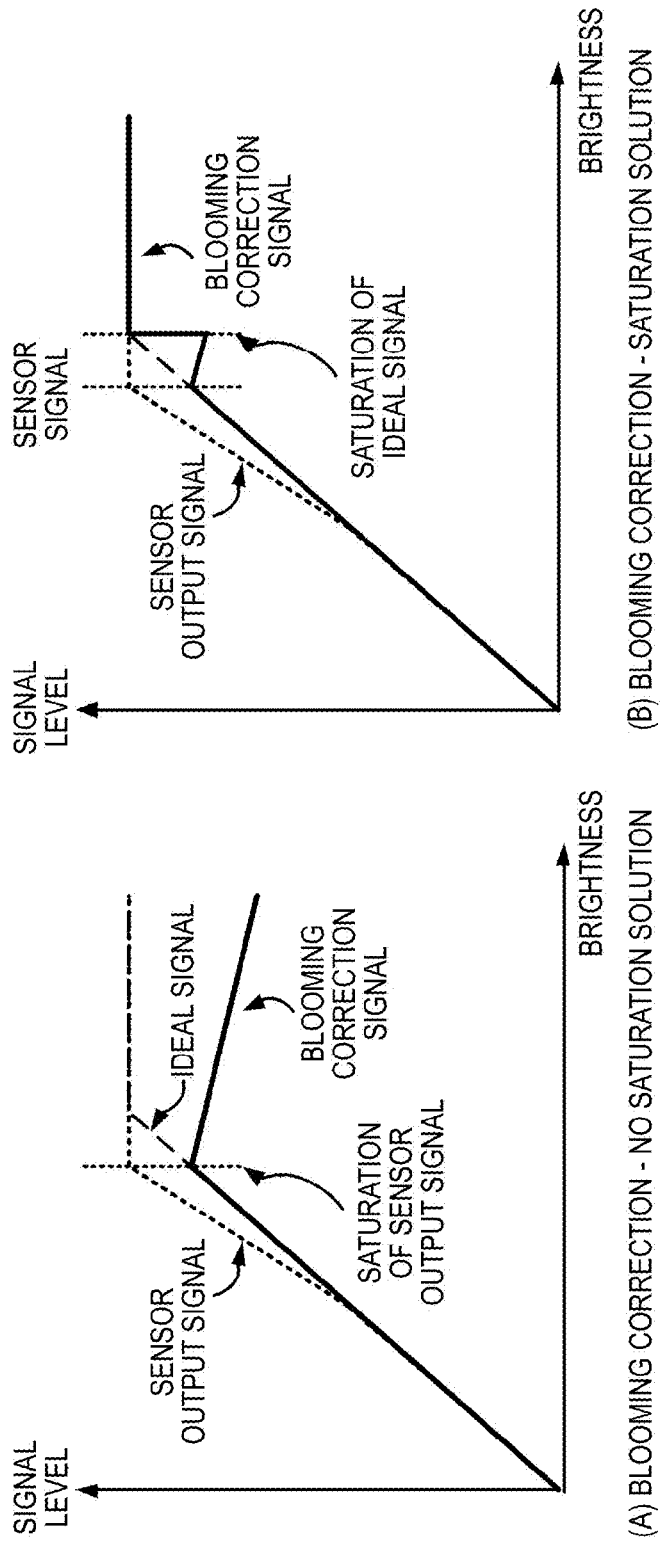
FIG. 36 is a diagram illustrating a concrete example of a problem in which a corrected pixel value of a blooming correction result gradually decreases.

In FIG. 36(A), a horizontal axis indicates brightness of a subject and a vertical axis is an output signal value (pixel value) of a pixel.

A solid line indicates a blooming correction signal that is an output signal when blooming correction is executed, a fine dotted line indicates a sensor signal that is an output from an image sensor when the blooming correction is not executed, and a coarse dotted line indicates an ideal signal.

As described above, when the blooming correction is performed, the signal value is reduced by a blooming amount included in the above corrected pixel value calculation equation.

The pixel value of the short-time exposure pixel (low-sensitivity pixel) increases when subject brightness increases, and the blooming amount also increases calculated as the result.

As a result, for example, in the brightness area exceeding a saturation point of the sensor output signal shown in FIG. 36(A), as brightness increases, a blooming correction signal decreases.

This results from the subject brightness being not reflected. As a measure for preventing occurrence of such a situation, correction may be set to stop when the saturation is detected.

The detection of the saturation may be performed using, for example, any of the following two methods (a) and (b).

(a) A method of detecting saturation of a high-sensitivity pixel using the pixel value of the high-sensitivity pixel that is the input pixel value of the correction processing unit. Specifically, a comparison between a previously set threshold (Th1) and an input pixel value of the high-sensitivity pixel, for example, Rb, is performed as follows.

Rb>Th

When the above inequality is satisfied, it is determined to be saturated and the blooming correction is not performed. When the above inequality is not satisfied, it is determined not to be saturated and the blooming correction is executed.

(b) A method of detecting saturation of a high-sensitivity pixel using the pixel value of the low-sensitivity pixel that is the input pixel value of the correction processing unit. Specifically, a comparison between a previously set threshold (Th2) and the input pixel value of the low-sensitivity pixel, for example, Rd, is performed as follows.

Rd>Th

When the above inequality is satisfied, it is determined to be saturated and the blooming correction is not performed. When the above inequality is not satisfied, it is determined not to be saturated and the blooming correction is executed.

FIG. 36(B) shows an example in which saturation of a high-sensitivity pixel is detected using a low-sensitivity pixel and correction of a detection unit is not performed, in which a blooming correction signal indicated by a solid line is output as a signal value that is not degraded in a position in which the blooming correction signal exceeds a saturation level of an ideal signal but maintains a constant level.

[5. Example of Configuration of Imaging Device]

Next, an example of an overall configuration of a process imaging device that executes the above-described blooming correction will be described.

[5-1 Configuration Example 1 of Imaging Device]

Figure 37:
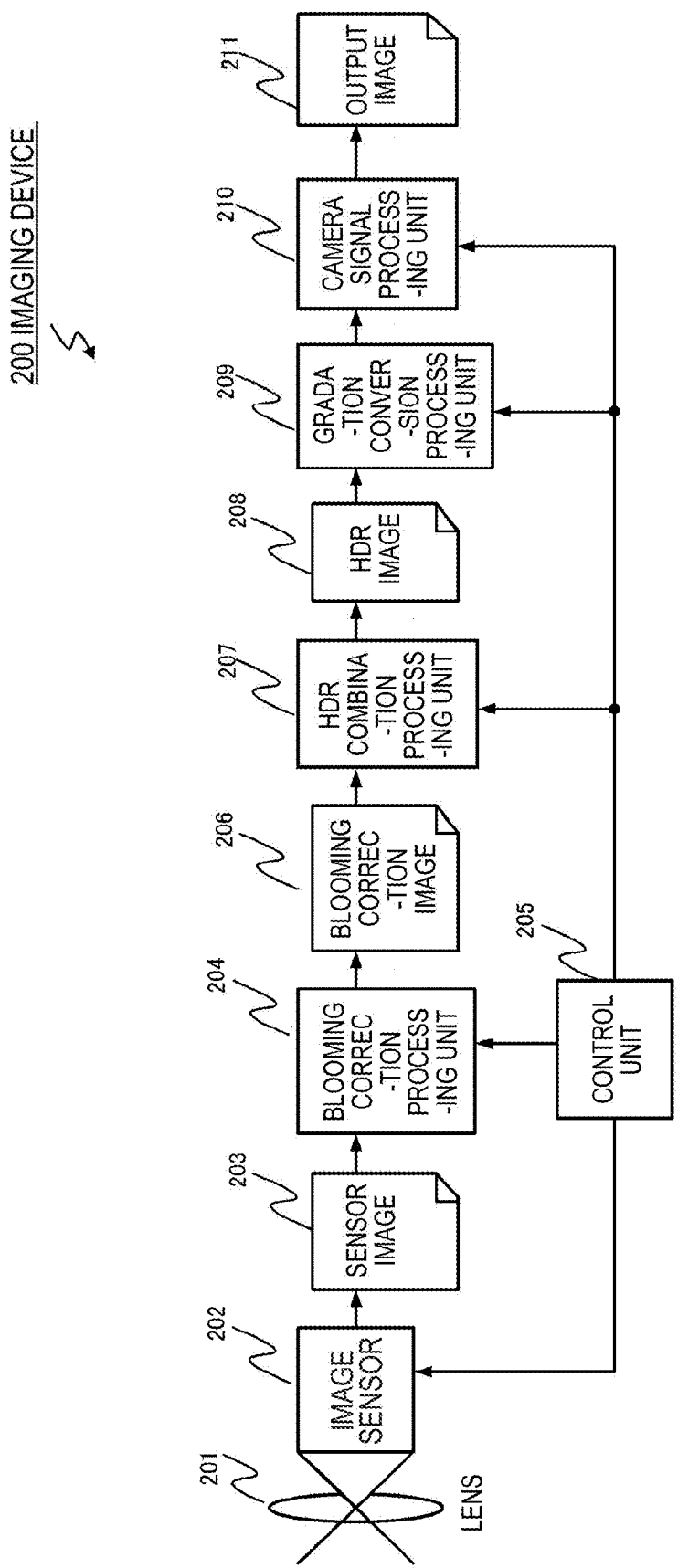
FIG. 37 is a diagram illustrating a configuration example of an imaging device 200 executing a blooming correction process.

FIG. 37 is a diagram showing a configuration example of an imaging device 200 that executes the above-described blooming correction process.

The imaging device 200 receives a subject light via a lens 201 and inputs the subject light to an image sensor (image sensor) 202.

The image sensor (image sensor) 202 is, for example, an image sensor whose exposure can be controlled so that pixels have different exposure times, as described above with reference to FIG. 8. An exposure control signal is input from a control unit 205. Further, an exposure control process in units of pixel areas is disclosed, for example, in Japanese Patent Application Laid-Open Publication No. 2006-253876 described above, and a disclosed technique may be applied.

The control unit 205 executes overall control of the imaging device 200. The control unit 205 has a program execution function of, for example, a CPU, and executes control of each component, for example, according to a program stored in a storage unit, which is not shown, to perform control of data processing, such as image capture and image correction, executed in the imaging device.

Further, the image capture process according to settings of long-time exposure and short-time exposure is executed, for example, according to the process sequence described above with reference to FIG. 9.

As described above with reference to FIG. 9, the exposure time is determined by pixel reset and reading timings When the reading timing is constant,
an exposure time increases by setting the reset timing to an earlier time, and
the exposure time decreases by setting the reset timing to a later time.

For example, sensitivity arrangements of various patterns as shown in FIG. 8 can be realized by performing control on each pixel (or each row).

As shown in FIG. 37, a signal of each pixel generated by a photoelectric conversion process in the image sensor 202 is input as a sensor image 203 to a blooming correction processing unit 204.

The blooming correction processing unit 204 executes the blooming correction process described above.

An example of an overall configuration of the blooming correction processing unit 204 will be described with reference to FIG. 38.

The blooming correction processing unit 204 includes a signal generation unit 251, a motion detection unit 252, an edge detection unit 253, and a correction processing unit 254.

The signal generation unit 251 acquires or generates six pixel values corresponding to a pixel position of one noticed pixel that is a correction target in the correction processing unit 254, that is, RGB pixel values of long-time exposure pixels (high-sensitivity pixels): Rb, Gb and Bb, and RGB pixel values Rd, Gd and Bd of short-time exposure pixels (low-sensitivity pixels).

Specifically, values of pixels with respective colors and sensitivities are acquired from peripheral pixels of the noticed pixel.

Rb: a pixel value of a red, long-time exposure pixel (high-sensitivity pixel)

Gb: a pixel value of a green, long-time exposure pixel (high-sensitivity pixel)

Bb: a pixel value of a blue, long-time exposure pixel (high-sensitivity pixel)

Rd: a pixel value of a red, short-time exposure pixel (low-sensitivity pixel)

Gd: a pixel value of a green, short-time exposure pixel (low-sensitivity pixel)

Bd: a pixel value of a blue, short-time exposure pixel (low-sensitivity pixel).

For a signal generation process example in the signal generation unit 251, a technique of generating a pixel value through linear interpolation using peripheral pixels will be described with reference to FIG. 39.

FIG. 39 is a diagram illustrating an example of a process when a noticed pixel that is an execution target of the blooming correction process is a center Rb33 among 5×5 pixels shown in FIG. 39.

The signal generation unit 251 sets the 5×5 pixels, including the noticed pixel Rb33, which is a center as shown in FIG. 39, as a reference pixel area and calculates Rb, Gb, Bb, Rd, Gd, and Bd according to the following equation (Equation 31).

$$Rb=(c31 \times Rb31+c33 \times Rb33+c35 \times Rb35)/(c31+c33+c35)$$

$$Gb=(c32 \times Gb32+c34 \times Gb34+c41 \times Gb41+c43 \times Gb43+c45 \times Gb45)/(c32+c34+c41+c43+c45)$$

$$Bb=(c41 \times Bb42+c44 \times Bb44)/(c41+c44)$$

$$Rd=(c11 \times R11+c13 \times Rd13+c15 \times Rd15+c51 \times Rd51+c53 \times Rd53+c55 \times Rd55)/(c11+c13+c15+c51+c53+c55)$$

$$Gd=(c12 \times Gd12+c14 \times Gd14+c21 \times Gd21+c23 \times Gd23+c25 \times Gd25+c52 \times Gd52+c54 \times Gd54)/(c12+c14+c21+c23+c25+c52+c54)$$

$$Bd=(c22 \times Bd22+c24 \times Bd24)/(c22+c24) \quad \text{(Equation 31)}$$

where c11 to c55 denote filter coefficients

The above equation (Equation 31) represents a process based on a process of applying the respective pixels Rb, Gb, Bb, Rd, Gd and Bd included in the 5×5 pixel area whose center is the noticed pixel as reference pixels and calculating respective pixel values in the noticed pixel position through a linear interpolation process based on the reference pixels. Further, the filter coefficient may be determined according to a distance between the noticed pixel and the reference pixel or a pixel value gradient.

Respective pixel values Rb, Gb, Bb, Rd, Gd and Bd in the noticed pixel position generated by the signal generation unit 251 are input to the correction processing unit 254.

The correction processing unit 254 executes the above-described blooming correction, that is, a blooming correction process, according to any process aspect of the following blooming correction processes described in the item [4. Embodiment of Blooming Correction Process]:

4-1. Example of Basic Blooming Correction Process Using Mathematical Model 4-2. Example of Blooming Correction Process in which Over-Correction Solution is Performed Using Mathematical Model 4-3. Process Example in which Iterative Correction is Performed Using Mathematical Model 4-4. Example of Correction Process based on Pre-Acquired Data such as LUT 4-5. Blooming Correction Process Using Combination of Different Correction Techniques 4-6. Example of Correction Process in which Solution to Over-Correction by Moving Subject or Edge is Performed The motion detection unit 252 and the edge detection unit 253 are used when a process corresponding to [4-6. Example of Correction Process in which Solution to Over-Correction by Moving Subject or Edge is Performed] is performed.

As described above, when there is an edge part or a moving subject in the image, the correction may be performed with blooming excess or may be insufficient. In order to minimize such side-effects, detection is performed by the motion detection unit 252 and the edge detection unit 253, and detection information from the motion detection unit 252 and the edge detection unit 253 is provided to the correction processing unit 254.

The motion detection unit 252 detects if an area of the image is a moving subject.

When a low-sensitivity image of the G pixel included in the sensor image 203 input from the image sensor 202 is Gd, a high-sensitivity image is Gb, and a ratio of exposure times is R, the following relationship is ideally satisfied:

$$Gb=Gd \times R,$$

where R denotes an exposure ratio Tb/Td of the long-time exposure pixel and the short-time exposure pixel.

A motion detection method in which, using this premise, a difference (Mdet0) between the low-sensitivity image Gd and the high-sensitivity image Gb is calculated according to the following equation and it is determined that there is a motion when the difference is equal to or more than a predetermined threshold may be applied:

$$Mdet0=|Gb-Gd \times R|$$

Alternatively, a motion detection method in which a ratio (Mdet1) between the low-sensitivity image Gd and the high-sensitivity image Gb is calculated according to the following equation and it is determined that there is a motion when the ratio (Mdet1) is equal to or more than a predetermined threshold may be applied:

$$G\text{Max}=\text{Max}(Gb, Gd \times R),$$

$$G\text{Min}=\text{Min}(Gb, Gd \times R), \text{and}$$

$$Mdet1=G\text{Max}/G\text{Min}.$$

Max(A, B) refers to a function that returns a greater of A and B, and Min(A, B) refers to a function that returns a smaller of A and B. When the difference (Mdet0) or the ratio (Mdet1) is a sufficiently great value in consideration of the influence of noise or blooming, motion is determined to be in the image, and motion detection information is provided to the correction processing unit 254.

The edge detection unit 253 detects if a noticed pixel that is a blooming correction target area is an edge area.

For example, in an edge determination process for the noticed pixel Rb33 shown in FIG. 39, an edge determination value (Edet) is calculated using peripheral pixel values as follows:

$$Edet=|Gb32-Gb34|+|Gb32-Gb43|+|Gb43-Gb34|+|Gb12-Gd23|+|Gd23-Gd14|$$

The edge determination value (Edet) is calculated by summing absolute values of differences between the same color adjacent pixels as described above.

When the value of the edge determination value (Edet) is sufficiently greater than a value in which noise is considered, the edge is determined to be therein.

This edge determination information is provided to the correction processing unit 254.

When the information from the motion detection unit 252 corresponding to the noticed pixel that is the process target is the information indicating the motion or when the information from the edge detection unit 253 is information indicating the edge area, the correction processing unit 254 executes the blooming correction according to [4-6. Example of Correction Process in which Solution to Over-Correction by Moving Subject or Edge is Performed] described above.

Returning to FIG. 37, description of a configuration and a process of the imaging device 200 will continue.

As described above, the blooming correction processing unit 204 executes a blooming correction process according to any process aspect of the following blooming correction processes described in the item [4. Embodiment of Blooming Correction Process], that is, 4-1. Example of Basic Blooming Correction Process Using Mathematical Model 4-2. Example of Blooming Correction Process in which Over-Correction Solution is Performed Using Mathematical Model 4-3. Process Example in which Iterative Correction is Performed Using Mathematical Model 4-4. Example of Correction Process based on Pre-Acquired Data such as LUT 4-5. Blooming Correction Process Using Combination of Different Correction Techniques 4-6. Example of Correction Process in which Solution to Over-Correction by Moving Subject or Edge is Performed.

A blooming correction image 206 is generated as a result of the blooming correction and output to an HDR (wide dynamic range image) combination processing unit 207.

The HDR (wide dynamic range image) combination processing unit 207 executes a combination process using the long-time exposure pixel (high-sensitivity pixel) and the short-time exposure pixel (low-sensitivity pixel) included in the image to generate a wide dynamic range image.

Figure 40:
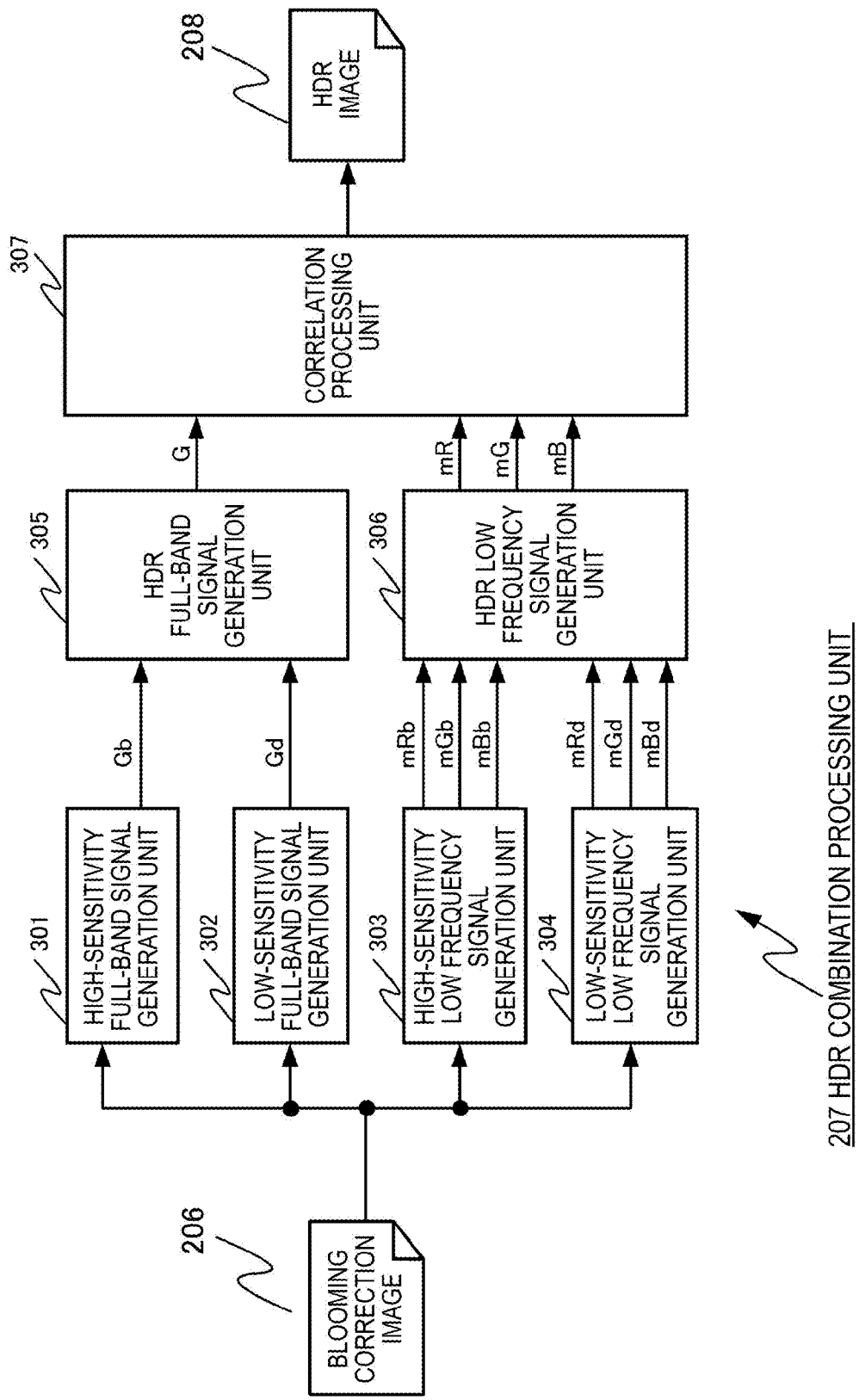
FIG. 40 is a diagram illustrating a detailed configuration example of an HDR (wide dynamic range image) combination processing unit.

An example of a detailed configuration of the HDR (wide dynamic range image) combination processing unit 207 is shown in FIG. 40.

A high-sensitivity full-band signal generation unit 301 and a low-sensitivity full-band signal generation unit 302 generate pixel full-band signals of the G pixel containing a high-frequency component using only a pixel in the vicinity. When this full-band signal generation process is performed, linear interpolation or edge direction determination is used. For example, a center pixel Bb44 among 7×7 pixels shown in FIG. 41 is a noticed pixel, and equations for generating full-band signals of a G pixel in a noticed pixel position through linear interpolation are shown:

$$Gb=(3\cdot Gb34+2\cdot Gb43+2\cdot Gb45+Gb74)/8 \quad \text{(Equation 32)}$$

$$Gd=(4\cdot Gd54+Gd23+Gd25)/6 \quad \text{(Equation 33)}$$

The high-sensitivity full-band signal generation unit 301 generates the high-sensitivity full-band signal of the G pixel according to Equation 32.

The low-sensitivity full-band signal generation unit 302 generates the low-sensitivity full-band signal of the G pixel according to Equation 33.

A high-sensitivity low frequency signal generation unit 303 and a low-sensitivity low frequency signal generation unit 304 also generate low frequency signals through a process using peripheral pixels of the noticed pixel. The center pixel Bb44 among the 7×7 pixels shown in FIG. 41 is the noticed pixel, and equations for generating low frequency signals mRb, mGb, mBb, mRd, mGd and mBd corresponding to Rb, Gb, Bb, Rd, Gd and Bd in the noticed pixel position are shown.

Respective R, G and B signals containing only low frequency components using peripheral pixels are generated.

$$mRb=\Sigma(Crbij \times Rbij)/\Sigma Crbij \quad \text{(Equation 34)}$$

$$mGb=\Sigma(Cgbij \times Gbij)/\Sigma Cgbij \quad \text{(Equation 35)}$$

$$mBb=\Sigma(Cbbij \times Bbij)/\Sigma Cbbij \quad \text{(Equation 36)}$$

$$mRd=\Sigma(Crdij \times Rdij)/\Sigma Crdij \quad \text{(Equation 37)}$$

$$mGd=\Sigma(Cgdij \times Gdij)/\Sigma Cgdij \quad \text{(Equation 38)}$$

$$mBd=\Sigma(Cbdij \times Bdij)/\Sigma Cbdij \quad \text{(Equation 39)}$$

where Crbij, Cgbij, Cbbij, Crdij, Cgdij and Cbdij denote coefficients.

The high-sensitivity low frequency signal generation unit 303 generates low frequency signals mRb, mGb and mBb corresponding to Rb, Gb and Bb in the noticed pixel position according to Equations 34, 35 and 36.

The low-sensitivity low frequency signal generation unit 304 generates low frequency signals mRd, mGd and mBd corresponding to Rd, Gd and Bd in the noticed pixel position according to Equations 37, 38 and 39.

Next, configurations and processes of an HDR full-band signal generation unit 305 and an HDR low frequency signal generation unit 306 will be described.

Figure 42:
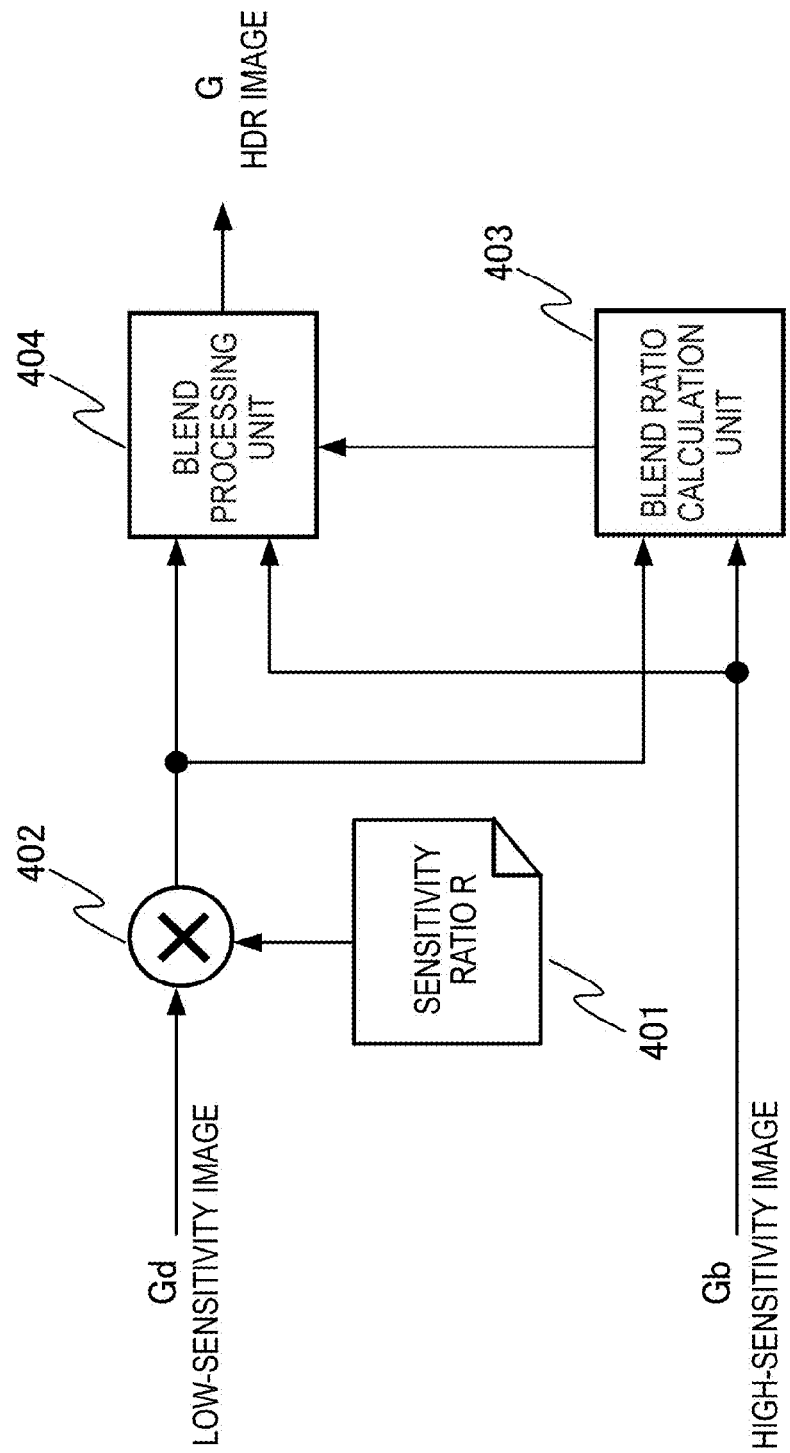
FIG. 42 is a diagram illustrating a configuration example of an HDR full-band signal generation unit.

FIG. 42 is a diagram showing an example of a configuration of the HDR full-band signal generation unit 305.

The HDR full-band signal generation unit 305 combines the G high-sensitivity image generated by the high-sensitivity full-band signal generation unit 301 and the G low-sensitivity image generated by the low-sensitivity full-band signal generation unit 302 to generate an HDR image.

A sensitivity ratio R 401 represents a sensitivity ratio of the low-sensitivity image and the high-sensitivity image or a ratio of exposure times. Sensitivity-adjusted low- and high-sensitivity images obtained by multiplying the low-sensitivity image by the sensitivity ratio R 401 are input to and blended by a blend processing unit 404.

The blend processing unit 404 executes a blend process for pixels corresponding to the low-sensitivity image and the high-sensitivity image according to a blend ratio calculated by the blend ratio calculation unit 403.

The blend ratio calculation unit 403 sets the blend ratio according to the brightness of the process target pixel (noticed pixel) and outputs the blend ratio to the blend processing unit 404.

Specifically, when the noticed pixel is bright, the high-sensitivity pixel Gd is saturated and a blend ratio is determined so that a weight of the unsaturated low-sensitivity pixel Gd increases. When the noticed pixel is dark, the low-sensitivity pixel Gd is buried in noise and a blend ratio is determined so that the weight of a high-sensitivity pixel Gd with less noise increases.

When the process configuration shown in FIG. 42 is represented as an equation, the process configuration can be described as follows:

If (Gb<T,)

G=Gb

Else

G=Gd×R

The HDR low frequency signal generation unit 306 also executes the same process as that described with reference to FIG. 42 for the following signal combinations:
a process of mRb and mRd,
a process of mGb and mGd, and
a process of mBb and mBd.

The correlation processing unit 307 executes a process of generating R and B signals using the G high-frequency component. For example, R and B signals are generated using the high-frequency component of G according to the following equations (Equations 40 and 41):

$$R=mR \times G/mG \qquad \text{(Equation 40)}$$

$$B=mB \times G/mG \qquad \text{(Equation 41)}$$

Returning to FIG. 37, description of a configuration and a process of the imaging device 20 will continue.

The HDR image 208 generated by the HDR combination processing unit 207 is input to a gradation conversion unit 209, and a gradation conversion process is executed. Specifically, for example, a process of reducing the number of constituent bits of each pixel of the HDR image 208, for example, a process of setting 10-bit data to be 8-bit data, is executed.

This process is a process executed as a process for conversion into the number of bits that can be processed in a camera signal processing unit 210 of a next stage.

The camera signal processing unit 210 executes general camera signal processing, for example, signal processing such as a white balance adjustment process or a gamma correction process to generate and output an output image 211.

[5-2. Configuration Example 2 of Imaging Device]

Figure 43:
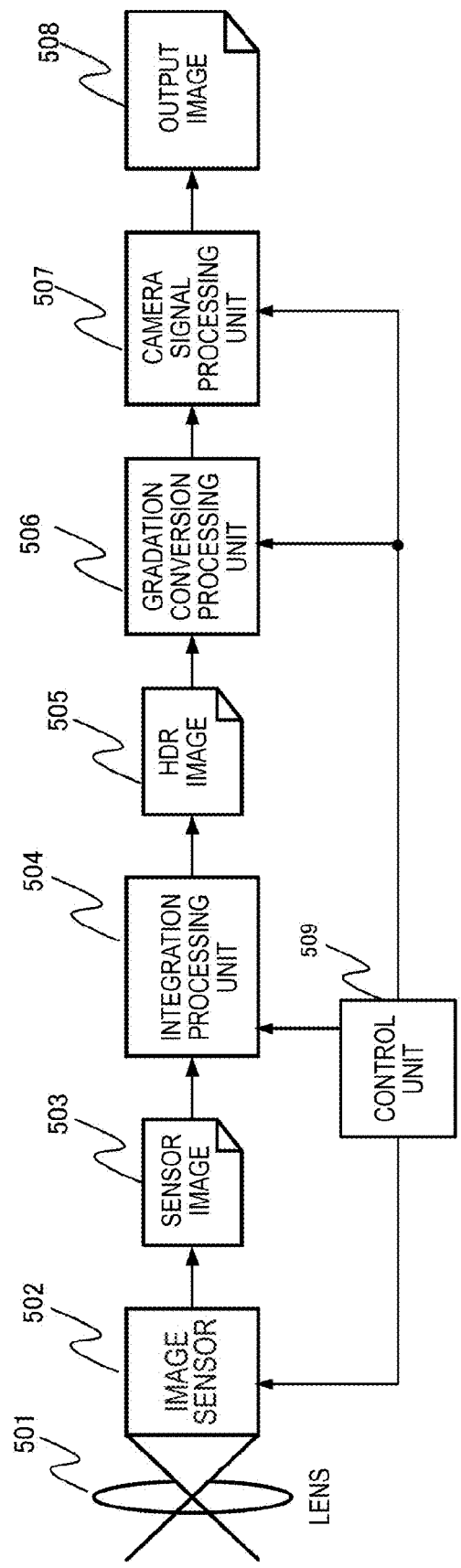
FIG. 43 is a diagram illustrating a second configuration example of the imaging device.

Next, a second configuration example of the imaging device will be described with reference to FIG. 43.

In an imaging device 500 shown in FIG. 43, the blooming correction processing unit 204 and the HDR combination processing unit 207 of the imaging device 200 described with reference to FIG. 37 are configured as one integration processing unit 504.

Through this configuration, a blooming correction process and an HDR combination process are performed together as a common process, and a calculation time or hardware implementation cost can be reduced.

The imaging device 500 receives a subject light via a lens 501 and inputs the subject light to an image sensor (image sensor) 502.

The image sensor (image sensor) 502 is, for example, an image sensor whose exposure can be controlled so that pixels have different exposure times, as described above with reference to FIG. 8. An exposure control signal is input from a control unit 509.

A signal of each pixel generated by a photoelectric conversion process in the image sensor 502 is input as a sensor image 503 to the integration processing unit 504.

The integration processing unit 504 executes the blooming correction and the high dynamic range (HDR) image generation process.

Figure 44:
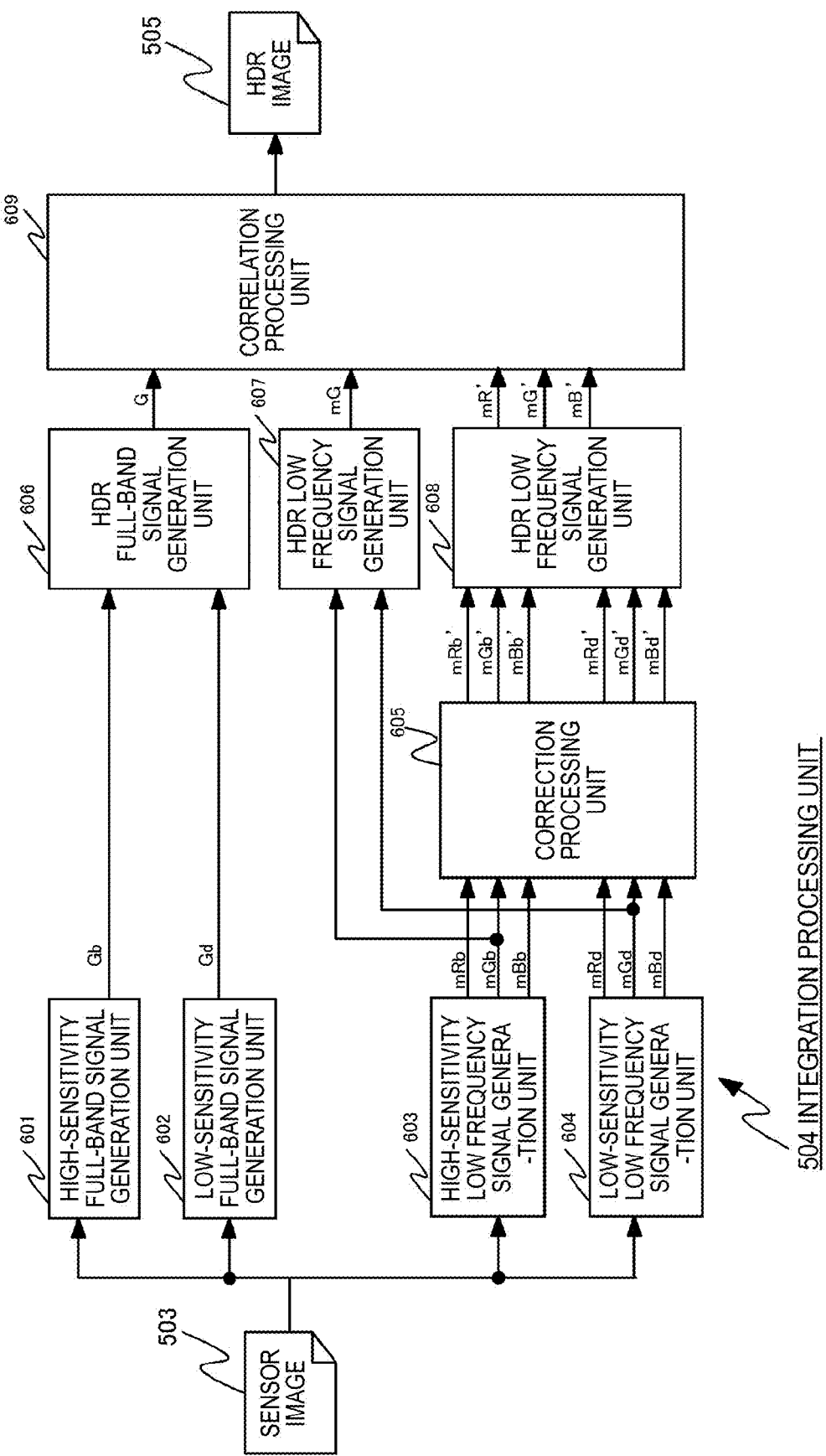
FIG. 44 is a diagram illustrating a concrete example of an integration processing unit.

FIG. 44 shows a concrete example of the integration processing unit 504.

For the blooming correction, all sensitivity and color data is necessary. However, the blooming correction is performed herein using low frequency signals mRb, mGb, mBb, mRd, mGd and mBd generated by a high-sensitivity low frequency signal generation unit 603 and a low-sensitivity low frequency signal generation unit 604.

A high-sensitivity full-band signal generation unit 601 and a low-sensitivity full-band signal generation unit 602 generate a pixel full-band signal of a G pixel also containing a high-frequency component using only a pixel in the vicinity.

The high-sensitivity full-band signal generation unit 601 generates a high-sensitivity full-band signal of the G pixel according to Equation 32 described above.

The low-sensitivity full-band signal generation unit 602 generates a low-sensitivity full-band signal of the G pixel according to Equation 33 described above.

The high-sensitivity low frequency signal generation unit 603 and the low-sensitivity low frequency signal generation unit 604 also generate low frequency signals through a process using peripheral pixels of the noticed pixel.

The low frequency signals mRb, mGb, mBb, mRd, mGd and mBd are generated according to Equations 34 to 39 described above.

Figure 38:
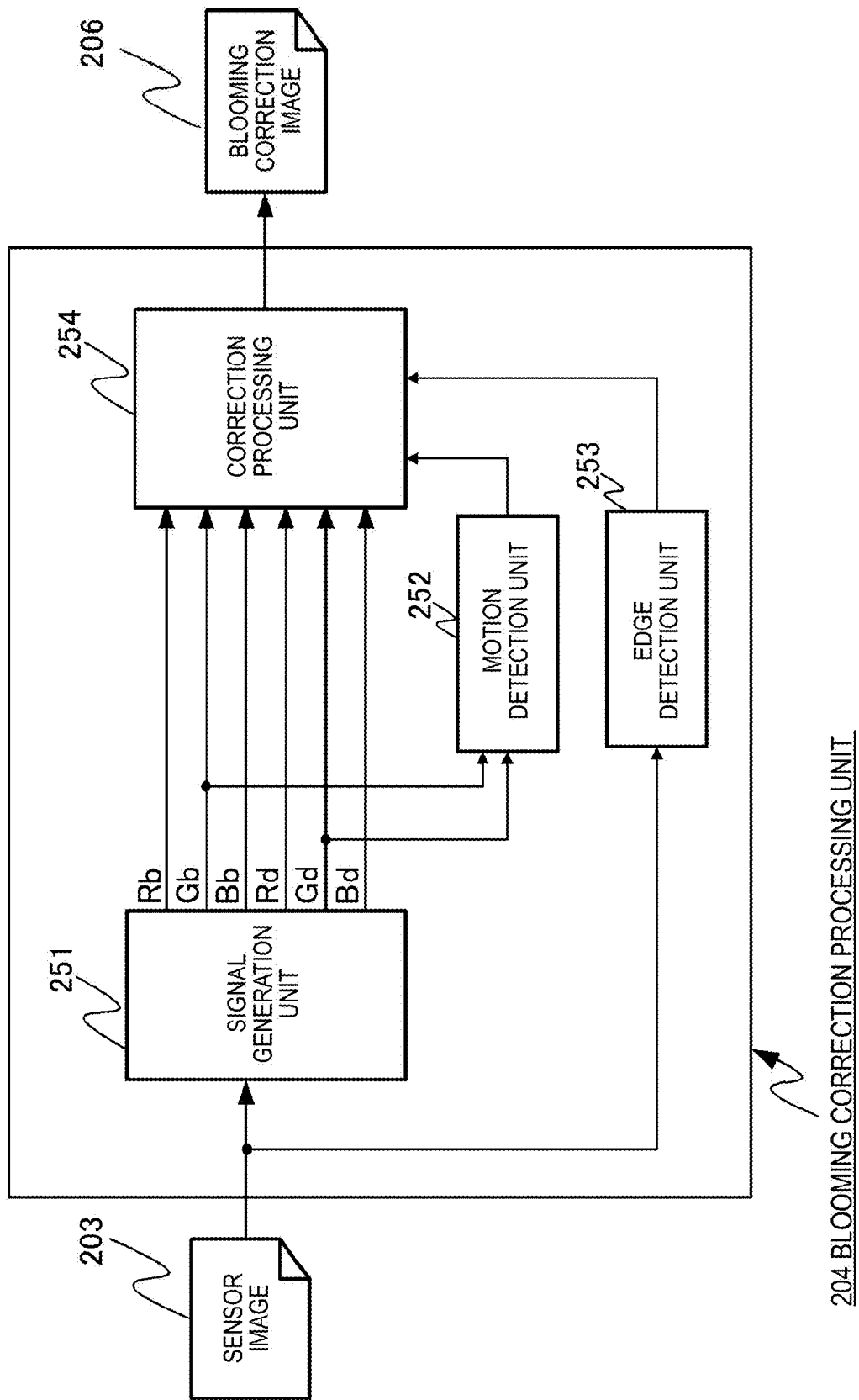
FIG. 38 is a diagram illustrating an overall configuration example of a blooming correction processing unit.

A correction processing unit 605 is a correction processing unit for executing the same blooming correction as the correction processing unit 254 shown in FIG. 38 described above, and performs the blooming correction using the low frequency signals mRb, mGb, mBb, mRd, mGd and mBd generated by the high-sensitivity low frequency signal generation unit 603 and the low-sensitivity low frequency signal generation unit 604.

Other components shown in FIG. 44 perform the same processes as those of the respective components described with reference to FIG. 40.

An HDR full-band signal generation unit 606 and HDR low frequency signal generation units 607 and 608 generate wide dynamic range images based on respective input signals.

A correlation processing unit 609 executes a process of generating R and B signals using the G high-frequency component. For example, the R and B signals are generated using the G high-frequency component according to the equations (Equations 40 and 41) described above.

In the first configuration example described above with reference to FIG. 37 and the subsequent diagrams, it is necessary to use a line memory in both the blooming correction process and the HDR combination process. On the other hand, in the configuration example shown in FIGS. 43 and 44, there is a merit in that only a line memory for the HDR combination process is necessary.

Figure 45:
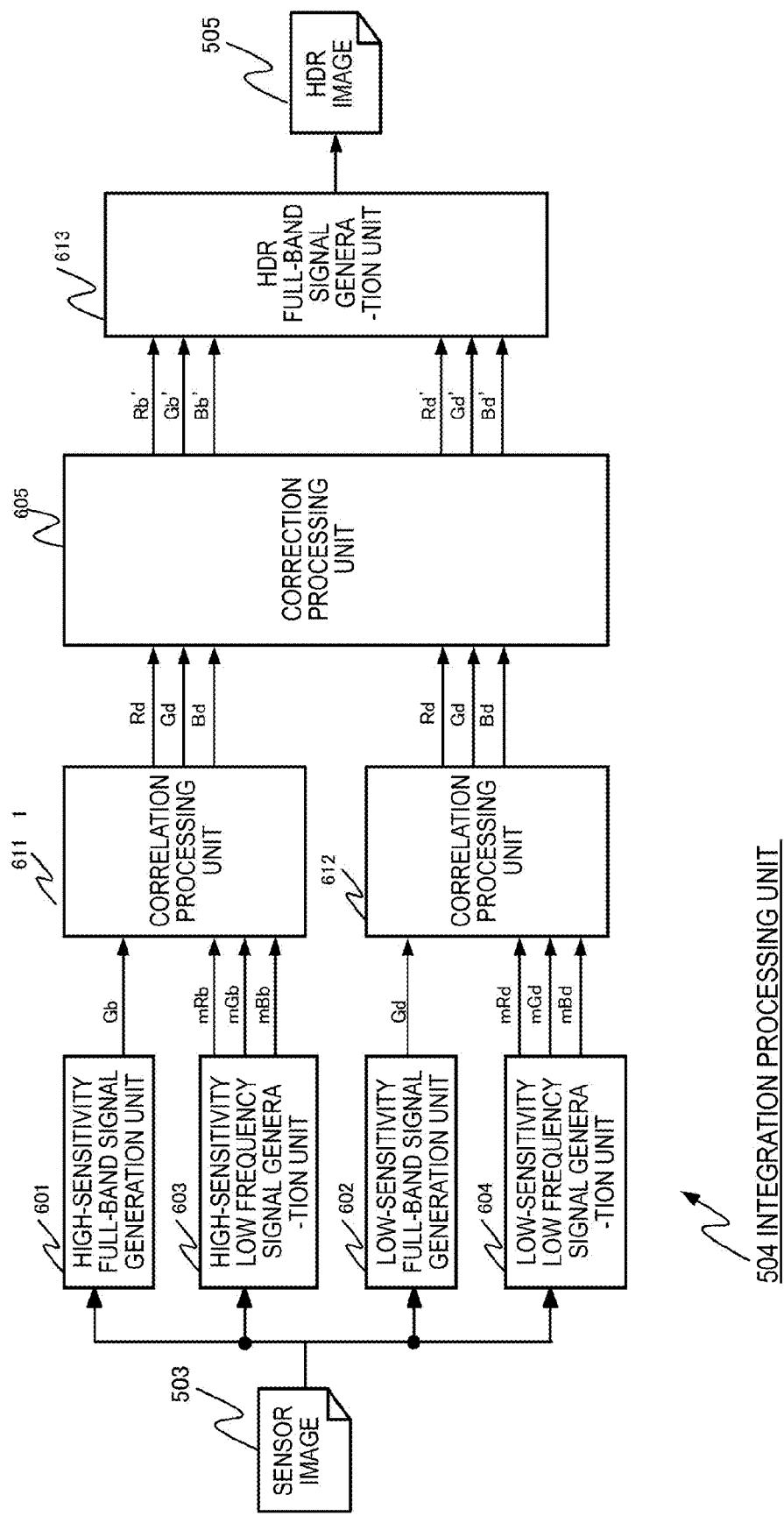
FIG. 45 is a diagram illustrating a concrete example of an integration processing unit.

FIG. 45 shows another configuration example of the integration processing unit 504 that performs the HDR combination and the blooming correction process, as in FIG. 44.

The integration processing unit 504 shown in FIG. 44 performs the blooming correction on the low frequency signals mRb, mGb, mBb, mRd, mGd and mBd. On the other hand, the integration processing unit 504 shown in FIG. 45 has a configuration in which correlation processing units 611 and 612 generate full-band frequency signals Rb, Gb, Bb, Rd, Gd and Bd of respective colors once and input the full-band frequency signals Rb, Gb, Bb, Rd, Gd and Bd to a correction processing unit 605 for executing the blooming correction, and the blooming correction is performed based on the input signals.

Figure 46:
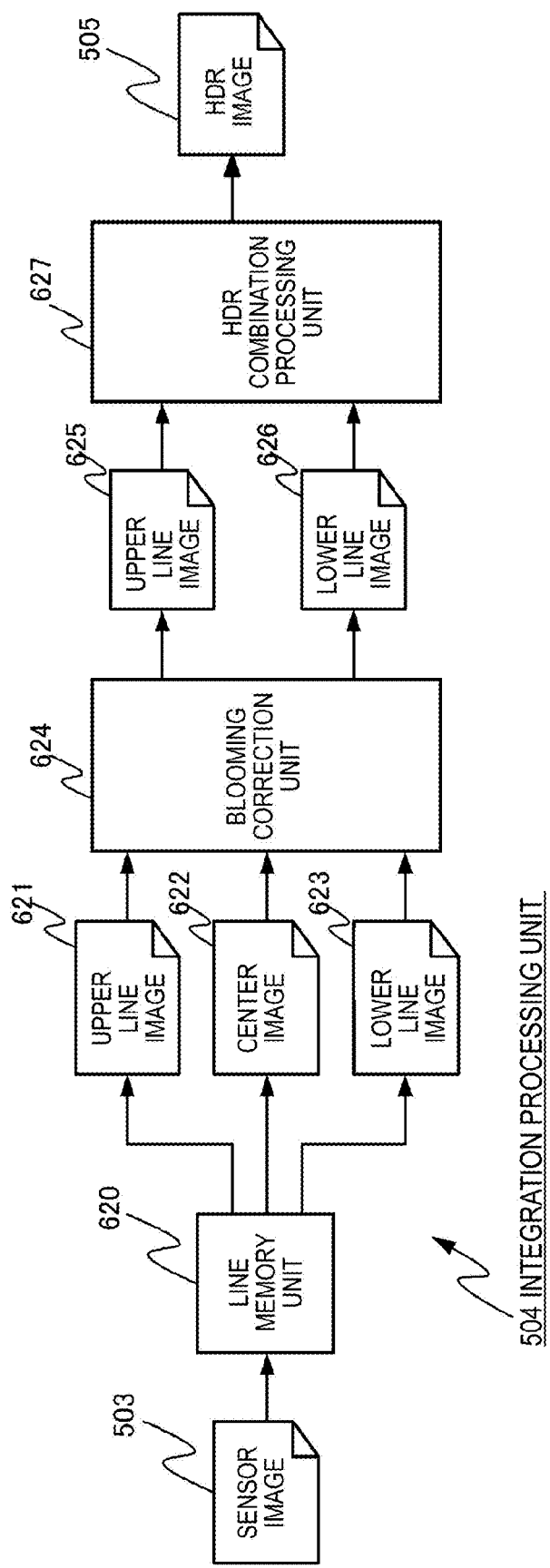
FIG. 46 is a diagram illustrating a concrete example of an integration processing unit.

FIG. 46 shows another configuration example of the integration processing unit 504 that performs the HDR combination and the blooming correction process, as in FIGS. 44 and 45.

A configuration shown in FIG. 46 is a configuration example in which the blooming correction and the HDR combination process are performed at lowest cost.

When a sensor image 503 that is an output from an image sensor has, for example, the arrangement of FIG. 8(A), the high-sensitivity pixel and the low-sensitivity pixel are switched for every two rows. That is, when two pixels are combined to generate an HDR image, it is necessary to accumulate pixel value data for two lines in a memory and perform the process. The pixel value data for the two lines is stored in a line memory 620.

The pixel value data of the line stored in the line memory 620 shown in FIG. 46 and delayed is input to a blooming correction unit 624, for example, as an upper line image 621 and a center image 622 shown in FIG. 46, and in parallel, a lower line image 623 is input as the sensor image 503 to the blooming correction unit 624 in real time.

Figure 47:
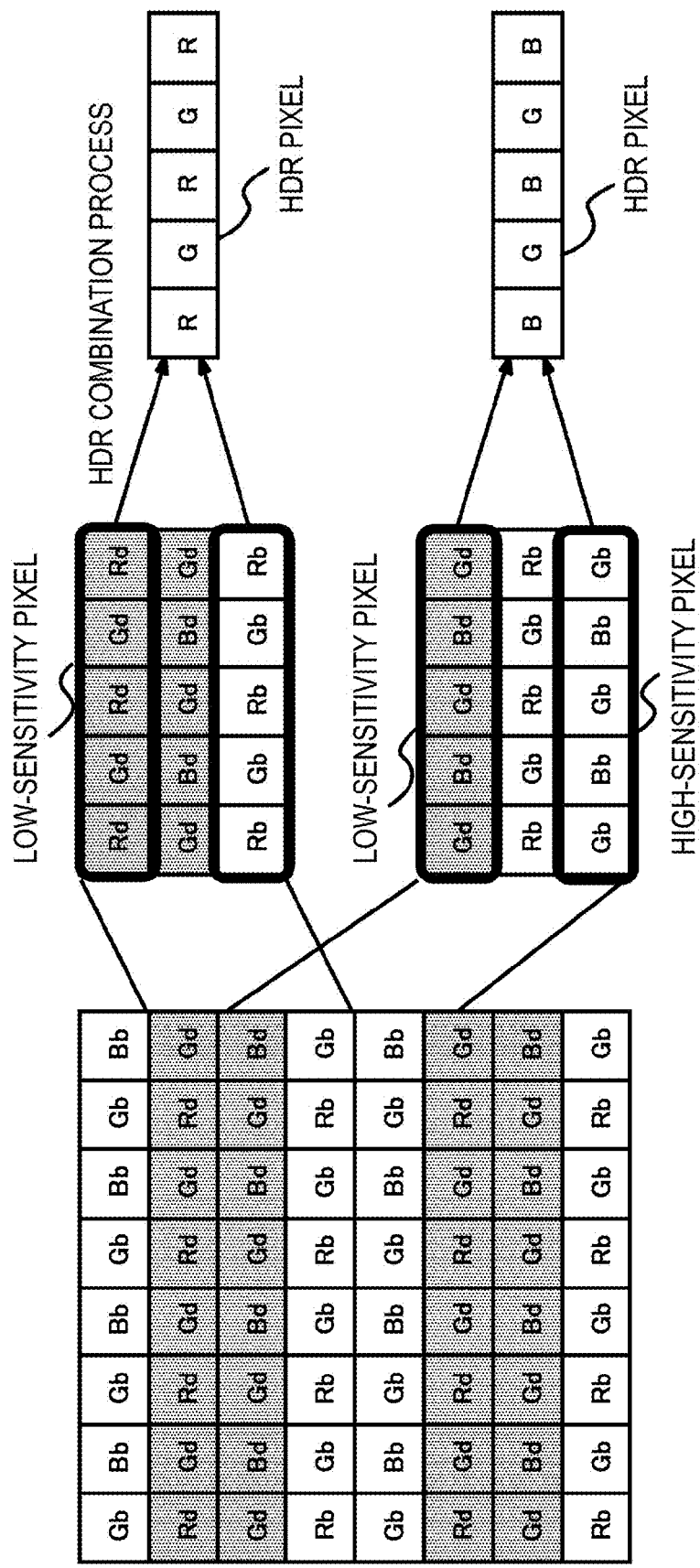
FIG. 47 is a diagram illustrating an input/output relationship of a blooming correction unit.

FIG. 47 is a diagram showing an input/output relationship of the blooming correction unit 624.

A left side shows the output of the image sensor, a middle shows input data for three lines to the blooming correction unit 624, and a right end shows pixel values of a finally generated HDR image.

The HDR image can be generated by combining the same color pixels with different sensitivity, but the blooming correction is performed in a front part thereof.

As shown above in the correction method, when blooming correction for a pixel is performed, it is necessary to reference a low-sensitivity pixel of a color pixel giving the influence of blooming on the pixel. However, in FIG. 47, it is difficult to acquire the low-sensitivity pixel.

For example, when a G pixel at a bottom in FIG. 47 is corrected, information of a low-sensitivity R pixel is desired to be acquired. However, since the low-sensitivity R pixel is not included in line 3 at a bottom in FIG. 47, it is difficult to realize this process.

In this case, the pixel value Rd of the low-sensitivity R pixel is estimated based on a pixel value of another pixel. That is, the blooming correction unit 624 shown in FIG. 46 executes an estimation process according to the following equation:

$$Rd\_est = Gd \times WbR/WbG$$

According to this equation, the pixel value (Rd_est) of the low-sensitivity R pixel is estimated.

Where, WbR denotes a white balance coefficient of R, and WbG denotes a white balance coefficient of G.

By executing such a process, blooming correction normally works in a state of achromatic color. That is, the blooming correction can be performed even with the configuration having the memory 620 for two lines like the integration processing unit 504 shown in FIG. 46.

Figure 48:
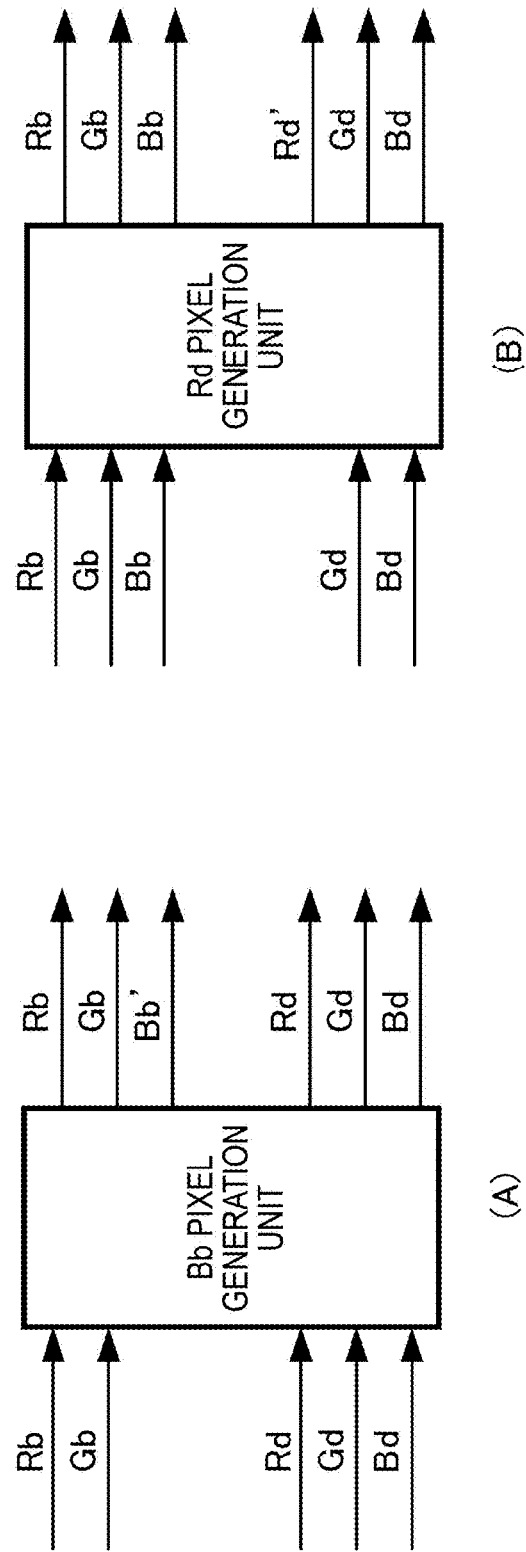
FIGS. 48A-B are diagrams illustrating a process example of a pixel generation unit configured in the blooming correction unit shown in FIG. 46.

FIG. 48 is a diagram illustrating a process example of a pixel generation unit configured in the blooming correction unit 624 shown in FIG. 46.

FIG. 48(A) shows a process example corresponding to the process at an upper part of FIG. 47, in which a Bb pixel not included in line 3 data is generated, and FIG. 48(B) shows a process example corresponding to the process at a lower part of FIG. 47, in which an Rd pixel not included in line 3 data is generated.

Outputs of the blooming correction unit 624 shown in FIG. 46 are input as an upper line image 625 and a lower line image 626 to the HDR combination processing unit 627. In the HDR combination processing unit 627, a high dynamic range (HDR) image 505 is generated and output through a pixel combination process in which pixels having different sensitivity after the blooming correction are applied.

[6. Other Embodiments: Correction of Image based on Sensor Characteristic other than Blooming]

In the above-described embodiments, the process of correcting the nonlinear characteristic of the sensor caused due to the blooming has been mainly described. However, it is possible to correct nonlinearity other than blooming using the method of the present disclosure.

Figure 49:
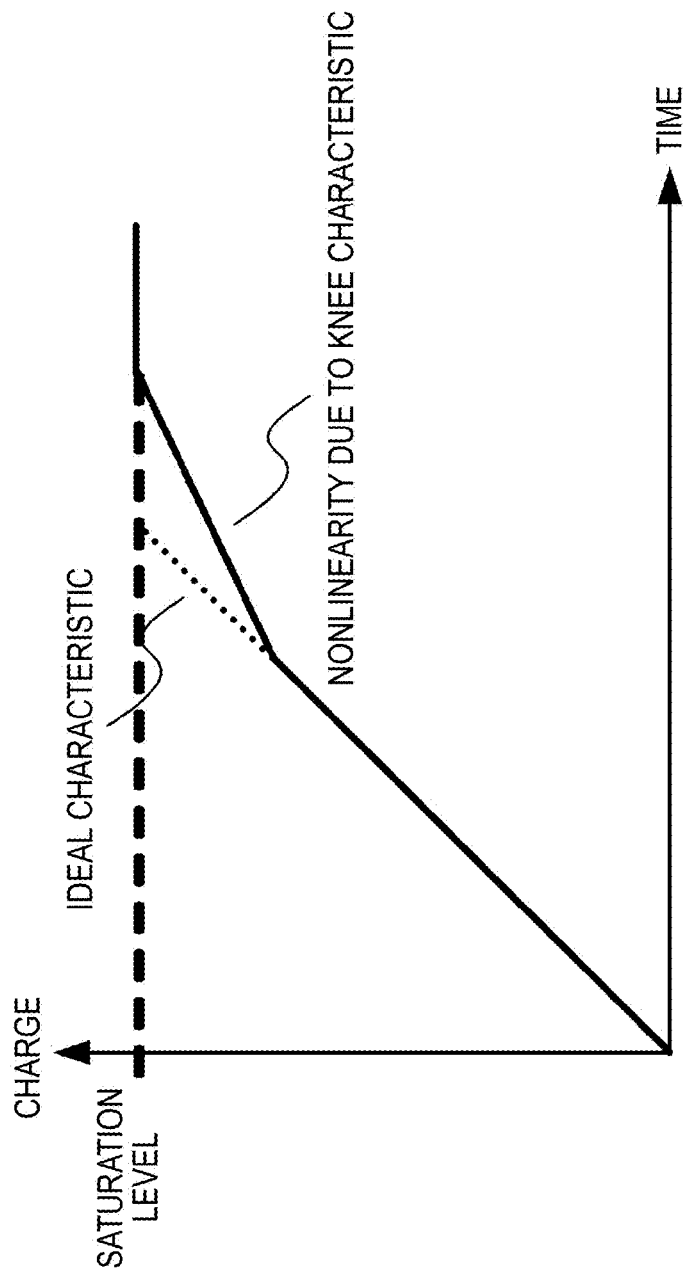
FIG. 49 is a diagram illustrating a knee characteristic.

For example, there is a knee characteristic as shown in FIG. 49 as the nonlinear characteristic of the sensor. This characteristic refers a characteristic in which, as charges are accumulated in a pixel and approach a saturation state, it becomes gradually different to accumulate the charges, as shown in FIG. 49. The nonlinear characteristic due to such a knee characteristic can also be corrected by using the method of acquiring the ideal characteristic, the method using the LUT, or the approximation according to the present disclosure.

Further, the configuration of the present disclosure may also be applied to color blend correction.

Color blend is caused by the characteristic of a color filter or crosstalk between pixels.

The color blend can be corrected by performing the acquisition of the ideal characteristic and the calculation with Equation 9 described above using the ideal characteristic according to the present disclosure on an image with such color blend.

The imaging device in the present embodiment includes, for example, the image sensor for outputting the high-sensitivity pixel signal from the long-time exposure pixel and the low-sensitivity pixel signal from the short-time exposure pixel, and the correction processing unit for receiving the output pixel signal from the image sensor and executing the correction of the pixel signal. The correction processing unit executes correction of the pixel value of the input pixel from the image sensor according to a difference between or a ratio of the input pixel value from the image sensor and the ideal pixel value according to the ideal linear characteristic of an amount of incident light to the image sensor and an output value.

The correction processing unit corrects the nonlinear characteristic contained in the input pixel value from the image sensor by applying the ideal pixel value according to the ideal linear characteristic. More specifically, the correction processing unit acquires the ideal pixel value of the image sensor acquired through a photography process performed multiple times or the look-up table (LUT) applied to corrected pixel value calculation based on the ideal pixel value from a storage unit, and executes pixel value correction.

[7. Conclusion of Configuration of the Present Disclosure]

The configuration of the present disclosure has been described above with respect to the specific embodiments. However, it should be understood by those skilled in the art that various modifications, combinations, sub-combinations and alterations may occur within the gist of the present disclosure. That is, the present disclosure is disclosed by way of example and should not be construed in a limiting sense. Claims should be taken into consideration to determine the gist of the present disclosure.

Additionally, the present technology may also be configured as below.

(1) An imaging device comprising:

an image sensor for outputting a high-sensitivity pixel signal from a long-time exposure pixel and a low-sensitivity pixel signal from a short-time exposure pixel; and a blooming correction processing unit for receiving the output pixel signal from the image sensor and executing blooming correction for the pixel signal, wherein the blooming correction processing unit executes pixel value correction of the input pixel from the image sensor according to a difference between or a ratio of an input pixel value from the image sensor and an ideal pixel value not affected by blooming (2) The imaging device according to (1), wherein:

the blooming correction processing unit comprises:

a blooming amount estimation unit for estimating a blooming amount corresponding to charge leakage from a pixel in the vicinity of a noticed pixel that is a blooming correction target using the low-sensitivity pixel signal input from the image sensor; and a calculation unit for subtracting the blooming amount estimated by the blooming amount estimation unit from the input pixel value from the image sensor.

(3) The imaging device according to (1) or (2), wherein:

the blooming correction processing unit comprises:

a blooming amount estimation unit for calculating a blooming amount corresponding to charge leakage from a pixel in the vicinity of a noticed pixel that is a blooming correction target based on a pixel arrangement of the image sensor and a mathematical model for which an exposure control pattern of a high-sensitivity pixel and a low-sensitivity pixel of the image sensor is considered.

(4) The imaging device according to any one of (1) to (3), wherein:

the blooming correction processing unit comprises:

a signal generation unit for generating a high-sensitivity pixel value and a low-sensitivity pixel value of each color corresponding to a pixel position of a noticed pixel that is a blooming correction target; and a correction processing unit for receiving a signal generated by the signal generation unit and executing blooming correction of the noticed pixel.

(5) The imaging device according to any one of (1) to (4), wherein:

the blooming correction processing unit executes pixel value correction of the input pixel from the image sensor by applying a table in which an input pixel value from the image sensor is associated with an ideal pixel value not affected by blooming (6) The imaging device according to any one of (1) to (5), wherein:

the blooming correction processing unit estimates a blooming amount contained in the input pixel from the image sensor by applying a table in which an input pixel value from the image sensor is associated with a difference between the input pixel value and an ideal pixel value not affected by blooming (7) The imaging device according to any one of (1) to (6), wherein:

the blooming correction processing unit comprises:

a blooming amount estimation unit for estimating a blooming amount corresponding to charge leakage from a pixel in the vicinity of a noticed pixel that is a blooming correction target using the low-sensitivity pixel signal input from the image sensor;

a multiplication unit for multiplying the blooming amount estimated by the blooming amount estimation unit by a predefined attenuation parameter to calculate an attenuation blooming amount; and a calculation unit for subtracting the attenuation blooming amount calculated by the multiplication unit from the input pixel value from the image sensor.

(8) The imaging device according to any one of (1) to (7), wherein:

the blooming correction processing unit estimates a blooming amount corresponding to charge leakage from a pixel in the vicinity of a noticed pixel that is a blooming correction target using the low-sensitivity pixel signal input from the image sensor, and executes estimation of the blooming amount again using a low-sensitivity pixel signal obtained by subtracting the blooming amount based on the estimation result.

(9) The imaging device according to any one of (1) to (8), wherein:

the blooming correction processing unit comprises a motion detection unit for determining whether a noticed pixel that is a blooming correction target is a motion area, and changes a blooming correction aspect according to detection information of the motion detection unit.

(10) The imaging device according to any one of (1) to (9), wherein:

the blooming correction processing unit comprises an edge detection unit for determining whether a noticed pixel that is a blooming correction target is an edge area, and changes a blooming correction aspect according to detection information of the edge detection unit.

(11) The imaging device according to any one of (1) to (10), wherein:

the blooming correction processing unit comprises an over-correction solving unit for reducing an estimation blooming amount corresponding to the noticed pixel when a noticed pixel that is a blooming correction target is a motion area or an edge area.

(12) The imaging device according to any one of (1) to (11), wherein:

the blooming correction processing unit determines whether the input pixel value is saturated and does not execute the blooming correction when the input pixel value is a saturation value.

(13) The imaging device according to any one of (1) to (12), further comprising:

a high dynamic range (HDR) image generation unit for receiving the blooming correction image generated by the blooming correction processing unit to generate a wide dynamic range image.

(14) An imaging device comprising:

an image sensor for outputting a high-sensitivity pixel signal from a long-time exposure pixel and a low-sensitivity pixel signal from a short-time exposure pixel; and a correction processing unit for receiving the output pixel signal from the image sensor and executing correction for the pixel signal, wherein the correction processing unit executes pixel value correction of the input pixel from the image sensor according to a difference between or a ratio of an input pixel value from the image sensor and an ideal pixel value according to an ideal linear characteristic of an amount of incident light to the image sensor and an output value.

(15) The imaging device according to (14), wherein:
the correction processing unit corrects a nonlinear characteristic contained in an input pixel value from the image sensor by applying the ideal pixel value according to the ideal linear characteristic.

(16) The imaging device according to (14) or (15), wherein:
the correction processing unit acquires the ideal pixel value of the image sensor acquired through a photography process performed multiple times, or the look-up table (LUT) applied to corrected pixel value calculation based on the ideal pixel value, from a storage unit and executes pixel value correction.

Further, a processing method that is executed in the aforementioned device or the like, and a program that executes the process also fall within the configuration of the present disclosure.

The series of processes described in this specification can be executed by hardware, software, or both. When the series of processes is executed by the software, a program having a processing sequence recorded thereon can be installed on memory within a computer embedded in dedicated hardware, and executed, or a program can be installed on a general-purpose computer that can execute various processes, and executed. For example, the program can be recorded on a recording medium in advance. In addition to being installed on a computer from a recording medium, the program can also be installed on a recording medium such as built-in hard disk after being received via a network such as the Internet.

Note that the various types of processing that are described in this specification may not only be performed in a temporal sequence as has been described, but may also be performed in parallel or individually, in accordance with the processing capacity of the device that performs the processing or as needed. Furthermore, the system in this specification is not limited to being a configuration that logically aggregates a plurality of devices, all of which are contained within the same housing.

As described above, according to the configuration of the embodiment of the present disclosure, a device and a method for realizing highly accurate blooming correction for a one-shot type of wide dynamic range captured image is realized.

Specifically, the output pixel signal from the image sensor that outputs a high-sensitivity pixel signal and a low-sensitivity pixel signal is received and the blooming correction for the pixel signal is executed. The correction processing unit executes the pixel value correction of the input pixel according to the difference between or the ratio of the input pixel value from the image sensor and the ideal pixel value not affected by blooming. For example, a blooming amount corresponding to charge leakage from a pixel in the vicinity of the correction target pixel is estimated using the low-sensitivity pixel signal and the estimated blooming amount is subtracted from the input pixel value. Specifically, the process using the mathematical model or the LUT is performed.

According to the configuration of the present disclosure, the nonlinearity due to blooming is corrected by suppressing the blooming amount of the pixel suffering from blooming, thereby realizing correct color reproduction, accurately representing image gradation, and improving image quality.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging device comprising:
an image sensor for outputting an output pixel signal comprising a high-sensitivity pixel signal from at least one long-time exposure pixel and a low-sensitivity pixel signal from at least one short-time exposure pixel; and
a blooming correction processing unit for receiving the output pixel signal from the image sensor and executing blooming correction for the output pixel signal,
wherein the blooming correction processing unit executes pixel value correction of an input pixel from the image sensor according to an ideal pixel value not affected by blooming, and based at least in part on whether the input pixel is a long-time exposure pixel or a short-time exposure pixel, and whether a plurality of pixels neighboring the input pixel are each a long-time exposure pixel or a short-time exposure pixel.

2. The imaging device according to claim 1, wherein:
the blooming correction processing unit comprises:
a blooming amount estimation unit for estimating a blooming amount corresponding to charge leakage from a pixel in the vicinity of a noticed pixel that is a blooming correction target using the low-sensitivity pixel signal input from the image sensor; and
a calculation unit for subtracting the blooming amount estimated by the blooming amount estimation unit from the input pixel value from the image sensor.

3. The imaging device according to claim 1, wherein:
the blooming correction processing unit comprises:
a blooming amount estimation unit for calculating a blooming amount corresponding to charge leakage from a pixel in the vicinity of a noticed pixel that is a blooming correction target based on a pixel arrangement of the image sensor and a mathematical model for which an exposure control pattern of a high-sensitivity pixel and a low-sensitivity pixel of the image sensor is considered.

4. The imaging device according to claim 1, wherein:
the blooming correction processing unit comprises:
a signal generation unit for generating a high-sensitivity pixel value and a low-sensitivity pixel value of each color corresponding to a pixel position of a noticed pixel that is a blooming correction target; and
a correction processing unit for receiving a signal generated by the signal generation unit and executing blooming correction of the noticed pixel.

5. The imaging device according to claim 1, wherein:
the blooming correction processing unit executes pixel value correction of the input pixel from the image sensor by applying a table in which an input pixel value from the image sensor is associated with an ideal pixel value not affected by blooming.

6. The imaging device according to claim 1, wherein:
the blooming correction processing unit estimates a blooming amount contained in the input pixel from the image sensor by applying a table in which an input pixel value from the image sensor is associated with a difference between the input pixel value and an ideal pixel value not affected by blooming.

7. The imaging device according to claim 1, wherein:
the blooming correction processing unit comprises:
a blooming amount estimation unit for estimating a blooming amount corresponding to charge leakage from a pixel in the vicinity of a noticed pixel that is a blooming correction target using the low-sensitivity pixel signal input from the image sensor;
a multiplication unit for multiplying the blooming amount estimated by the blooming amount estimation unit by a pre-defined attenuation parameter to calculate an attenuation blooming amount; and a calculation unit for subtracting the attenuation blooming amount calculated by the multiplication unit from the input pixel value from the image sensor.

8. The imaging device according to claim 1, wherein:
the blooming correction processing unit estimates a blooming amount corresponding to charge leakage from a pixel in the vicinity of a noticed pixel that is a blooming correction target using the low-sensitivity pixel signal input from the image sensor, and executes estimation of the blooming amount again using a low-sensitivity pixel signal obtained by subtracting the blooming amount based on the estimation result.

9. The imaging device according to claim 1, wherein:
the blooming correction processing unit comprises a motion detection unit for determining whether a noticed pixel that is a blooming correction target is a motion area, and changes a blooming correction aspect according to detection information of the motion detection unit.

10. The imaging device according to claim 1, wherein:
the blooming correction processing unit comprises an edge detection unit for determining whether a noticed pixel that is a blooming correction target is an edge area, and changes a blooming correction aspect according to detection information of the edge detection unit.

11. The imaging device according to claim 1, wherein:
the blooming correction processing unit comprises an over-correction solving unit for reducing an estimation blooming amount corresponding to the noticed pixel when a noticed pixel that is a blooming correction target is a motion area or an edge area.

12. The imaging device according to claim 1, wherein:
the blooming correction processing unit determines whether the input pixel value is saturated and does not execute the blooming correction when the input pixel value is a saturation value.

13. The imaging device according to claim 1, further comprising:
a high dynamic range (HDR) image generation unit for receiving the blooming correction image generated by the blooming correction processing unit to generate a wide dynamic range image.

14. An imaging device comprising:
an image sensor for outputting an output pixel signal comprising a high-sensitivity pixel signal from at least one long-time exposure pixel and a low-sensitivity pixel signal from at least one short-time exposure pixel; and
a correction processing unit for receiving the output pixel signal from the image sensor and executing correction for the output pixel signal,
wherein the correction processing unit executes pixel value correction of an input pixel from the image sensor according to an ideal pixel value according to an ideal linear characteristic of an amount of incident light to the image sensor and an output value, and based at least in part on whether the input pixel is a long-time exposure pixel or a short-time exposure pixel, and whether a plurality of pixels neighboring the input pixel are each a long-time exposure pixel or a short-time exposure pixel.

15. The imaging device according to claim 14, wherein:
the correction processing unit corrects a nonlinear characteristic contained in an input pixel value from the image sensor by applying the ideal pixel value according to the ideal linear characteristic.

16. The imaging device according to claim 14, wherein:
the correction processing unit acquires the ideal pixel value of the image sensor acquired through a photography process performed multiple times, or the look-up table (LUT) applied to corrected pixel value calculation based on the ideal pixel value, from a storage unit and executes pixel value correction.

17. An image processing method executed in an imaging device, wherein:
the imaging device comprises:
an image sensor for outputting an output pixel signal comprising a high-sensitivity pixel signal from at least one long-time exposure pixel and a low-sensitivity pixel signal from at least one short-time exposure pixel; and
a blooming correction processing unit for receiving the output pixel signal from the image sensor and executing blooming correction for the output pixel signal, and
the blooming correction processing unit executes pixel value correction of an input pixel from the image sensor according to an ideal pixel value not affected by blooming, and based at least in part on whether the input pixel is a long-time exposure pixel or a short-time exposure pixel, and whether a plurality of pixels neighboring the input pixel are each a long-time exposure pixel or a short-time exposure pixel.

18. At least one non-transitory computer readable medium comprising instructions that, when executed, cause an imaging device to execute image processing, wherein:
the imaging device comprises:
an image sensor for outputting an output pixel signal comprising a high-sensitivity pixel signal from at least one long-time exposure pixel and a low-sensitivity pixel signal from at least one short-time exposure pixel; and
a blooming correction processing unit for receiving the output pixel signal from the image sensor and executing blooming correction for the output pixel signal, and
the instructions cause the blooming correction processing unit to execute pixel value correction of an input pixel from the image sensor according to an ideal pixel value not affected by blooming, and based at least in part on whether the input pixel is a long-time exposure pixel or a short-time exposure pixel, and whether a plurality of pixels neighboring the input pixel are exposure pixel or a short-time exposure pixel.

* * * * *